(12) United States Patent
Yoshida et al.

(10) Patent No.: US 8,767,155 B2
(45) Date of Patent: *Jul. 1, 2014

(54) METHOD FOR PRODUCING LIQUID CRYSTAL DISPLAY DEVICE

(75) Inventors: Hidefumi Yoshida, Kawasaki (JP); Tsutomu Seino, Kawasaki (JP); Yasutoshi Tasaka, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 5 days.

This patent is subject to a terminal disclaimer.

(21) Appl. No.: 13/327,453

(22) Filed: Dec. 15, 2011

(65) Prior Publication Data

US 2012/0088195 A1    Apr. 12, 2012

Related U.S. Application Data

(62) Division of application No. 12/196,037, filed on Aug. 21, 2008, now Pat. No. 8,120,737, which is a division of application No. 11/528,817, filed on Sep. 28, 2006, now Pat. No. 7,468,772, which is a division of application No. 10/871,449, filed on Jun. 14, 2004, now Pat. No. 7,133,099, which is a division of application No. 10/317,792, filed on Dec. 12, 2002, now Pat. No. 6,781,656, which is a division of application No. 09/030,410, filed on Feb. 25, 1998, now Pat. No. 6,512,564.

(30) Foreign Application Priority Data

| Feb. 27, 1997 | (JP) | 9-43488 |
| Aug. 25, 1997 | (JP) | 9-228487 |
| Dec. 24, 1997 | (JP) | 9-354940 |

(51) Int. Cl.
*G02F 1/1337* (2006.01)

(52) U.S. Cl.
USPC .......... 349/124; 349/128; 349/129; 349/130; 349/158; 349/187

(58) Field of Classification Search
USPC ................. 349/124, 129, 130, 136, 187, 158; 428/1.2; 430/321
See application file for complete search history.

(56) References Cited

U.S. PATENT DOCUMENTS

| 4,974,941 A | 12/1990 | Gibbons et al. |
| 5,462,700 A | 10/1995 | Beeson et al. |

(Continued)

FOREIGN PATENT DOCUMENTS

| EP | 742 471 | 11/1996 |
| EP | 0 750 212 A2 | 12/1996 |

(Continued)

OTHER PUBLICATIONS

Japanese Journal of Applied Physics, vol. 31 (1992) pp. 2155-2164, entitled ASurface-Induced Parallel Alignment of Liquid Crystals by Linearly Polymerized Photopolymers,≅ M. Schadt, K. Schmitt, V. Kozinkov, and V. Chigrinov (Jul. 1992).

(Continued)

*Primary Examiner* — Dung Nguyen
*Assistant Examiner* — Tai Duong
(74) *Attorney, Agent, or Firm* — Greer Burns & Crain, Ltd.

(57) ABSTRACT

A method for producing a liquid crystal display device including a pair of substrates, a first electrode formed on one substrate, a second electrode formed on the other substrate, and liquid crystal molecules filled between the substrates. The method includes providing alignment layer material exhibiting a vertically orienting property for a selected one of the substrates, aligning a mask having permeable portions and impermeable portions over a selected substrate, irradiating the mask with ultraviolet rays in a first inclined azimuthal direction, and simultaneously irradiating the mask from a second inclined azimuthal direction which is substantially 180 degrees different from the first inclined azimuthal direction. Additionally, the azimuthal direction of the alignment of liquid crystal molecules in a first region of the substrate is substantially 180 degrees different from the azimuthal direction of the alignment of liquid crystal molecules in a second region of the substrate.

16 Claims, 46 Drawing Sheets

(56) References Cited

U.S. PATENT DOCUMENTS

| | | |
|---|---|---|
| 5,473,455 A | 12/1995 | Koike et al. |
| 5,539,074 A | 7/1996 | Herr et al. |
| 5,578,351 A | 11/1996 | Shashidhar et al. |
| 5,604,615 A | 2/1997 | Iwagoe et al. |
| 5,606,442 A | 2/1997 | Bos et al. |
| 5,629,056 A * | 5/1997 | Koike et al. .............. 428/1.26 |
| 5,673,127 A | 9/1997 | Takahara et al. |
| 5,710,611 A | 1/1998 | Suzuki et al. |
| 5,739,889 A | 4/1998 | Yamada et al. |
| 5,757,454 A | 5/1998 | Ogishima et al. |
| 5,757,455 A | 5/1998 | Sugiyama et al. |
| 5,824,377 A | 10/1998 | Pirwitz et al. |
| 5,831,700 A | 11/1998 | Li et al. |
| 5,859,682 A | 1/1999 | Kim et al. |
| 5,864,388 A | 1/1999 | Shima et al. |
| 5,889,571 A | 3/1999 | Kim et al. |
| 5,912,717 A | 6/1999 | Sugiyama et al. |
| 6,040,885 A | 3/2000 | Koike et al. |
| 6,067,140 A | 5/2000 | Woo et al. |
| 6,141,074 A | 10/2000 | Bos et al. |
| 6,191,836 B1 | 2/2001 | Woo et al. |
| 6,300,993 B1 | 10/2001 | Kuo et al. |
| 6,417,905 B1 | 7/2002 | Woo et al. |
| 6,462,797 B1 | 10/2002 | Woo et al. |
| 6,501,524 B1 | 12/2002 | Yoshida et al. |
| 6,573,964 B1 | 6/2003 | Takizawa et al. |
| 6,721,025 B2 | 4/2004 | Woo et al. |
| 2002/0171795 A1 | 11/2002 | Woo et al. |
| 2008/0316408 A1 | 12/2008 | Yoshida et al. |
| 2010/0328602 A1 | 12/2010 | Yoshida et al. |

FOREIGN PATENT DOCUMENTS

| | | |
|---|---|---|
| JP | 63-106624 | 5/1988 |
| JP | 01-245223 | 9/1989 |
| JP | A 2-309321 | 12/1990 |
| JP | A 4-289823 | 10/1992 |
| JP | A 5-224206 | 9/1993 |
| JP | 6-289374 | 10/1994 |
| JP | 07-199193 | 8/1995 |
| JP | A 7-253578 | 10/1995 |
| JP | 8-15681 | 1/1996 |
| JP | 08-043825 | 2/1996 |
| JP | 8-152638 | 6/1996 |
| JP | 08-304828 | 11/1996 |
| JP | A 9-5747 | 1/1997 |

OTHER PUBLICATIONS

Imura et al. "Prospects of the Photo-Alignment Technique for LCD Fabrication"—SID 97 Digest, May 1997, pp. 311-314.

Yamamoto et al. "Liquid-Crystal Alignment by Slantwise Irradiation of No-Polarized UV Light on a Polyimide Layer"—SID 96 Digest, May 1997, pp. 642-645.

U.S. Appl. No. 12/195,949, filed Sep. 3, 2010.

Notice of Reasons for Rejection, issued May 18, 2010 in Japanese Application No. 2010-063115.

* cited by examiner

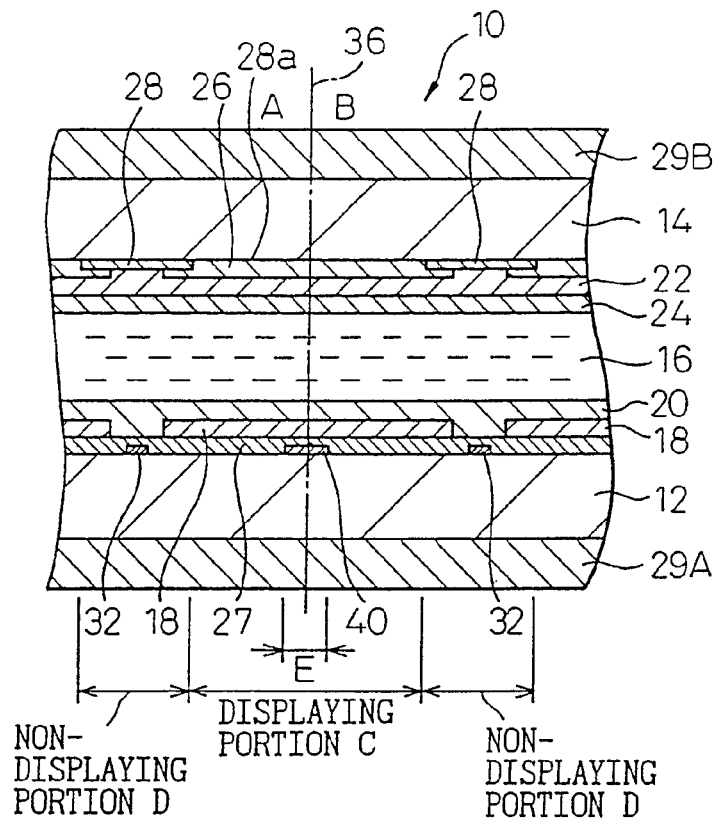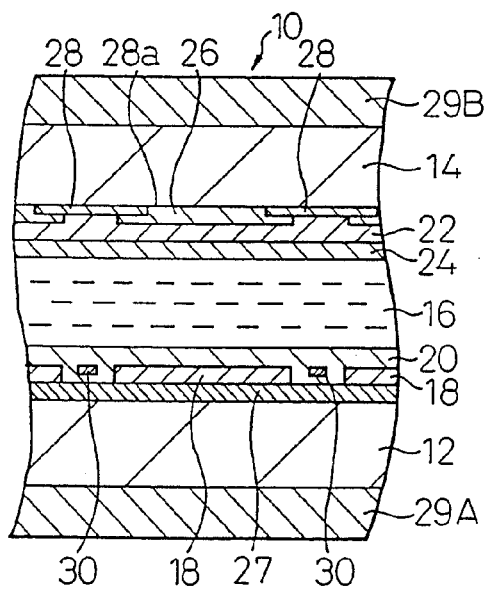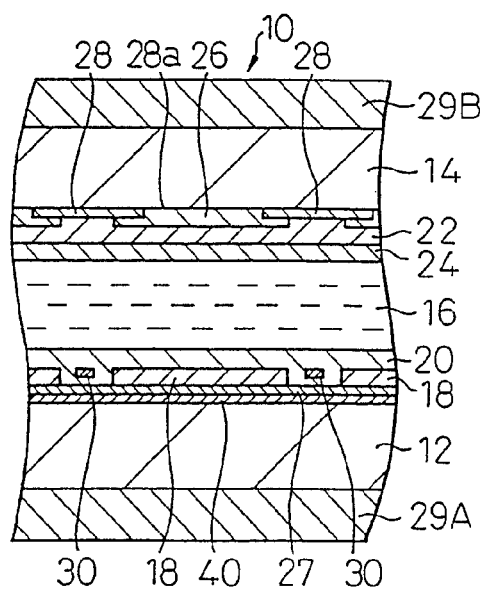

Fig.40
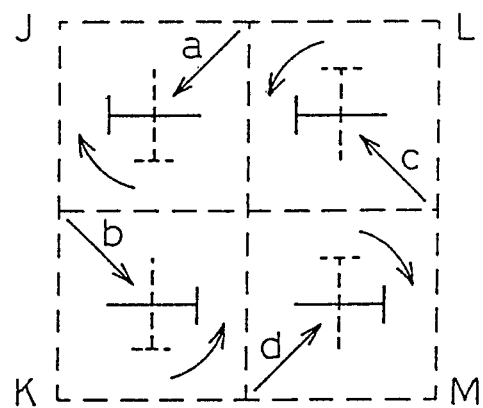
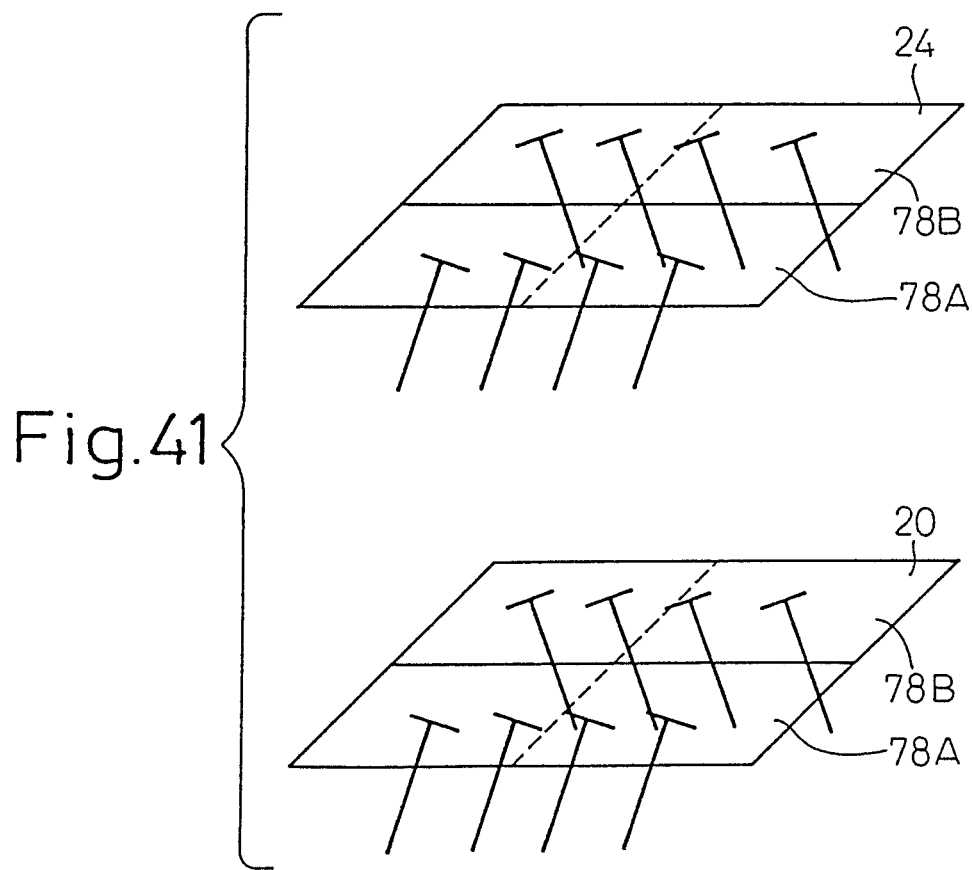
Fig.41

METHOD FOR PRODUCING LIQUID CRYSTAL DISPLAY DEVICE

This is a divisional of application Ser. No. 12/196,037, filed Aug. 21, 2008, which is a divisional of application Ser. No. 11/528,817, filed Sep. 28, 2006, now U.S. Pat. No. 7,468,772, issued Dec. 23, 2008, which is a divisional of application Ser. No. 10/871,449, filed Jun. 14, 2004, now U.S. Pat. No. 7,133, 099, which is a divisional of application Ser. No. 10/317,792, filed Dec. 12, 2002, now U.S. Pat. No. 6,781,656, which is a divisional of application Ser. No. 09/030,410, filed Feb. 25, 1998, now U.S. Pat. No. 6,512,564.

BACKGROUND OF THE INVENTION

1. Field of the Invention

The present invention relates to a liquid crystal display device. More particularly, the present invention relates to a technology for alignment-treating the alignment layers of a liquid crystal display device.

2. Description of the Related Art

A liquid crystal display device includes a pair of spaced and opposed substrates, an electrode and an alignment layer formed on one substrate, an electrode and an alignment layer formed on the other substrate, and a liquid crystal held between the pair of substrates. The electrode of one substrate is formed as a common electrode, and the electrode of the other substrate is formed as pixel electrodes. The pixel electrodes can be formed together with an active matrix. Either one of the substrates is provided with a black matrix and a color filter.

When the liquid crystal display device is viewed, the portions of pixel electrodes become bright and dark depending upon ~h~ presence and absence of a voltage. That is, the pixel electrodes define the pixel display portions. The openings of the black matrix are arranged to overlap the pixel electrodes, and have areas smaller than the areas of the pixel electrodes. When the black matrix is provided, therefore, the pixel display portions are defined by the openings of the black matrix. In either case, the portions around the pixel display portions are non-display portions.

The alignment layers can be grouped into horizontal alignment layers and vertical alignment layers. When the horizontal alignment layers are used, the liquid crystal molecules are oriented nearly parallel to the surface of the substrate. Upon applying a voltage, therefore, the liquid crystal molecules are tilted with respect to the surface of the substrate. When the vertical alignment layers are used, the liquid crystal molecules are oriented nearly perpendicularly to the surface of the substrate. Upon applying a voltage, therefore, the liquid crystal molecules are tilted obliquely to the surface of the substrate. In either case, the alignment layers are alignment-treated by a process such as being rubbed. In the case of a TN-type liquid crystal display device, the liquid crystal twists from one alignment layer toward the other alignment layer. Upon effecting the rubbing, furthermore, the liquid crystal molecules are in a pretilt position with a pretilt angle with respect to the alignment layer.

In the TN-type liquid crystal display device, as viewed in its assembled state, the two alignment layers are rubbed in directions forming a predetermined angle (90 degrees) relative to each other, so that the liquid crystal twists from one alignment layer toward the other alignment layer. Here, when it is regarded that the liquid crystal molecules are oriented in a plane, by neglecting the twist, the pretilt direction of the liquid crystal molecules positioned near one alignment layer is the same as the pretilt direction of the liquid crystal molecules positioned near the other alignment layer, whereby the liquid crystal molecules positioned between the alignment layers are oriented according to the pretilt directions of liquid crystal molecules positioned near the two alignment layers.

If the pretilt direction of the liquid crystal molecules positioned near one alignment layer is opposite to the pretilt direction of the liquid crystal molecules positioned near the other alignment layer, the intermediately positioned liquid crystal molecules may not be tilted in a predetermined direction because it is not certain that the liquid crystal molecules depend on any of the pretilt directions of liquid crystal molecules positioned near these alignment layers. The state of alignment becomes a spray-alignment when the pretilt angle of the alignment layer is close to the horizontal alignment, and becomes a bend-alignment when the pretilt angle of the alignment layer is higher than, for example, 30° or is close to the vertical alignment.

However, the assignee as for the present case has proposed the fact that even when the pretilt direction of the liquid crystal molecules positioned near one alignment layer is opposite to the pretilt direction of the liquid crystal molecules positioned near the other alignment layer, if there is a difference between the pretilt angle of the liquid crystal molecules near one alignment layer and the pretilt angle of the liquid crystal molecules near the other alignment layer, the intermediate liquid crystal molecules are oriented depending on the pretilt direction of the liquid crystal molecules having a larger pretilt angle (or a smaller pretilt angle). The assignee has utilized this fact in the alignment division that will be described below. When the horizontal alignment layers are used, the intermediate liquid crystal molecules are oriented depending on the pretilt direction of the liquid crystal molecules having a larger pretilt angle. When the vertical alignment layers are used, the intermediately positioned liquid crystal molecules are oriented depending on the pretilt direction of the liquid crystal molecules having a smaller pretilt angle.

The liquid crystal display device involves a problem of a so-called visual angle characteristic in which the display device appears whitish or blackish depending upon the direction from which the display surface is viewed. Technology for dividing alignment has been proposed for improving the problem of the visual angle characteristic. The alignment division consists of dividing a pixel into two domains, so that the liquid crystal molecules positioned between the two alignment layers in one domain are tilted in one direction and the liquid crystal molecules positioned between the two alignment layers in the other domain are tilted in the other direction. A whitish appearance and a blackish appearance are averaged by the alignment division, and a favorable display is obtained irrespective of the direction from which the display surface is viewed. To effect the alignment division, however, the alignment layer must be rubbed for each domain, and the alignment layers must be rubbed twice using a mask.

U.S. Pat. No. 5,473,455, assigned to the assignee of the present case, discloses various technologies for the alignment division. A particularly advantageous technology consists of effecting the alignment division by rubbing each alignment layer once. According to this technology for the alignment division, each alignment layer is rubbed and irradiated with ultraviolet rays via a mask. In the portions that are not irradiated with ultraviolet rays, the liquid crystal molecules are oriented at a first pretilt angle due to the effect of rubbing. In the portions irradiated with ultraviolet rays, the liquid crystal molecules are oriented at a second pretilt angle which is greater (or smaller) thus the first pretilt angle. A portion of one alignment layer having the first pretilt angle is arranged to be opposed to a portion of the other alignment layer having the second pretilt angle. The rubbing of the two alignment layers forms a bend-alignment or a spray-alignment. However, the intermediately positioned liquid crystal molecules are oriented according to the pretilt direction of the liquid crystal molecules having a particular pretilt angle since there exists a difference between the pretilt angles of the liquid crystal molecules near the two alignment layers. The solid portion of the mask and the opening appear alternatingly, and the directions of alignment of the liquid crystal alternate correspondingly.

The liquid crystal display device has pixel display portions and non-display portions. Here, the pixel display portions and the non-display portions are rubbed simultaneously. However, Japanese Unexamined Patent Publication (Kokai) No. 8-152638 proposes an alignment treatment in which the anchoring energy for the non-display portions is larger than the anchoring energy for the pixel display portions. According to this publication, in a state where a predetermined voltage is applied, the liquid crystal molecules are easily erected in the pixel display portions but the liquid crystal molecules are less easily erected in the non-display portions and are not affected by a voltage of a bus line applied to the non-display portions.

There exists a further problem in rubbing. The rubbing consists of rubbing the alignment layer with a cloth made of, for example, rayon, but dirt is produced as the cloth is brought into a clean room. Besides, the rubbing generates static electricity which may destroy TFTs (thin-film transistors) in the active matrix. It has therefore been desired to execute the alignment treatment by, for example, irradiation with ultraviolet rays instead of rubbing.

U.S. Pat. No. 4,974,941 and Japanese Unexamined Patent Publications (Kokai) No. 6-289374 and No. 8-015681, for example, disclose an alignment treatment using polarized ultraviolet rays. According to U.S. Pat. No. 4,974,941, a homogeneously oriented liquid crystal cell is partly irradiated with polarized ultraviolet rays so that the direction of alignment of the irradiated portion becomes different from the initial direction of homogeneous alignment. According to Japanese Unexamined Patent Publications (Kokai) No. 6-289374 and No. 8-015681, a mesh-like polymer tissue (PPN) that can be optically oriented is irradiated with perpendicularly polarized ultraviolet rays in order to realize the alignment of the liquid crystal molecules. With this method, however, a problem exists in that polarized ultraviolet rays must be used. A polarizer of the Glen-Taylor type is available for obtaining the polarized ultraviolet rays. However, the Glen-Taylor type polarizer is obtained by cutting a natural calcite and is not suited for practical use. It has therefore been desired to effect the alignment treatment by using non-polarized ultraviolet rays.

When the pixel display portions of the opposing alignment layers are differently oriented, the electric charge remains in large amounts near one alignment layer when a voltage is applied to a given pixel, while the liquid crystal display device is being used, and is then no longer applied. Even in a state where the voltage is no longer applied, the image that was previously displayed remains slightly visible due to the residual electric charge. When the alignment is divided by using ultraviolet rays, in particular, the one alignment layer includes a portion irradiated with ultraviolet rays and the other opposing alignment layer includes a portion that is not irradiated with ultraviolet rays. Therefore, a difference develops in the alignment treatment between the opposing portions of the two alignment layers, and the electric charge tends to remain in large amounts near one of the alignment layers.

SUMMARY OF THE INVENTION

It is an object of the present invention to provide a liquid crystal display device which prevents the occurrence of a state where an electric charge remains in large amounts near one of the opposing alignment layers and the image previously displayed remains slightly sticked, due to the residual electric charge, even after the voltage is no longer applied.

Another object of the present invention is to provide a liquid crystal display device, having divided alignments, which enables the opposing alignment layers to be simultaneously oriented with ease.

A further object of the present invention is to provide a liquid crystal display device in which the alignment treatment can be effected, instead of rubbing.

A still further object of the present invention is to provide a liquid crystal display device for which the rubbing can be effected in combination with other alignment treatments.

A liquid crystal display device according to the present invention comprises a pair of spaced and opposed substrates, an electrode and an alignment layer formed on one substrate, an electrode and an alignment layer formed on the other substrate, a liquid crystal filled between said pair of substrates, and means for delimiting pixel display portions and non-display portions at least partly surrounding said pixel display portions, wherein said alignment layers are treated for realizing alignment so that the alignment of liquid crystal molecules in said pixel display portions is controlled by the alignment of liquid crystal molecules in said non-display portions.

In this constitution, the pixel display portions and the non-display portions are alignment-treated in a different manner. In the pixel display portions, the opposing alignment layers are alignment-treated substantially in the same manner so that the electric charge will not remain in large amounts near either one of the alignment layers. In the non-display portions, the display is not affected even though the opposing alignment layers are not alignment-treated in substantially the same manner. It is, then, made possible to obtain a desired display in the pixel display portions by controlling the alignment of the liquid crystal molecules in the pixel display portions by the alignment of the liquid crystal molecules in the non-display portions.

The following constitution can be employed together with this constitution.

The alignment of the pixel display portion is different from the alignment of the non-display portion.

The alignment layers are made of a uniform alignment material.

The alignment layers are only rubbed in the pixel display portions, and are rubbed and irradiated with ultraviolet rays in the non-display portions.

The pixel display portions have at least two domains in which the liquid crystal molecules are oriented in the directions opposite to each other.

The alignment layers comprise at least two material layers in the non-display portions.

The non-display portions only are rubbed.

The alignment layers are rubbed in at least two directions in the non-display portions.

The electrode of one substrate comprises pixel electrodes, the one substrate is provided with a black matrix with a black stripe and openings, and the pixel display portions are defined by the openings of the black matrix.

Furthermore, a liquid crystal display device according to the present invention comprises a pair of spaced and opposed substrates, an electrode and an alignment layer formed on one substrate, an electrode and an alignment layer formed on the other substrate, and a liquid crystal held between said pair of substrates, wherein said alignment layer comprised an alignment layer having a vertically aligning property and realizes an alignment with a pretilt angle by the irradiation of non-polarized ultraviolet rays in an inclined direction.

According to this constitution, it has been found that the alignment having a pretilt angle can be realized by using a vertical alignment layer and by irradiating non-polarized ultraviolet rays, in an inclined direction, without rubbing.

The following constitution can be adopted together with this constitution.

The applied ultraviolet rays contain components having wavelengths equal to or shorter than 280 nm.

The degree of parallelism of ultraviolet rays is within ±10 degrees.

According to the present invention, furthermore, a liquid crystal display device comprises a pair of spaced and opposed substrates, an electrode and an alignment layer formed on one substrate, an electrode and an alignment layer formed on the other substrate, and a liquid crystal held between said pair of substrates, wherein said alignment layers are rubbed and are irradiated with ultraviolet rays in an inclined direction.

According to this constitution, a new alignment treatment can be effected relying on the combination of rubbing and irradiation with ultraviolet rays.

The following constitution can be adopted together with this constitution.

The alignment layers are uniformly rubbed and are irradiated with ultraviolet rays from tilted directions different for each of the domains.

The applied ultraviolet rays contain components having wavelengths shorter than 280 nm.

The degree of parallelism of ultraviolet rays is within ±10 degrees.

Furthermore, the present invention provides a liquid crystal display device comprising a pair of spaced and opposed substrates, an electrode and an alignment layer formed on one substrate, an electrode and an alignment layer formed on the other substrate, and a liquid crystal held between said pair of substrates, wherein said alignment layers realize an alignment with a pretilt angle of the liquid crystal molecules neighboring said alignment layers by the irradiation of ultraviolet rays, and said substrates are made of a material that absorbs ultraviolet rays irradiated for realizing the alignment.

Moreover, the present invention provides a liquid crystal display device comprising a pair of spaced and opposed substrates, an electrode and an alignment layer formed on one substrate, an electrode and an alignment layer formed on the other substrate, and a liquid crystal held between said pair of substrates, wherein the alignment layer of at least one of said substrates is treated so that the alignment layer is divided into a plurality of parallel extending stripe regions and that the direction of alignment of liquid crystal molecules in one region is opposite to the direction of alignment of liquid crystal molecules in the neighboring regions and the direction of alignment is parallel to the stripes.

The present invention further provides a liquid crystal display device comprising a pair of spaced and opposed substrates, an electrode and an alignment layer formed on one substrate, an electrode and an alignment layer formed on the other substrate, a liquid crystal filled held between said pair of substrates, and a plurality of pixels, wherein each pixel has four different alignment regions, and said four alignment regions are formed so that the liquid crystal molecules are oriented in four directions at 90 degrees relative to each other.

The present invention further provides a liquid crystal display device comprising a pair of spaced and opposed substrates, an electrode and an alignment layer formed on one substrate, an electrode and an alignment layer formed on the other substrate, and a liquid crystal held between said pair of substrates, wherein said alignment layer is treated to realize an alignment with a pretilt angle by irradiation with ultraviolet rays and formed so that one pixel has at least two regions having different threshold voltages.

According to this constitution, it is possible to realize the alignment of the liquid crystal by the irradiation of the ultraviolet rays, which is the easier means, and without using the rubbing (therefore, without the formation of pit-like rubbing traces which may be caused in the surface of the alignment layers by rubbing), and it is also possible to form a plurality of regions having different threshold voltages. Accordingly, it is possible to improve the viewing angle characteristic without increase in a production cost.

The present invention further provides a liquid crystal display device comprising a pair of spaced and opposed substrates, an electrode and an alignment layer formed on one substrate, an electrode and an alignment layer formed on the other substrate, and a liquid crystal filled between said pair of substrates, wherein said alignment layer is formed so that one pixel has four regions divided by a crosswise boundary line in which the alignments of the liquid crystal are mutually different, and a shading layer is provided to cover the crosswise boundary line.

According to this constitution, it is possible to prevent any occurrence of extremely bright portions at the crosswise boundary line dividing four regions.

The present invention further provides a quartered, vertically aligned liquid crystal display device comprising a pair of spaced and opposed substrates, an electrode and an alignment layer formed on one substrate, an electrode and an alignment layer formed on the other substrate, a liquid crystal filled between said pair of substrates, and polarizers arranged outside said pair of substrates, wherein said alignment layer is formed so that one pixel has four regions divided by a crosswise boundary line in which the alignments of the liquid crystal are mutually different, and said polarizers are arranged in a crossed-Nicol arrangement and in predetermined directions deviated in the range from 5 degrees to 20 degrees relative to the vertical direction, the horizontal direction, and the directions inclined by 45 degrees with respect to the vertical direction and the horizontal direction.

BRIEF DESCRIPTION OF THE DRAWINGS

The present invention will become more apparent from the following description of the preferred embodiments, with reference to the accompanying drawings, in which:

FIGS. 2A to 2C are cross-sectional views illustrating the liquid crystal display device of FIG. 1;

FIG. 40 is a view showing the four alignments obtained by the arrangement of FIG. 39;

FIG. 41 is a view showing the two alignment layers obtained by the irradiation of ultraviolet rays in FIG. 32, which are so arranged that the stripes are in parallel with each other;

DESCRIPTION OF THE PREFERRED EMBODIMENTS

Figure 1:
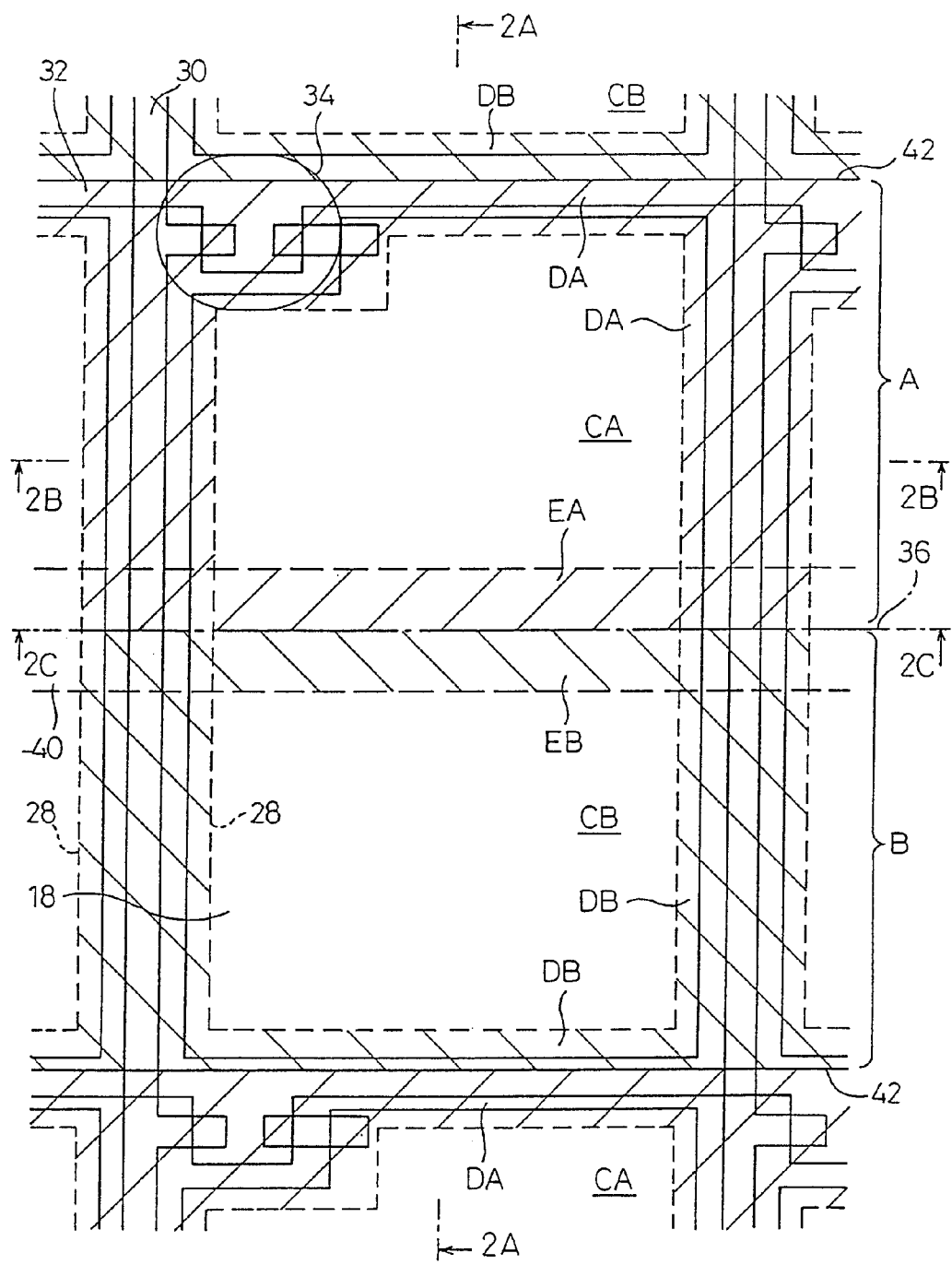
FIG. 1 is a plan view schematically illustrating a portion of a liquid crystal display device according to the first embodiment of the present invention.
Figure 3:
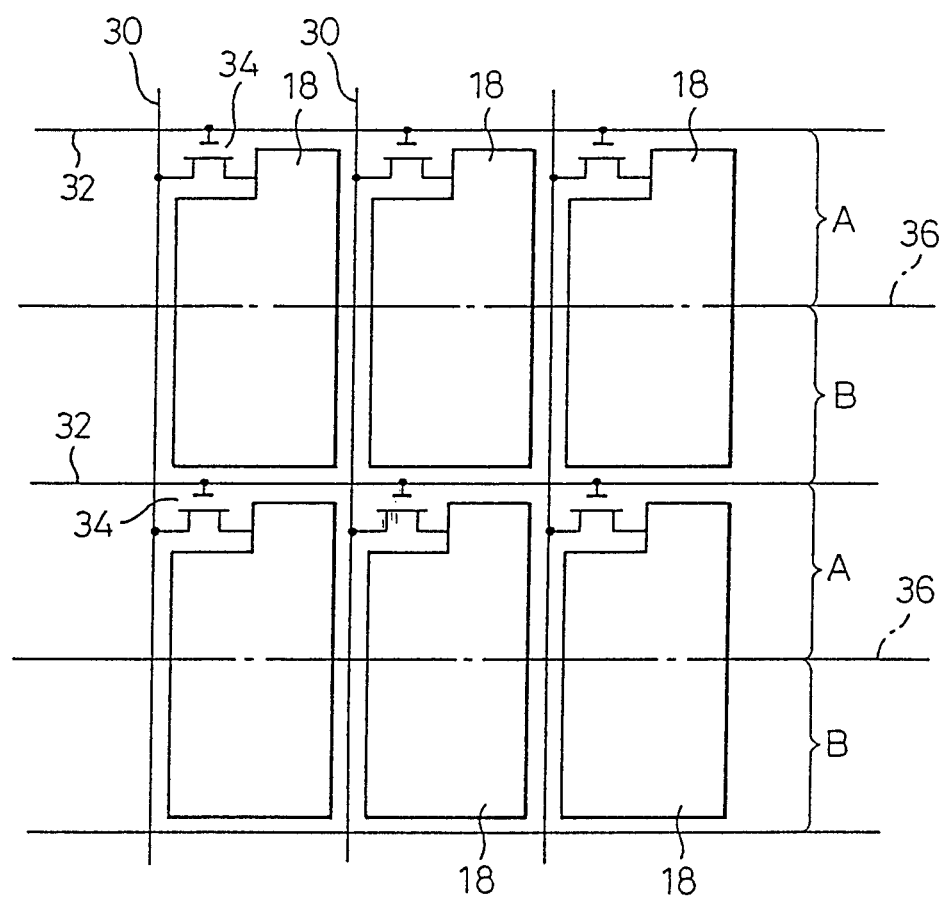
FIG. 3 is a view illustrating an active matrix formed on one substrate of FIGS. 2A to 2C.

FIG. 1 is a plan view schematically illustrating a portion of a liquid crystal display device according to the first embodiment of the present invention, FIGS. 2A to 2C are cross-sectional views illustrating the liquid crystal display device of FIG. 1, and FIG. 3 is a view illustrating an active matrix formed on one substrate of FIG. 2. In particular, FIG. 2A is a cross-sectional view taken along the line 2A-2A in FIG. 1, FIG. 2B is a cross-sectional view taken along the line 2B-2B in FIG. 1, and FIG. 2C is a cross-sectional view taken along the line 2C-2C in FIG. 1.

In FIGS. 2A to 2C, a liquid crystal display device 10 is constituted by a pair of spaced and opposed transparent glass substrates 12 and 14, and a liquid crystal layer 16 held between these substrates 12 and 14. On one substrate (lower substrate) 12 are formed transparent pixel electrodes 18 and a transparent alignment layer 20, and on the other substrate (upper substrate) 14 are formed a transparent common electrode 22 and a transparent alignment layer 24. The pixel electrodes 18 on the lower substrate 12 are formed together with an active matrix shown in FIG. 3. On the upper substrate 14 are further formed a color filter 26 and a black matrix 28. Polarizers 29A and 29B are arranged outside the lower and upper substrates 12 and 14.

Referring to FIG. 3, the active matrix includes gate bus lines 32, drain bus lines 30, and TFTs (thin-film transistors) 34. The TFTs 34 are connected to the gate bus line 32 and to the drain bus line 30, and are further connected to the pixel electrode 18. Alignment division is adopted to the liquid crystal display device 10, and each pixel electrode 18 is divided into two domains A and B by a line 36 passing nearly through the center of the pixel electrode 18.

In FIGS. 2A to 2C, the color filter 26 includes color elements R, G and B, and the pixel electrodes 18 are arranged in correspondence to the color elements R, G and B of the color filter 26. Openings 28a of the black matrix 28 are arranged to overlap the pixel electrodes 18. Each opening 28a in the black matrix 28 has an area smaller than an area of the pixel electrode 18.

Under the pixel electrode 18 is provided a storage capacity electrode 40 passing nearly through the center of the pixel electrode 18. The layer 27 is an insulating layer. The bus lines 30 and 32, the storage capacity electrode 40 and the pixel electrodes 18 are electrically separated from each other by insulating layers (not shown) disposed between them.

The openings 28a in the black matrix 28 define pixel display portions C. The pixel display portions C are surrounded by non-display portions defined by black stripes of the black matrix 28. The storage capacity electrode 40 constitutes a non-display portion E. FIG. 2 also shows two domains A and B divided by the line 36 passing through the center of each of the pixel electrodes 18. The line 36 passes through the center of the storage capacity electrode 40.

FIG. 1 is a view illustrating one pixel electrode 18 of FIG. 3 and its surrounding regions, and also illustrates elements of FIGS. 2A to 2C. In FIG. 1 a portion of the domain A of FIGS. 2A to 2C overlapping the pixel display portion C is denoted by CA, a portion of the domain A of FIGS. 2A to 2C overlapping the non-display portion D is denoted by DA, and a portion of the domain A of FIGS. 2A to 2C overlapping the non-display portion E is denoted by EA. Similarly, a portion of the domain B of FIGS. 2A to 2C overlapping the pixel display portion C is denoted by CB, a portion of the domain B of FIGS. 2A to 2C overlapping the non-display portion D is denoted by DB, and a portion of the domain B of FIGS. 2A to 2C overlapping the non-display portion E is denoted by EB.

In FIG. 1, the pixel display portions CA and CB are represented by white areas, and the non-display portions DA, EA, DB and EB are represented by hatched areas. The hatching direction of the non-display portions DA and EA is opposite to the hatching direction of the non-display portions DB and EB, indicating that these portions are oriented in a different manner. That is, the pixel display portion C and the non-display portions D and E are divided into two domains CA, DA, EA: CB, DB, EB by the center line of the storage capacity electrode 40 and by the center lines of black stripes of the black matrix 28.

Figure 4:
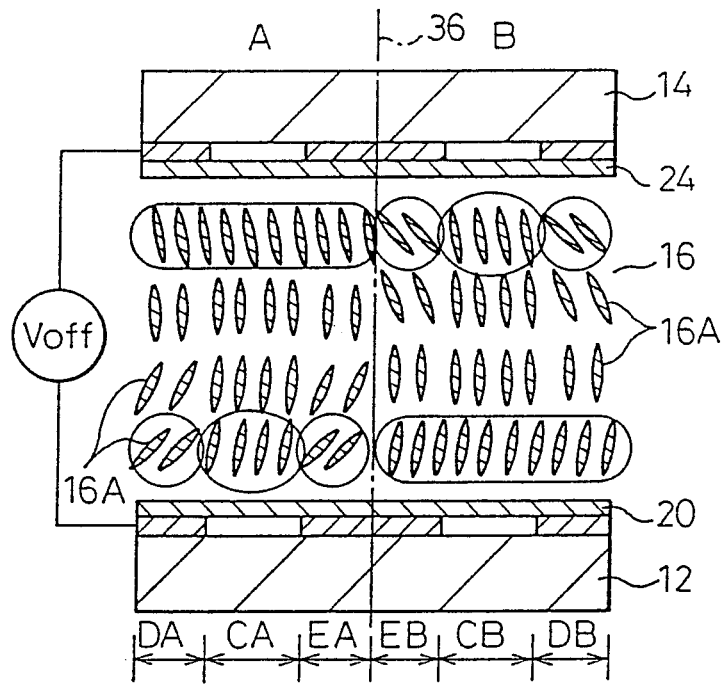
FIG. 4 is a cross-sectional view of the liquid crystal display device, for explaining the alignment treatment for the alignment layers of FIG. 1.
Figure 5:
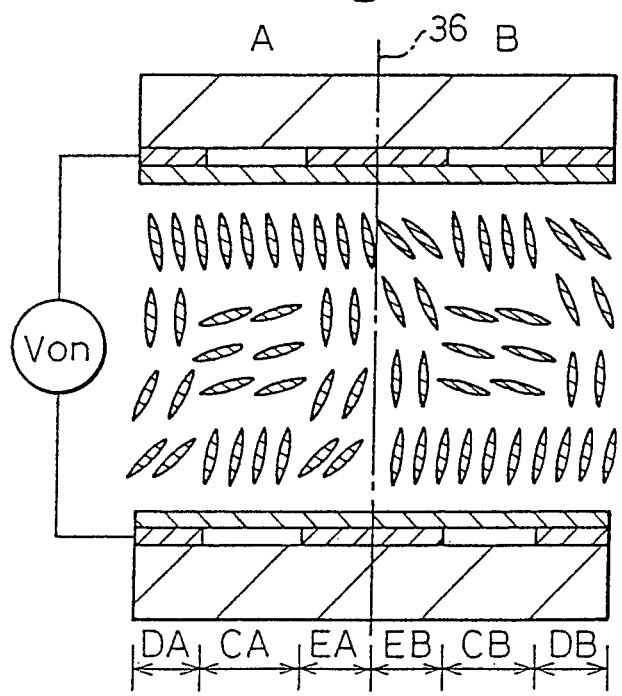
FIG. 5 is a cross-sectional view of the liquid crystal device of FIG. 4 when the voltage is applied.

FIGS. 4 and 5 are views illustrating an example of the alignment treatment of FIG. 1, wherein FIG. 4 illustrates a state of the liquid crystal when no voltage is applied, and FIG. 5 illustrates a state of the liquid crystal when a voltage is applied. These drawings show alignment layers 20 and 24, but either do not show other pixel electrodes and the black matrix or show them in a simplified manner. FIGS. 4 and 5 illustrate an example in which the alignment layers 20 and 24 are vertical alignment layers. To simplify the illustration, the liquid crystal molecules 16A are all shown in the same plane, neglecting twist.

One domain A will be described with reference to FIG. 4. The liquid crystal molecules 16A near the lower alignment layer 20 are pretilted at a small pretilt angle (e.g., 85°) in the non-display portions DA and EA, and are pretilted at a large pretilt angle (e.g., 89°) in the pixel display portion CA. The liquid crystal molecules 16A near the upper, opposing alignment layer 24 are uniformly pretilted at a large pretilt angle (e.g., 89°) in the non-display portions DA, EA and in the pixel display portion CA.

The pretilt direction of the liquid crystal molecules 16A close to the lower alignment layer 20 is opposite to the pretilt direction of the liquid crystal molecules 16A close to the upper alignment layer 24. In this example using the vertical alignment layers, the liquid crystal 16 as a whole is in a bend-alignment between the lower alignment layer 20 and the upper alignment layer 24.

In the pixel display portion CA, the pretilt angle of the liquid crystal molecules 16A near the lower alignment layer 20 and the pretilt angle of the liquid crystal molecules 16A near the upper alignment layer 24 are nearly the same, and are in a bend-alignment. If the pixel display portion CA of such an alignment is independently present, it is not certain that the liquid crystal molecules 16A intermediately positioned between the upper alignment layer 20 and the lower alignment layer 24 are definitely tilted, according to the pretilt angle of the liquid crystal molecules 16A close to the lower alignment layer 20 or to the pretilt angle of the liquid crystal molecules 16A close to the upper alignment layer 24, when a voltage is applied; i.e., the liquid crystal molecules 16A are not tilted in a predetermined direction. In order to place the pixel display portion CA in such an unstable state, it is possible that the pixel display portion CA is not rubbed.

In the non-display portions DA and EA, on the other hand, the liquid crystal molecules 16A close to the lower alignment layer 20 are pretilted at a small pretilt angle, and the liquid crystal molecules 16A close to the upper alignment layer 24 are pretilted at a large pretilt angle. When the liquid crystal molecules 16A are pretilted at different pretilt angles close to the upper and lower alignment layers 20 and 24, the liquid crystal molecules 16A intermediately positioned between the upper and lower alignment layers 20 and 24 are tilted according to the alignment of a smaller pretilt angle when a voltage is applied thereto though they may have been in a bend-alignment.

Figure 6:
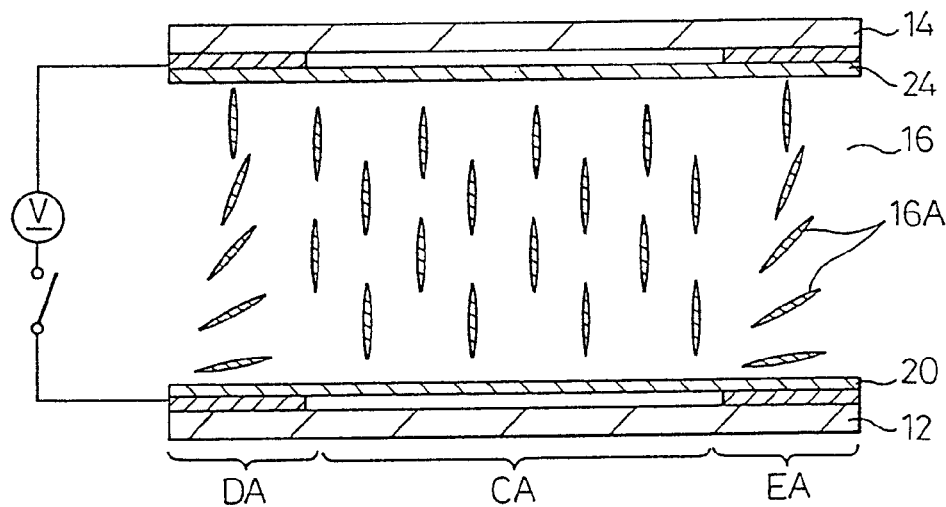
FIG. 6 is a view illustrating the first stage of behavior of the liquid crystal molecules in one domain in FIG. 5.
Figure 7:
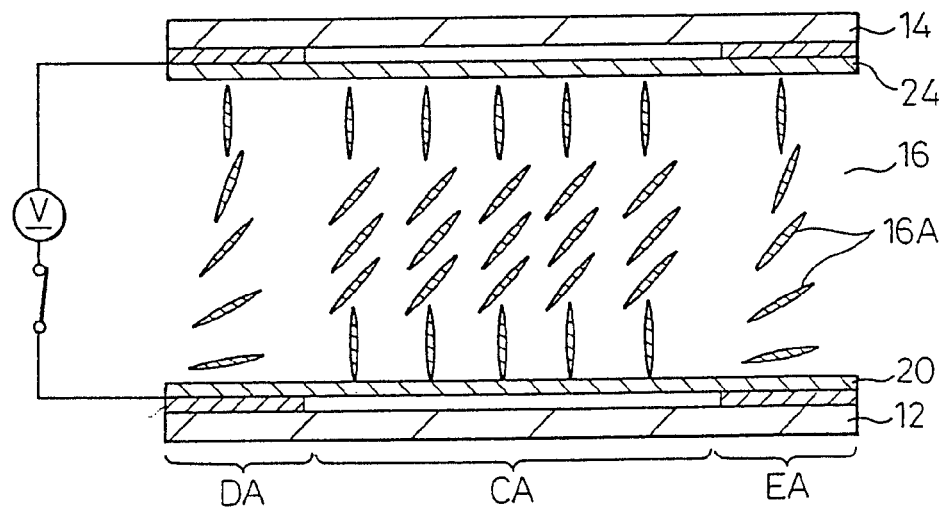
FIG. 7 is a view illustrating the second stage of behavior of the liquid crystal molecules in FIG. 5.

In the non-display portions DA and EA as shown in FIG. 5, when a voltage is applied, the liquid crystal molecules 16A are tilted in the right-end upper direction according to the alignment treatment of the lower alignment layer 20. This state is shown in an exaggerated manner in FIG. 6. It is not certain in which direction the liquid crystal molecules 16A are tilted in the pixel display portion CA. However, the pixel display portion CA is surrounded by the non-display portions DA and EA. Therefore, the liquid crystal molecules 16A in the pixel display portion CA are controlled by the alignment of liquid crystal molecules 16A in the non-display portions DA and EA, and are tilted in a direction in which the liquid crystal molecules 16A in the non-display portions DA and EA are tilted upon the application of the voltage. This state is shown in FIG. 7 in an exaggerated manner.

Here, what is important is that both the lower alignment layer 20 and the upper alignment layer 24 are alignment-treated in the same manner in the pixel display portion CA. When a symmetrical AC voltage is applied and is then interrupted, therefore, there occurs no difference between the electric charge remaining near the lower alignment layer 20 and the electric charge remaining near the upper alignment layer 24, making it possible to prevent the occurrence of sticking of an image. In the non-display portions DA and EA, there exists a difference between the alignment treatments and there may occur a difference between the residual electric charges. However, the difference occurring in the non-display portions does not affect the formation of an image.

The same also holds true in the domain B provided the relationship of the alignment between the lower alignment layer 20 and the upper alignment layer 24 is reversed. In FIG. 4, the liquid crystal molecules 16A close to the lower alignment layer 20 are uniformly pretilted at a large pretilt angle (e.g., 89°) in the non-display portions DB, EB and in the pixel display portion CB. The liquid crystal molecules 16A close to the upper opposing alignment layer 24 are pretilted at a small pretilt angle (e.g., 85°) in the non-display portions DB and EB, and are pretilted at a large pretilt angle (e.g., 89°) in the pixel display portion CB.

In this case, too, the pretilt direction of liquid crystal molecules 16A near the lower alignment layer 20 is opposite to the pretilt direction of liquid crystal molecules 16A near the upper alignment layer 24, and the liquid crystal layer 16 between the lower alignment layer 20 and the upper alignment layer 24 are in a bend-alignment as a whole.

In the pixel display portion CB, the pretilt angle of liquid crystal molecules 16A near the lower alignment layer 20 and the pretilt angle of the liquid crystal molecules 16A near the upper alignment layer 24 are nearly the same and are in a bend-alignment. When the pixel display portion CB of such an alignment is independently present, it is not certain that the liquid crystal molecules 16A positioned intermediately between the upper alignment layer 20 and the lower alignment layer 24 may be tilted according to one of the pretilt angle of the liquid crystal molecules 16A close to the lower alignment layer 20 or the pretilt angle of the liquid crystal molecules 16A close to the upper alignment layer 24 when a voltage is applied; i.e., the liquid crystal, molecules 16A are not tilted in a predetermined direction.

In the non-display portions DB and EB, on the other hand, the liquid crystal molecules 16A close to the lower alignment layer 20 are pretilted at a large pretilt angle, and the liquid crystal molecules 16A close to the upper alignment layer 24 are pretilted at a small pretilt angle. When the voltage is applied, therefore, the liquid crystal molecules 16A positioned between the upper and lower alignment layers 20 and 24 are tilted according to the alignment of a smaller pretilt angle.

In the non-display portions DB and EB as shown in FIG. 5, therefore, when the voltage is applied, the liquid crystal molecules 16A are tilted in the right-end lower direction. It is not certain in which direction the liquid crystal molecules 16A are tilted in the pixel display portion CB by themselves. However, the pixel display portion CB is surrounded by the non-display portions DB and EB. Therefore, the liquid crystal molecules 16A in the pixel display portion CB are controlled by the alignment of liquid crystal molecules 16A in the non-display portions DB and EB, and are tilted in a direction in which the liquid crystal molecules 16A in the non-display portions DB and EB are tilted.

Even in this case, both the lower alignment layer 20 and the upper alignment layer 24 are alignment-treated in the same manner in the pixel display portion CB. When a voltage is applied and then interrupted, therefore, there occurs no difference between the electric charge remaining near the lower alignment layer 20 and the electric charge remaining near the upper alignment layer 24, making it possible to prevent the occurrence of printing of image. In the non-display portions DB and EB, there exists a difference between the alignment treatments and there may occur a difference between the residual electric charges. However, the difference occurring in the non-display portions does not affect the formation of an image.

When the domain A is compared with the domain B, the liquid crystal molecules 16A in the domain A are tilted in the right-end upper direction as a whole and the liquid crystal molecules 16A in the domain B are tilted in the right-end lower direction as a whole. This makes it possible to obtain the effect of the alignment division.

Figure 8:
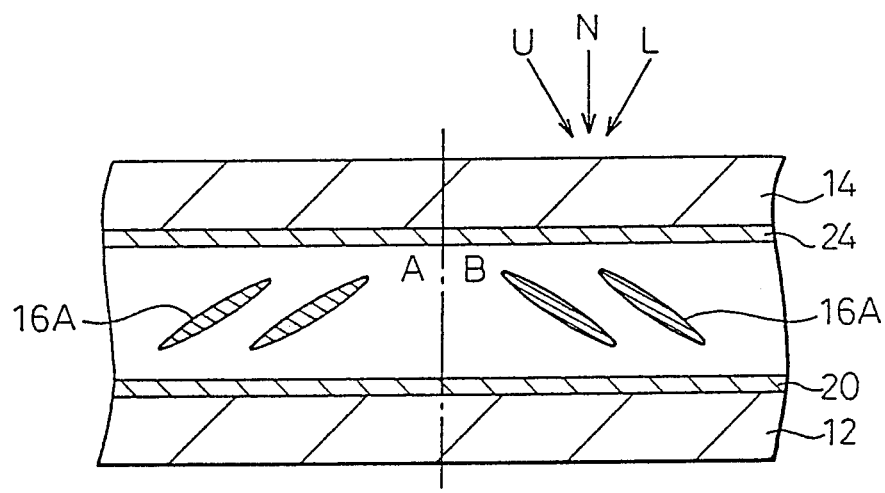
FIG. 8 is a cross-sectional view of the liquid crystal display device for explaining the alignment division.
Figure 9A:
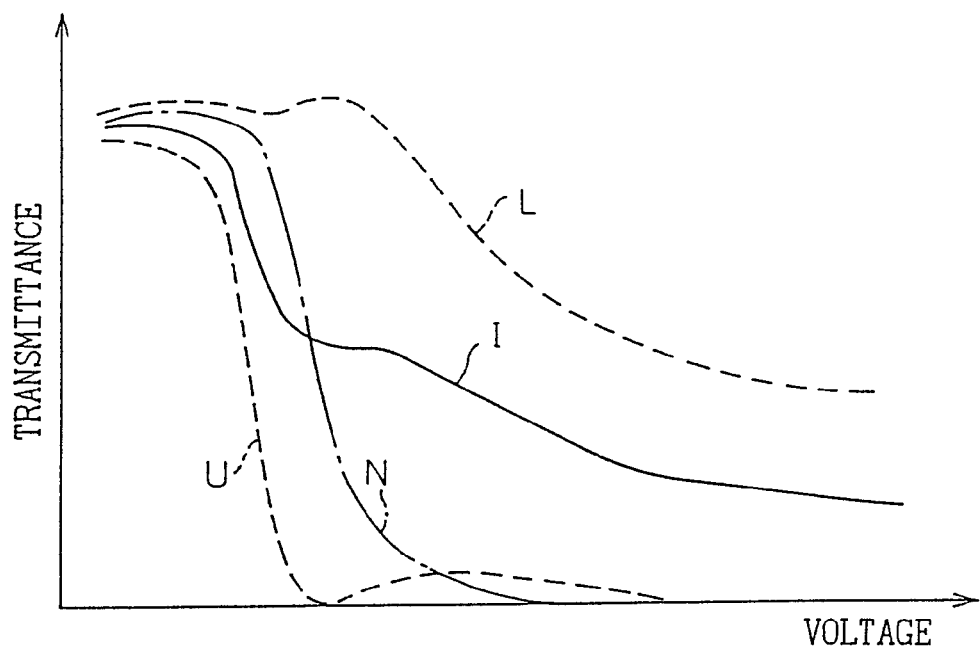
FIGS. 9A and 9B are views showing visual angle characteristics accomplished by the alignment division of FIG. 8.
Figure 9B:
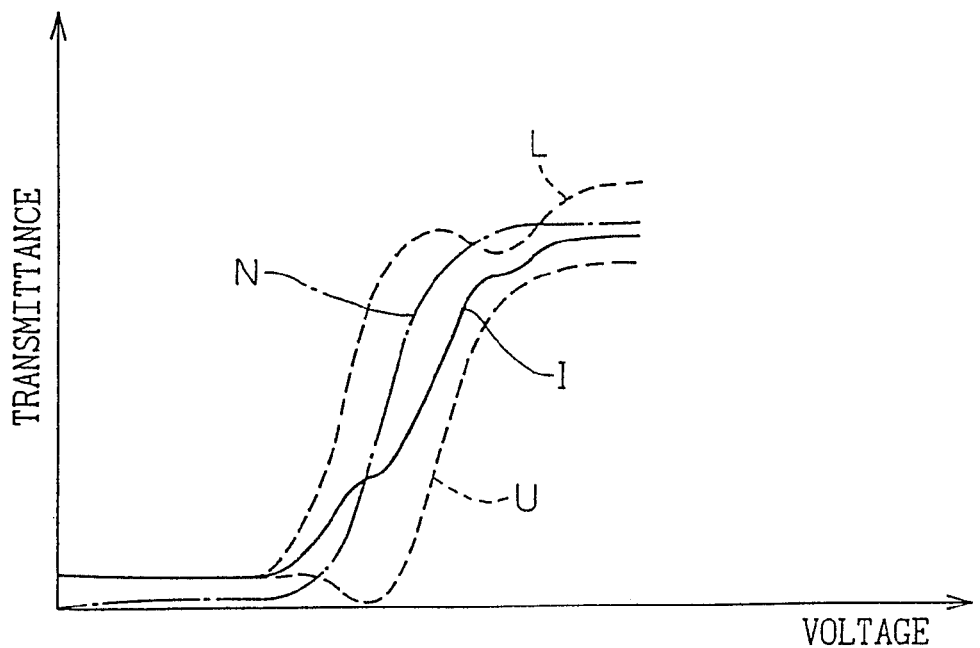

FIGS. 8 and 9A-9B are views illustrating the effect of the alignment division. In FIG. 8, the liquid crystal molecules 16A between the upper and lower alignment layers 20 and 24 are tilted in the right-end upper direction in the domain A, and the liquid crystal molecules 16A between the upper and lower alignment layers 20 and 24 are tilted in the right-end lower direction in the domain B. This holds true when the horizontal alignment layers are used and when the vertical alignment layers are used. Use of the horizontal alignment layers is different from the use of the vertical alignment layers in the following sense. That is, a small pretilt angle when the vertical alignment layers are used is equivalent to a large pretilt angle when the horizontal alignment layers are used, and the liquid crystal having a dielectric constant of negative anisotropy is preferred in the case of the vertical alignment layers and the liquid crystal having a dielectric constant of positive anisotropy is preferred in the case of the horizontal alignment layers.

FIGS. 9A and 9B are views illustrating visual angle characteristics when the domain B of FIG. 8 is viewed in the directions of arrows U, N and L. FIG. 9A illustrates the case when the horizontal alignment layers are used, and FIG. 9B illustrates the case when the vertical alignment layers are used. Referring, for example, to FIG. 9A, when the domain B is viewed from the direction of arrow N, the transmission decreases in proportion to an increase in the voltage as represented by a curve N, making it possible to obtain a favorable display. When the domain B is viewed in the direction of arrow U, the transmission sharply drops with an increase in the voltage as represented by a curve U, so that the display becomes blackish. When the domain B is viewed in the direction of arrow L, the transmission does not drop much with an increase in the voltage as represented by a curve L, and the display becomes whitish. In the TN-type liquid crystal display device as described above, the viewing angle characteristics change depending upon the direction in which the liquid crystal molecules 16A are tilted (quality of display changes depending upon the direction of view).

The direction in which the liquid crystal molecules 16A are tilted in the domain A is opposite to the direction in which the liquid crystal molecules 16B are tilted in the domain B and, hence, the viewing angle characteristics of the domain A become opposite to the viewing angle characteristics of the domain B. That is, the characteristics of the domain A viewed in the direction of arrow U is the same as the characteristics of the domain B viewed in the direction of arrow L. Therefore, the characteristics when the domain A and the domain B are simultaneously viewed in the direction of arrow U become as represented by a curve I which is obtained by the average of the curves U and L of FIG. 9A. The characteristics of the curve I approach the characteristics of the curve N, and a relatively favorable display is obtained no matter from which direction it is viewed. This also holds true even in the case of FIG. 9B.

To effect the alignment division, therefore, the direction in which the liquid crystal molecules 16A, positioned in the middle of the domain A, are tilted should be set to be opposite to the direction in which the liquid crystal molecules 16A, positioned in the middle of the domain B, are tilted. In the constitution of FIG. 1, the non-display regions DA and EA should be so alignment-treated that the direction in which the liquid crystal molecules 16A, in the pixel display region CA, are tilted is the same as the direction in which the liquid crystal molecules 16A, in the domain A, are tilted and no limitation is imposed on the means for alignment treatment. Similarly, the non-display regions DB and EB should be so alignment-treated that the direction in which the liquid crystal molecules 16A, in the pixel display region CB, are tilted is the same as the direction in which the liquid crystal molecules 16A, in the domain B, are tilted and no limitation is imposed on the means for alignment treatment.

Figure 10:
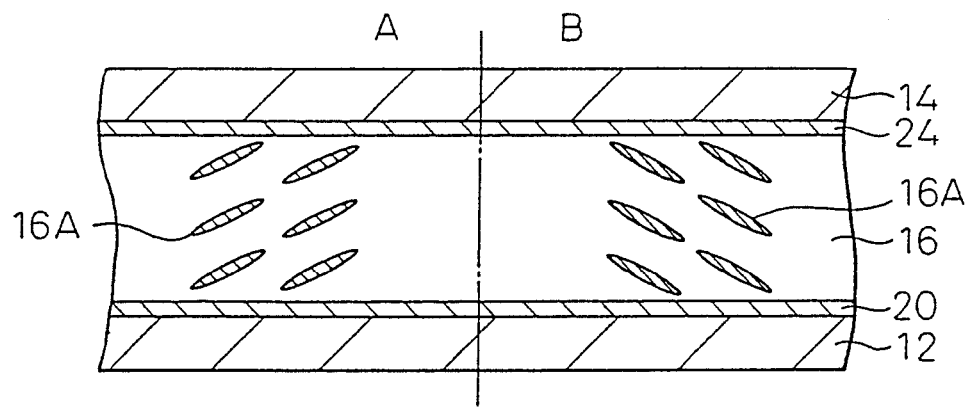
FIG. 10 is a view illustrating a fundamental example of the alignment division.
Figure 11:
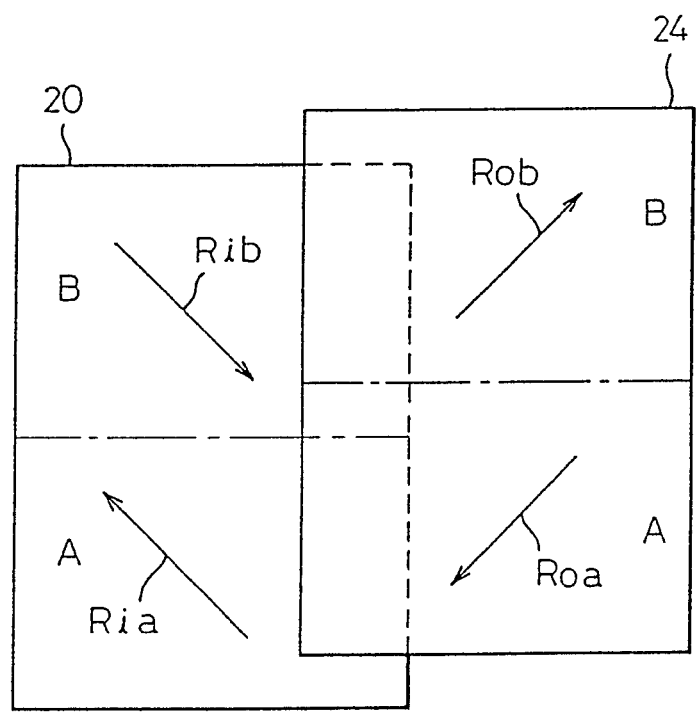
FIG. 11 is a view illustrating the alignment treatment for obtaining the alignment division of FIG. 10.

FIGS. 10 and 11 are views illustrating an example of a basic alignment treatment for effecting the alignment division. This example employs horizontal alignment layers. The lower alignment layer 20 is rubbed in a direction Ria in the domain A and is rubbed in a direction Rib in the domain B. The upper alignment layer 24 is rubbed in a direction Rob in the domain A and is rubbed in a direction Rob in the domain B. The rubbing direction Ria is opposite to the rubbing Rib, and the rubbing direction Roa is opposite to the rubbing Rob.

To effect the rubbing in the above-mentioned manner, therefore, the alignment layers 20 and 24 are rubbed two times using a mask.

Then, in the domain A, the liquid crystals are twisted from the rubbing direction Ria of the lower alignment layer 20 toward the rubbing direction Roa of the upper alignment layer 24, and the liquid crystal molecules 16A positioned between the lower alignment layer 20 and the upper alignment layer 24 are tilted, for example, in the right-end upper direction as shown in FIG. 10. In the domain B, the liquid crystals are twisted from the rubbing direction Rib of the lower alignment layer 20 toward the rubbing direction Rob of the upper alignment layer 24, and the liquid crystal molecules 16A positioned between the lower alignment layer 20 and the upper alignment layer 24 are oriented, for example, in the left-end upper direction as shown in FIG. 10.

The above-mentioned alignment treatment can be executed for the non-display regions DA, EA, DB and EB shown in FIG. 1. The pixel display regions CA and CB are in a bend-alignment or in a spray-alignment. In an extreme case, the pixel display regions CA and CB may not be subjected to the alignment treatment such as rubbing or the like, since it is possible to arrange that it is not certain how the liquid crystals change in the pixel display regions CA and CB. This tendency is remarkable in the case of vertical alignment layers.

Figure 12:
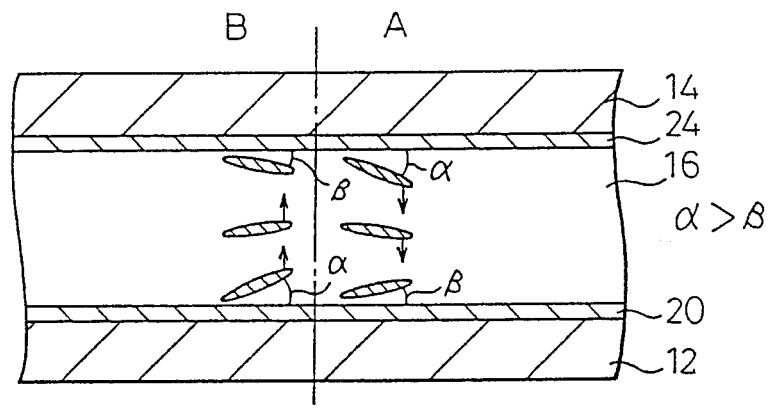
FIG. 12 is a view illustrating another example of the alignment division.
Figure 13:
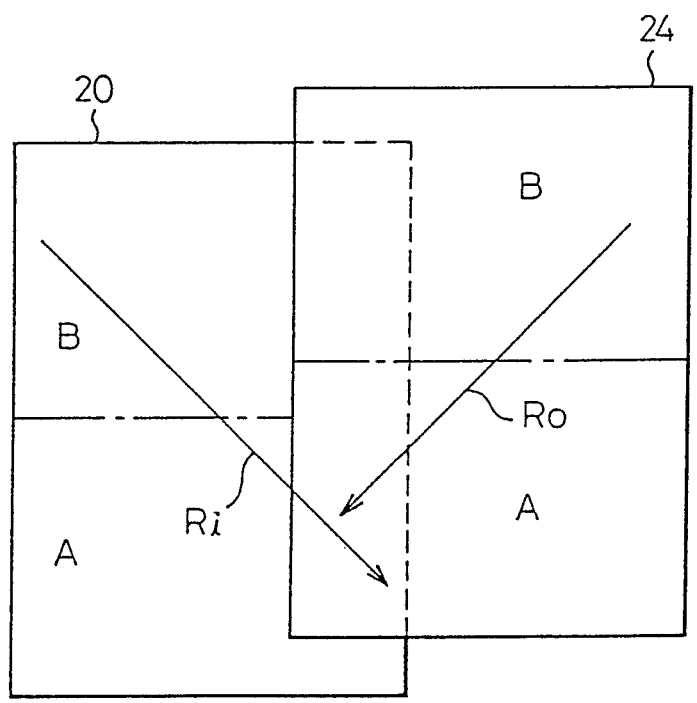
FIG. 13 is a view illustrating the alignment treatment for obtaining the alignment division of FIG. 12.

FIGS. 12 and 13 are views illustrating another example of the alignment treatment for effecting the alignment division. In FIG. 13, the lower alignment layer 20 is rubbed iii the direction Ri in both the domain A and the domain B, and the upper alignment layer 24 is rubbed in the direction Ro in both the domain A and the domain B. Referring to FIG. 12, the lower alignment layer 20 is alignment-treated so that the liquid crystal molecules 16A close to the lower alignment layer 20 are pretilted at a large pretilt angle $\alpha$ in the domain B and are pretilted at a small pretilt angle $\beta$ in the domain A. The upper alignment layer 24 is alignment-treated so that the liquid crystal molecules 16A close to the upper alignment layer 24 are pretilted at a large pretilt angle $\alpha$ in the domain A and are pretilted at a small pretilt angle $\beta$ in the domain B.

In the domains A and B of the opposing alignment layers 20 and 24, therefore, a large pretilt angle $\alpha$ is created near one alignment layer and a small pretilt angle $\beta$ is created near the other alignment layer. In this case, the intermediate liquid crystal molecules 16A between the opposing alignment layers 20 and 24 are tilted according to the liquid crystal molecules 16A having a large pretilt angle $\alpha$. In the domain A, therefore, the intermediate liquid crystal molecules 16A are tilted in the same direction as that of the liquid crystal molecules 16A near the upper alignment layer 24, and in the domain B, the intermediate liquid crystal molecules 16A are tilted in the same direction as that of the liquid crystal molecules 16A near the lower alignment layer 20. In the domains A and B, therefore, the intermediate liquid crystal molecules 16A are tilted in the opposite directions to accomplish the alignment division.

The alignment treatment of FIGS. 4 and 5 complies with the treatment for accomplishing the alignment division of FIGS. 12 and 13. The difference is simply whether the horizontal alignment layers are used or the vertical alignment layers are used. The above-mentioned alignment treatment is executed for the non-display regions DA, EA, DB and EB of FIG. 1, and the pixel display regions CA and CB are in a bend-alignment or spray-alignment.

Figure 14:
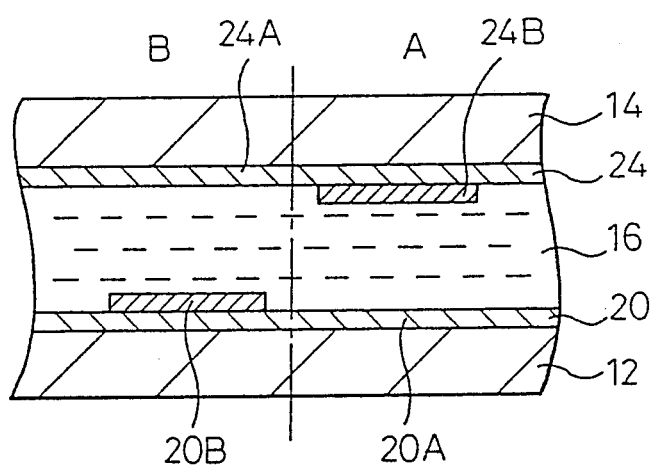
FIG. 14 is a view of an example for realizing the alignment division of FIG. 12.

FIG. 14 is a view illustrating a means for realizing different pretilt angles $\alpha$ and $\beta$ of FIG. 12. In this example, the alignment layer 20 is formed by two alignment layers 20A and 20B, and the alignment layer 24 is formed by two alignment layers 24A and 24B. The upper alignment layers 20B and 24B are patterned depending upon the sizes of the domains A and B, permitting the lower alignment layers 20A and 24A to be exposed through the openings. In the domain A, the alignment layer 20A and the alignment layer 24B are opposed to each other and in the domain B, the alignment layer 20B and the alignment layer 24A are opposed to each other.

The alignment layers 20B and 24B are made of a material of which the liquid crystal molecules 16A are oriented at a pretilt angle α upon predetermined rubbing, and the alignment layers 20A and 24A are made of a material of which the liquid crystal molecules 16A are oriented at a pretilt angle β upon similar rubbing. That is, different pretilt angles α and β are realized by using different alignment materials. Therefore, the alignments of FIG. 12 are obtained when the alignment layers 20 and 24 constituted as shown in FIG. 14 are rubbed as shown in FIG. 13.

Figure 15A:
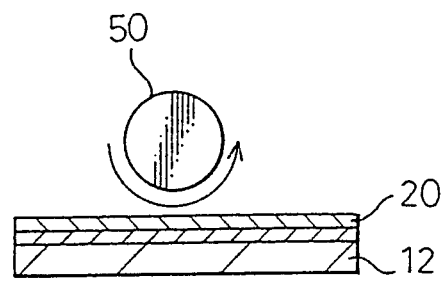
FIGS. 15A to 15C are views of another example for realizing the alignment division of FIG. 12.
Figure 15B:
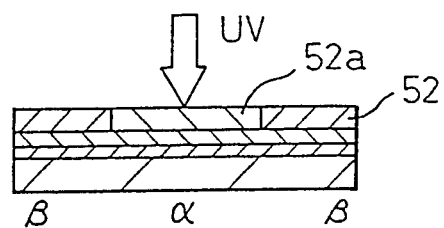
Figure 15C:
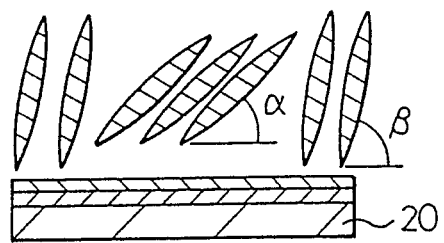

FIGS. 15A to 15C illustrate another means for realizing the different pretilt angles α and β of FIG. 12. In this example, the alignment layers 20 and 24 are formed of uniform alignment layers, but are irradiated with ultraviolet rays to change the pretilt angles. Referring to FIG. 15A, the whole surface of the alignment layer 20(24) is rubbed by a rubbing roll 50. Referring to FIG. 15B, the alignment layer is irradiated with ultraviolet rays (UV), using a mask 52 having openings 52a. Referring to FIG. 15C, when the rubbed alignment layer 20(24) is partly irradiated with ultraviolet rays, the liquid crystal molecules 16A are pretilted at a pretilt angle α in the portion where the alignment layer 20(24) is irradiated with ultraviolet rays, and the liquid crystal molecules 16A are pretilted at a pretilt angle B in the portion where the alignment layer 20(24) is not irradiated with ultraviolet rays. The pretilt angle α is smaller than the pretilt angle β in both cases where the vertical alignment layers are used and the horizontal alignment layers are used.

Figure 16:
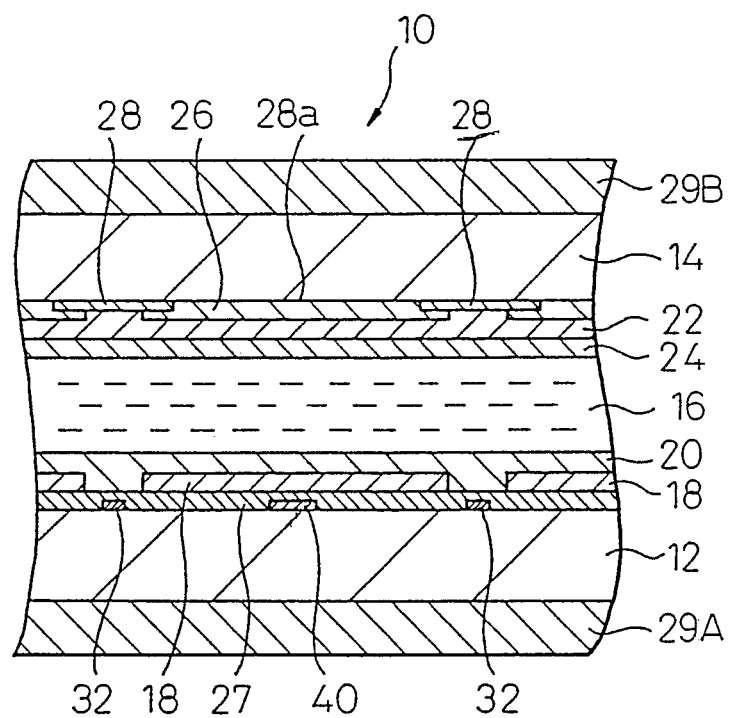
FIG. 16 is a cross-sectional view of the liquid crystal display device according to the second embodiment of the present invention.

FIG. 16 is a view illustrating the second embodiment of the present invention. Like the embodiment of FIG. 2, the liquid crystal display device 10 comprises a pair of spaced and opposed transparent glass substrates 12 and 14 and a liquid crystal layer 16 held between these substrates 12 and 14. On one substrate 12 are formed transparent pixel electrodes 18 and a transparent alignment layer 20, and on the other substrate 14 are formed a transparent common electrode 22 and a transparent alignment layer 24. On the upper substrate 14 are further formed a color filter 26 and a black matrix 28. The color filters 26 include color elements R, G and B. There is further provided a storage capacity electrode 40. The alignment layers realize alignments with pretilt angles, which are established without rubbing.

Figure 17:
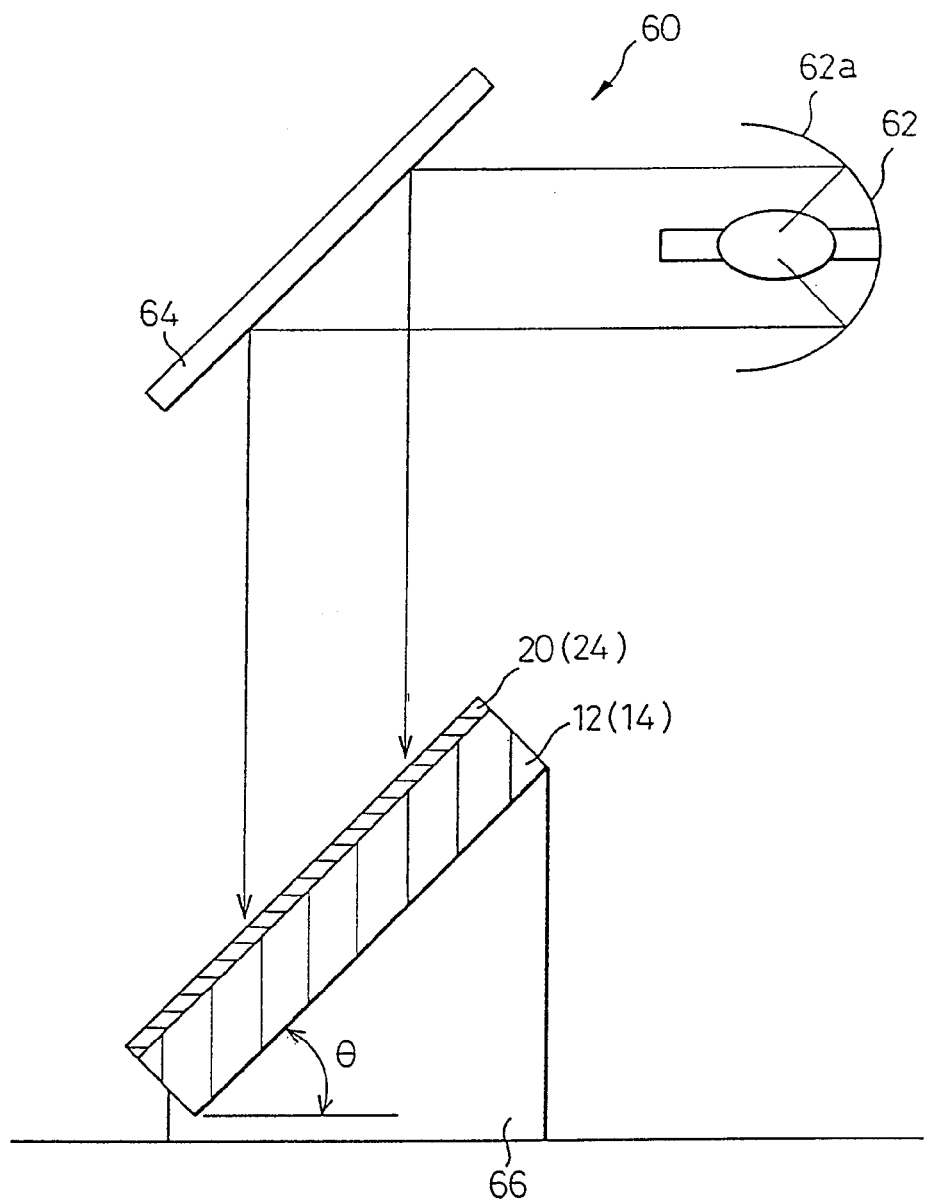
FIG. 17 is a view illustrating an apparatus for alignment-treating the alignment layers of FIG. 16.

FIG. 17 illustrates an apparatus 60 for alignment-treating the alignment layer 20(24). The apparatus 60 for alignment treatment includes a source of light 62 for irradiating non-polarized ultraviolet rays, a mirror 64, and a holder 66 for supporting the substrate 12(14) provided with the alignment layer 20(24). The holder 66 supports the substrate 12(14) at an angle of 45 degrees with respect to the optical axis. In other words, parallel ultraviolet rays from the source of light 62 are made incident to the alignment layer 20(24) at an angle of 45.

Figure 21:
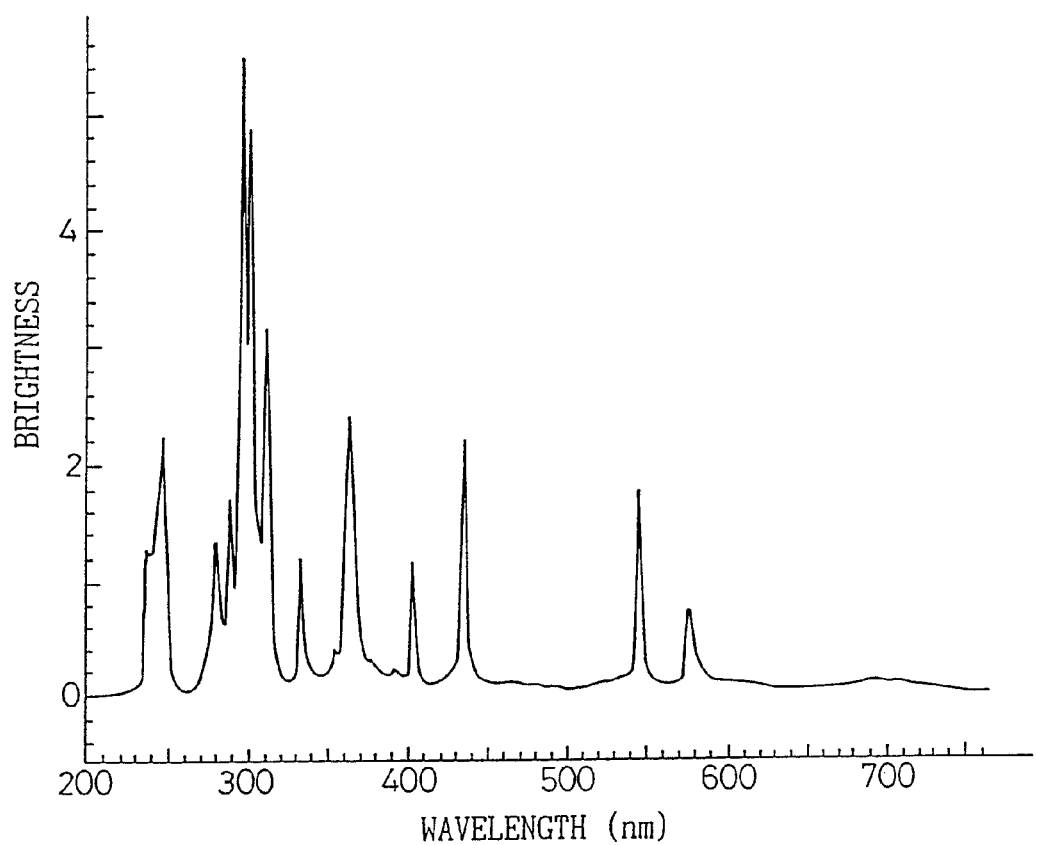
FIG. 21 is a view illustrating a spectrum distribution of ultraviolet rays used in the apparatus of FIG. 17.

The source of light 62 includes a parabolic reflector 62a and emits generally parallel non-polarized ultraviolet rays. FIG. 21 shows a preferred spectral distribution of the source of light 62. The spectral distribution has a peak near the wavelength 250 nm. It is desired that the emitted ultraviolet rays contain components having wavelengths shorter than 280 nm. The alignment layer 20(24) treated by the apparatus 60 for alignment treatment is a vertical alignment layer having a vertical aligning property, and realizes alignment with a pretilt angle by the irradiation of non-polarized ultraviolet rays in an inclined direction.

The alignment layer 20(24) is a vertical alignment layer having a vertical aligning property in a state where it is applied and baked, and an example of the structure thereof is described below.

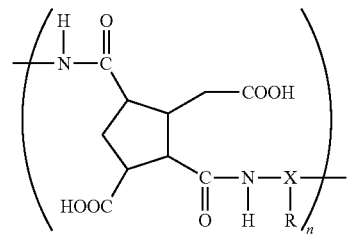

Figure 18:
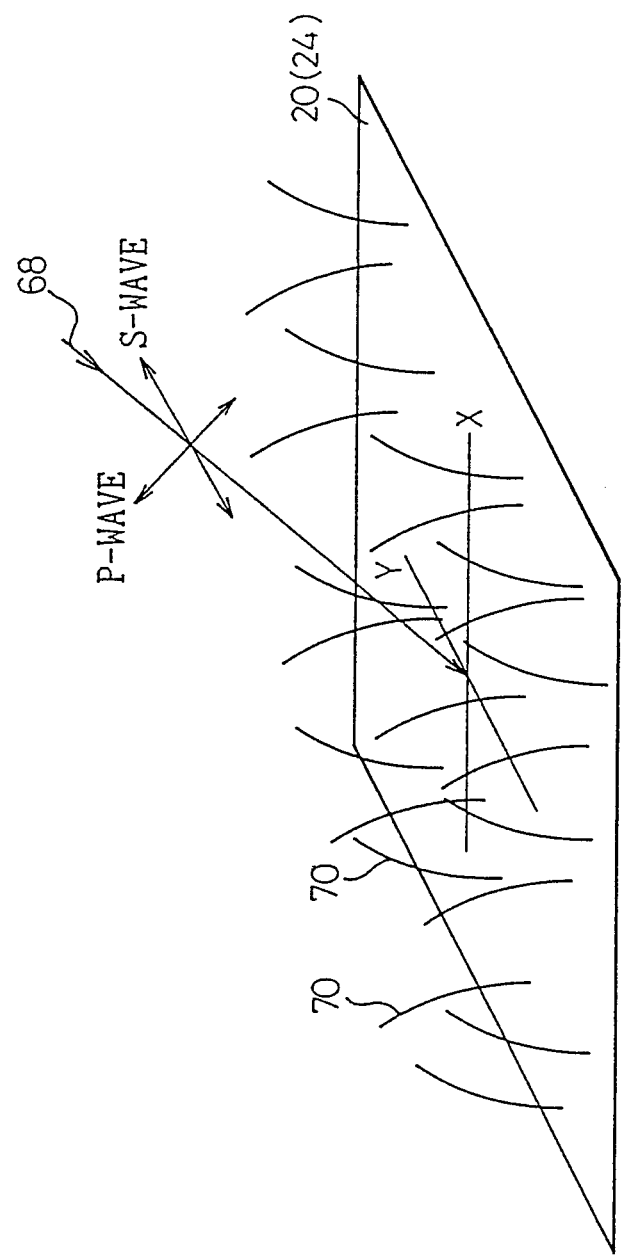
FIG. 18 is a view illustrating the principle for alignment-treating the alignment layers of FIG. 16.
Figure 19:
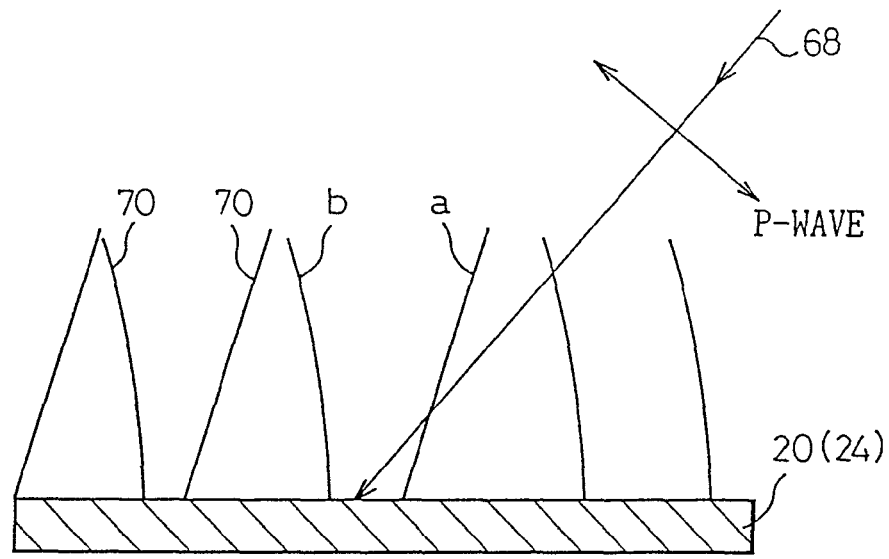
FIG. 19 is a view simplifying FIG. 18.

FIG. 18 is a view illustrating the principle of alignment treatment, and FIG. 19 is a simplified view of the view of FIG. 18. The alignment layer 20(24) represented by the above chemical formula has alkyl groups R which realize the vertical aligning property. In FIG. 18, the alkyl groups R are denoted by a reference numeral 70. It is considered that the alkyl groups 70 protrude in random from the surface of the alignment layer 20(24).

The ultraviolet rays 68 are irradiated obliquely to the alignment layer 20(24) along the azimuth X, and the pretilt direction (azimuth line) of the liquid crystal is parallel to the azimuth of the direction of incidence of the ultraviolet rays 68. The non-polarized ultraviolet rays 68 contain polarized light of P wave and S wave, but the S wave does not contribute to the directivity of alignment. That is, the S wave exhibits no action in the X-direction but exhibits an action in the Y-direction. The action in the Y-direction, however, has the same magnitude in the positive direction and in the negative direction of the Y-axis, and does not contribute to the directivity of alignment.

The P wave acts upon a portion including alkyl groups 70 in a plane which is parallel to the direction of incidence of the ultraviolet rays 68, and affects the directivity of alignment. FIG. 19 illustrates a plane parallel to the direction of incidence of the ultraviolet rays 68, i.e., illustrates a portion of FIG. 18 along the plane parallel to the oscillation plane of the P waves. In FIG. 19, the alkyl groups 70 can be grouped into two components that are inclined in opposite directions with respect to the direction of oscillation of the P wave of the ultraviolet rays 68. The components in the alkyl groups 70 "a" are inclined so that they are nearly perpendicular to the direction of oscillation of the P wave, and the components "b" are inclined so that they are nearly horizontal to the direction of oscillation of the P wave. It is not generally considered that the alkyl groups are destroyed by ultraviolet rays. It can be rather considered that the portions supporting the alkyl groups or the portions tilting the alkyl groups, are destroyed by ultraviolet rays. The portions "a" (corresponding to the components "a") tilting the alkyl groups to be nearly perpendicular to the direction of oscillation of the P wave and the portions "b" (corresponding to the components "b") tilting the alkyl groups to be nearly parallel to the direction of oscillation of the P wave, are destroyed at different ratios by the ultraviolet rays. The portions "b" tilting the alkyl groups easily receive energy and are easily destroyed by the energy of ultraviolet rays. Therefore, the components "b" decrease by the irradiation of the ultraviolet rays, whereas the components "a" remain without being destroyed. When the alignment layer 20(24) is used in the liquid crystal display device 10, therefore, the liquid crystal molecules are pretilted according to the components "a" of the alkyl groups 70 of the alignment layer 20(24).

Figure 20:
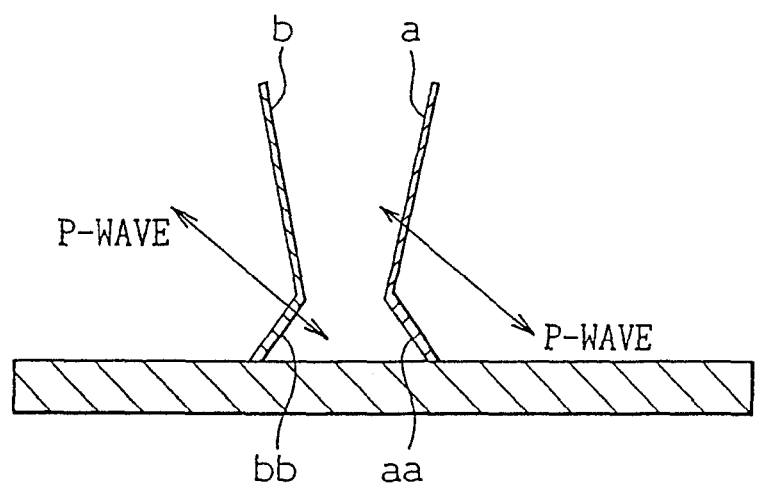
FIG. 20 is a view illustrating a modified example of FIG. 18.

FIG. 20 is a view illustrating a modified example of FIG. 19. In FIG. 19, it was presumed that the components "a" and "b" of the alkyl groups 70 received the action of ultraviolet rays uniformly. FIG. 20, however, illustrates the case where portions aa and bb of components "a" and "b" of the alkyl groups 70 receive the action of ultraviolet rays particularly strongly. These portions aa and bb are bent in the opposite directions relative to most of the portions of components "a" and "b" of the alkyl groups 70.

Therefore, the portions aa are easily destroyed by the energy of ultraviolet rays, but the portions bb are less easily destroyed by the energy of ultraviolet rays. Therefore, the components "b" having portion bb remain. When the alignment layer 20(24) is used in the liquid crystal display device 10, therefore, the liquid crystal molecules are pretilted according to the inclination of the components "b" of the alkyl groups 70 of the alignment layer 20(24). In the cases of FIGS. 19 and 20, it can be proved that the liquid crystal molecules are aligned at a predetermined pretilt angle. By using the vertical alignment layers, therefore, an alignment having a pretilt angle is realized by the irradiation with non-polarized ultraviolet rays in an inclined direction, without rubbing.

In FIGS. 19 and 20, however, it is sometimes difficult to determine which one of the component "a" or the component "b" will be easily destroyed, before the irradiation of ultraviolet rays. Upon irradiation with ultraviolet rays in an inclined direction, however, one of the component "a" or the component "b" is destroyed, and the other one remains, whereby the liquid crystal molecules are aligned at a pretilt angle, without rubbing.

The alignment treatment is conducted under the following conditions. The material of the vertical alignment layer 20(24) is, for example, RN722, RN783, or RN784 sold by Nissan Kagaku Co., or JALS-204 produced by Nippon Synthetic Rubber Co. First, a material of the alignment layer is applied to the substrate 12(14) by spin-coating at 2000 rpm. The thickness of the alignment layer is about 80 nm. The film is baked at 180° C. for two hours. Next, the alignment layer is irradiated with ultraviolet rays, using the apparatus 60 for alignment treatment shown in FIG. 17. The source of light 62 is a deep Uv irradiation device manufactured by Ushio Denki Co. In this source of light 62, the portion emitting the ultraviolet rays has a size of about 5 mm, and nearly parallel ultraviolet rays are obtained by the reflector 62a. The ultraviolet rays are projected over a range of from one minute to 30 minutes to prepare several samples, which are used to assemble liquid crystal display devices. The liquid crystal molecules are pretilted in the liquid crystal display devices having samples irradiated for not shorter than 10 seconds, and the pretilted angle decreases from 90 degrees, i.e., in the vertical direction, to 88 degrees.

The spectral distribution shown in FIG. 21 contains components having wavelengths near 250 nm which work effectively. Thus, a lamp of the short arc-type is used as the source of light, ultraviolet rays having wavelengths of near 250 nm are chiefly used and the degree of parallelism of ultraviolet rays is set to be smaller than ±10 degrees, and preferably smaller than ±3 degrees, using a reflector. Tests are conducted using a source of light having a spectral distribution shown in FIG. 21 and by using ultraviolet rays emitted by the same source of light with the components having wavelengths of longer than 300 nm are cut, and the results are compared. It is confirmed that the liquid crystal molecules are pretilted in the same manner. From the results, it is learned that irradiation with ultraviolet rays having wavelengths shorter than 280 nm is effective in realizing the pre-tilt the vertical alignment layer 20(24).

According to this embodiment as described above, the vertical alignment layer 20(24) can realize the pretilt, using non-polarized ultraviolet rays. It can be said that the P wave only is practically effective in the non-polarized ultraviolet rays. Still, the possibility of using non-polarized ultraviolet rays has great merit. It has heretofore been proposed to develop the pretilt by irradiating the horizontal alignment layers with polarized ultraviolet rays. In this case, however, the pretilt cannot be developed by using non-polarized ultraviolet rays. Therefore, it becomes necessary to use a polarizer for obtaining polarized ultraviolet rays. At present, such a polarizer is available only as the Glen-Taylor type. The Glen-Taylor type polarizer, however, is produced by cutting natural calcite which is not suited for practical use. Therefore, the alignment treatment using non-polarized ultraviolet rays does not require any polarizer for ultraviolet ray irradiation, and is very desirable.

Figure 22:
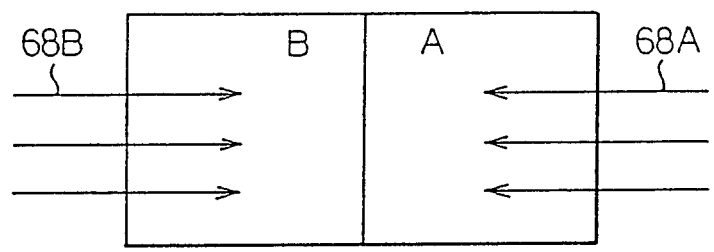
FIG. 22 is a view for alignment-treating the two domains.
Figure 23:
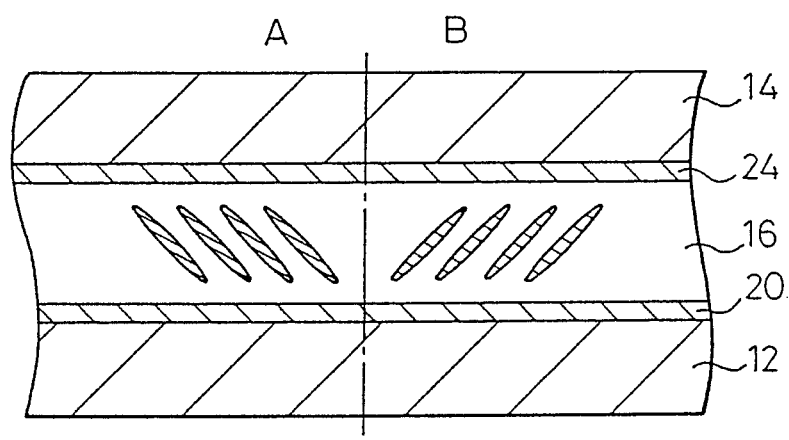
FIG. 23 is a view showing the division of alignment accomplished by the alignment treatment of FIG. 22.

In this embodiment, the non-polarized ultraviolet rays are uniformly projected onto the whole surface of the vertical alignment layer 20(24). To effect the alignment division, therefore, the divided domains A and B are irradiated with ultraviolet rays 68A and 68B in the opposite directions as shown in FIG. 22. Then, as shown in FIG. 23, there are obtained two domains A and B in which the intermediately positioned liquid crystal molecules are tilted in the opposite directions. In this case, there is no difference in the pretilt angle of the liquid crystal molecules between the two domains A and B.

Figure 24:
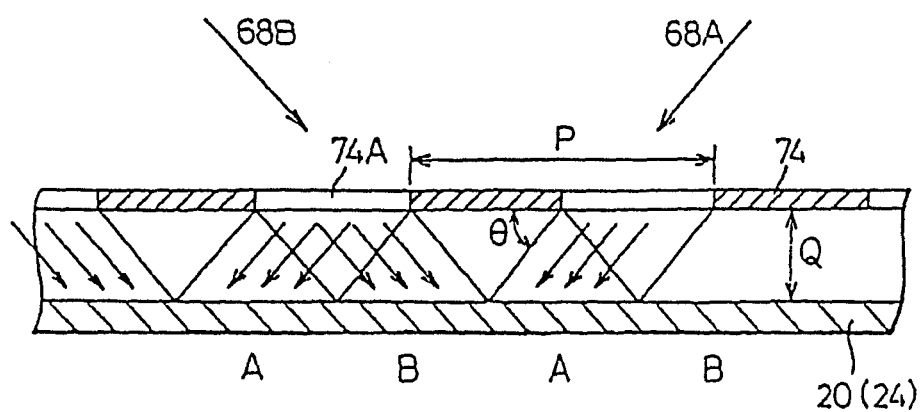
FIG. 24 is a view showing a mask for effecting the alignment treatment of FIGS. 22 and 23.

FIG. 24 illustrates an example in which the domains A and B are simultaneously irradiated with ultraviolet rays 68A and 68B in the opposite directions. In this case, a mask 74 having openings 74A is used. Ultraviolet rays 68A and 68B enter one opening 74A in opposite directions. Here, ultraviolet rays 68A and 68B entering in the opposite directions are just aimed at the two domains A and B under the following conditions. When a pitch of the opening 74A of the mask 74 (pitch of a pixel) is denoted by P, a distance between the mask 74 and the alignment layer 20(24) is denoted by Q, and an angle of incidence of ultraviolet rays 68A and 68B is denoted by θ, then, a relation Q=(P/4) sin θ is maintained.

Figure 25:
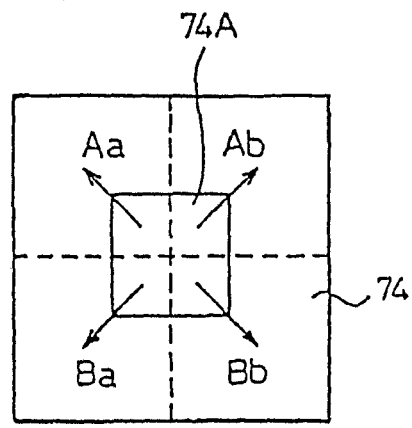
FIG. 25 is a view illustrating a modified example of FIG. 22.

By applying this principle, ultraviolet rays can be simultaneously projected in four directions as shown in FIG. 25 in order to form four different domains Aa, Ab, Ba and Bb.

Figure 26A:
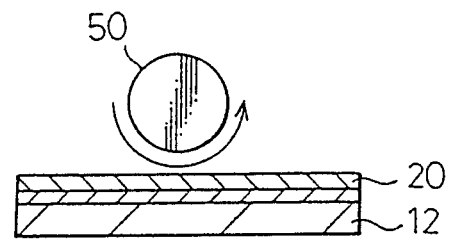
FIGS. 26A to 26D are views illustrating the third embodiment of the present invention.
Figure 26B:
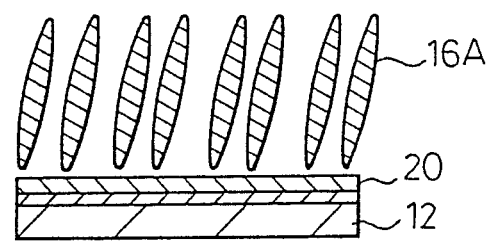
Figure 26C:
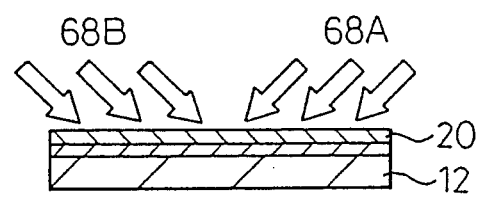
Figure 26D:
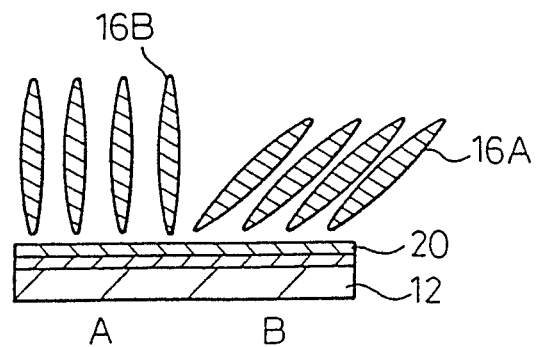

FIGS. 26A to 26D are views illustrating the alignment treatment according to the third embodiment of the present invention. The alignment layer 20(24) shown here can be used in the liquid crystal display device shown in FIG. 16. Referring to FIG. 26A, the whole surface of the alignment layer 20 is rubbed with a rubbing roll 50, so that the liquid crystal molecules 16A are pretilted in a predetermined manner as shown in FIG. 26B. Referring to FIG. 26C, non-polarized ultraviolet rays 68A, 68B are projected in the opposite directions. Then, as shown in FIG. 26D, the realized pretilt angles in the domains A and B are the sums of a pretilt angle due to rubbing and pretilt angles due to irradiation with ultraviolet rays. Accordingly, a difference exists between the pretilt angles of the liquid crystal molecules in the two domains A and B.

The ultraviolet rays are irradiated in the manner described above. A lamp of the short arc-type is used as a source of light, ultraviolet rays of shorter than 280 nm and, preferably, around 250 nm are chiefly used, and the degree of parallelism of ultraviolet rays is set to be smaller than ±10 degrees, and preferably smaller than ±3 degrees, by using a reflector. A polyimide exhibiting a vertically oriented property is used as alignment layers.

Figure 27:
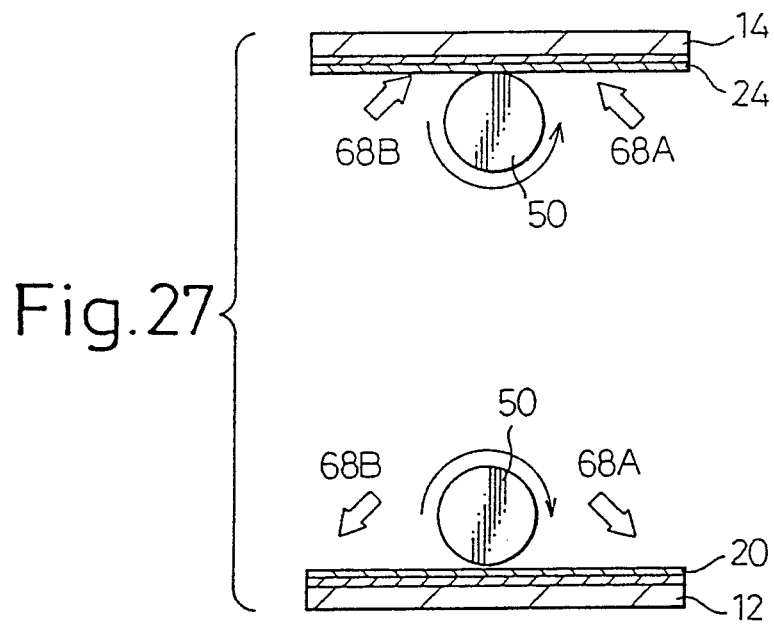
FIG. 27 is a view illustrating the alignment treatment according to the third embodiment.
Figure 28:
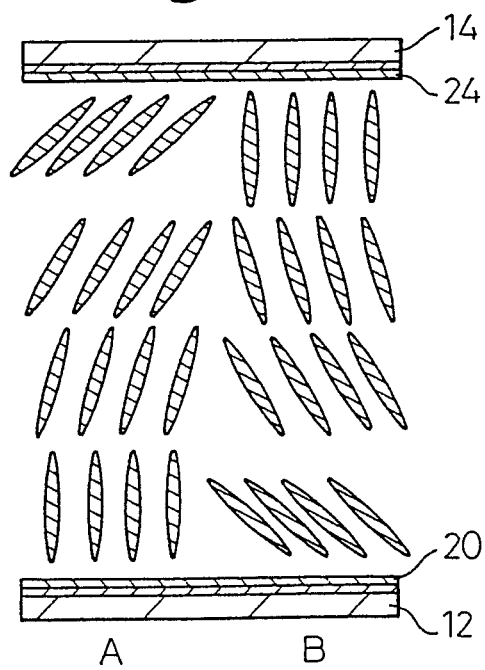
FIG. 28 is a view showing liquid crystal molecules relative to the alignment layers alignment-treated according to the third embodiment.

Referring to FIG. 27, the other alignment layer 24 is rubbed and irradiated with ultraviolet rays in the same manner. The two alignment layers 20 and 24 are rubbed in the directions as shown in, for example, FIG. 13. When the liquid crystal display device is assembled, using the alignment layers 20 and 24, there are obtained two domains A and B in which the intermediately positioned liquid crystal molecules are tilted in the opposite directions as shown in FIG. 28 to accomplish the alignment division. In this case, the alignment layers 20 and 24 have been rubbed and irradiated with ultraviolet rays on the whole surfaces thereof, and there is no difference in the alignment treatment between the opposing alignment layers 20 and 24 unlike the case when the ultraviolet rays are locally projected by using the mask 52 as described with reference to FIG. 15. When the alignment treatment is carried out according to FIGS. 26 to 28, therefore, there is no need to effect the separate treatment, for the pixel display portions and the non-display portions, that was done in FIG. 1.

In the alignment treatment according to FIGS. 16 to 24, no rubbing is effected. When the liquid crystal molecules are pretilted at a small pretilt angle upon irradiation with ultraviolet rays without effecting the rubbing, the rubbing is effected in combination with the irradiation of ultraviolet rays, as in this embodiment, in order to obtain a sufficiently large pretilt angle yet to maintain the effects of the examples of FIGS. 16 to 24.

Figure 29:
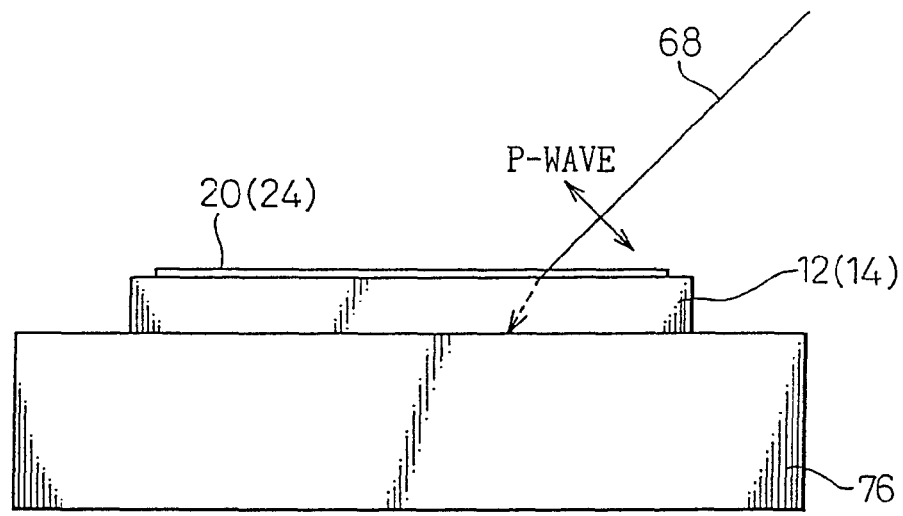
FIG. 29 is a diagram illustrating the feature of the glass substrate in the liquid crystal display device of FIG. 16.

FIG. 29 is a view illustrating a feature of the glass substrates 12 and 14 of the liquid crystal display device of FIG. 16. Referring to FIG. 29, the glass substrates 12 and 14 are made of a material which absorbs ultraviolet rays irradiated for realizing the alignment.

FIG. 29 illustrates the case where the alignment layer 20(24) is irradiated with ultraviolet rays. The ultraviolet rays 68 are projected in a state where the glass substrate 12(14) provided with the alignment layer 20(24) is supported on a sample plate 76. In this case, the glass substrate 12(14) absorbs ultraviolet rays 68; i.e., ultraviolet rays 68 falling on the alignment layer 20(24) are absorbed by the glass substrate 12(14) after having passed through the alignment layer 20(24).

Figure 30:
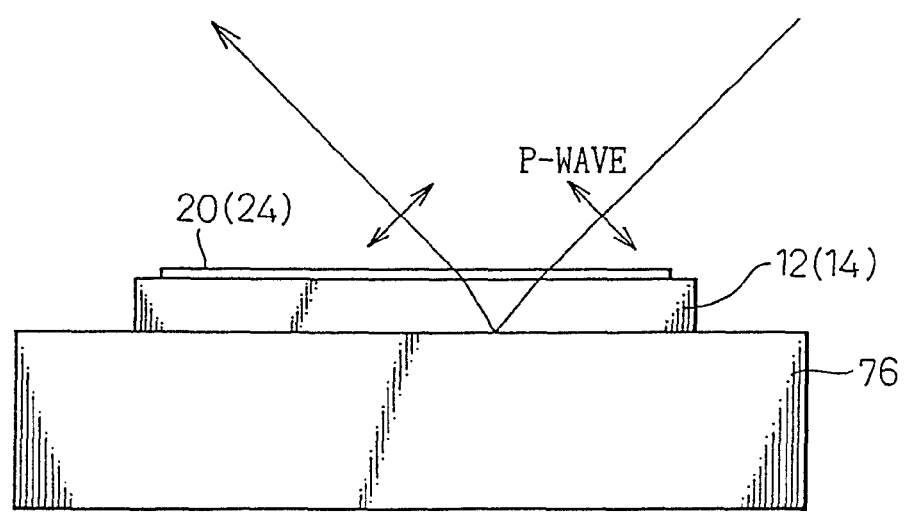
FIG. 30 is a comparative view for explaining the feature of FIG. 29.

FIG. 30 illustrates the case where the glass substrate 12(14) is made of a material that does not absorb ultraviolet rays 68 and the alignment layer 20(24) is irradiated with ultraviolet rays 68. The ultraviolet rays 68 are projected in a state where the glass substrate 12(14) provided with the alignment layer 20(24) is supported on the sample plate 76. In this case, the ultraviolet rays 68 falling on the alignment layer 20(24) pass through the alignment layer 20(24) and, then, through the glass substrate 12(14), are reflected by the surface of the sample plate 76, and pass again through the glass substrate 12(14) and the alignment layer 20(24).

In this case, the P wave of ultraviolet rays 68 falling on the alignment layer 20(24) oscillates in a direction connecting the left-end upper side to the right-end lower side in FIG. 30, whereas the P wave of ultraviolet rays 68 reflected by the surface of the sample plate 76 and are passing through the alignment layer 20(24) oscillates in a direction connecting the left-end lower side to the right-end upper side in FIG. 30. This is equal to the case where the alignment layer 20(24) is irradiated in the oppositely inclined directions (without mask).

As described with reference to FIGS. 18 to 20, the alignment is realized as either the components "a" or the components "b" of the alkyl groups 70, tilted in the opposite directions, being destroyed by the P wave of ultraviolet rays 68 that is incident in the inclined direction. When the light reflects as shown in FIG. 30, e.g., when the P wave of the incident ultraviolet ray 68 destroys the components "a", then, the P wave of the reflected ultraviolet ray 68 destroys the components "b". After all, the alkyl groups 70 are all destroyed, and there remains no alkyl group 70 standing obliquely, and the alignment action is not obtained or the alignment is disturbed.

As shown in FIG. 29, therefore, it is arranged that the glass substrate 12(14) absorbs no ultraviolet rays 68, and that the incident ultraviolet rays 68 are absorbed by the glass substrate 12(14) after acting upon the alignment layer 20(24), so that the ultraviolet rays 68 are reflected by neither the sample plate 76 under the glass substrate nor the interface between the glass substrate 12(14) and the air. As explained with reference to FIG. 30, therefore, it is arranged that the reflected ultraviolet rays do not act upon the alignment layer 20(24) in order to reliably reform the alignment by the irradiation with ultraviolet rays.

Figure 31:
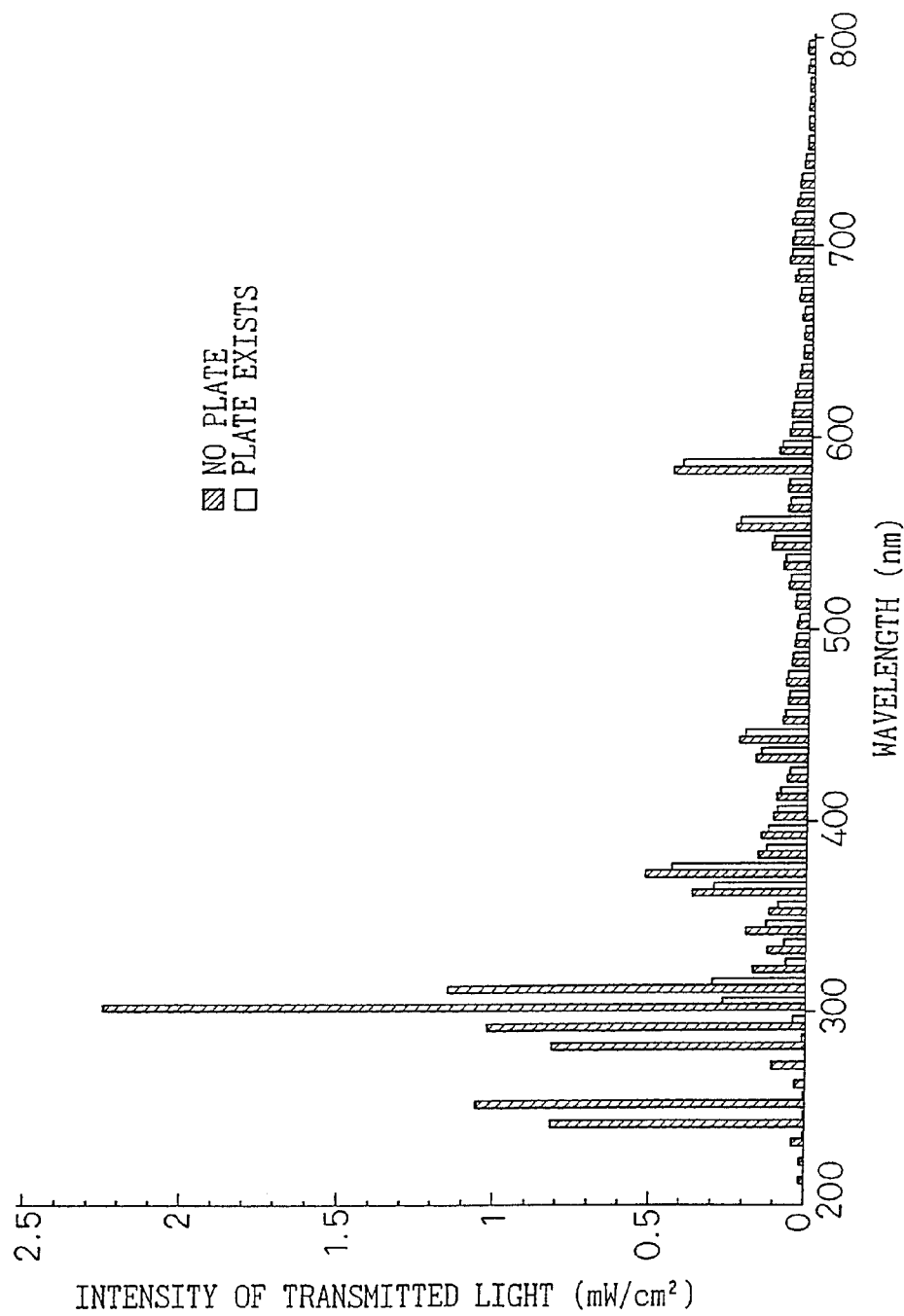
FIG. 31 is a view illustrating the intensity of the transmitted light of the light source when a substrate is used and when no substrate is used.

FIG. 31 is a view illustrating the ultraviolet rays (light from a source of light) used and the feature of the glass substrate, wherein black bars represent the intensity of ultraviolet rays when no substrate (plate) is used, and white bars represent the intensity of ultraviolet rays when a substrate (plate) is used (light passes through the substrate). As the black bars indicate, the source of light that is used emits the strongest ultraviolet rays in the wavelength regions near 250 nm and 300 nm. The glass substrate 12(14) is the one that absorbs ultraviolet rays in these wavelength regions. As the white bars indicate, ultraviolet rays of around 300 nm or shorter are cut off when the light passes through the glass substrate 12(14). Peaks at around 250 nm disappear, too. The transmission of ultraviolet rays shown in FIG. 29 is thus confirmed.

As the alignment layer 20(24), use is made of, for example, RN-722, RN-783 or RN-784 marketed by Nissan Kagaku Co. First, the alignment layer 20(24) is applied onto the glass substrate 12(14) by spin-coating at 2000 rpm. The alignment layer 20(24) has a thickness of about 80 nm. This is fired at 180° C. for two hours. Then, ultraviolet rays are projected by using a deep UV irradiation device manufactured by Ushio Denki Co. In this ultraviolet ray irradiation device, the portion emitting ultraviolet rays has a size of about 5 mm. By establishing an optical system using this device, a nearly parallel ultraviolet ray beam is obtained. Black bars of FIG. 31 represent the spectrum of the ultraviolet rays.

As the glass substrate 12(14), an OA2 glass substrate manufactured by Asahi Glass Co is used. This glass substrate is made of a borosilicate glass or a so-called alkali-free glass, and exhibits ultraviolet ray transmission characteristics similar to those shown in FIG. 31.

The energy of ultraviolet rays increases as the wavelength becomes shorter, and light of 250 nm is more effective in reforming the alignment layer 20(24). It is therefore desired to use the source of light containing components around 250 nm. Even when use is made of a source of light not containing components around 250 nm, the ultraviolet rays contain components of a wavelength region effective in reforming the alignment layer. In such a case, there should be employed a glass substrate which absorbs light of such a wavelength region to accomplish a desired object.

The source of light emitting ultraviolet rays will be, for example, a high-pressure mercury lamp, a low-pressure mercury lamp, a xenon lamp, etc., and there should be used a glass substrate that absorbs light effective in reforming the alignment layer. For example, when light near 250 nm is effectively used, it is recommended to use a soda-lime glass as the glass substrate to accomplish such an effect.

Examples of the combination of the source of light and the glass substrate include a combination of the high-pressure mercury lamp and the soda-lime glass, and a combination of the xenon lamp and the soda-lime glass or the borosilicate glass or the alkali-free glass. When the substrate 12(14) is made of a plastic, it is desired that the substrate material is selected from polycarbonate, polyethylene and polystyrene.

Figure 32:
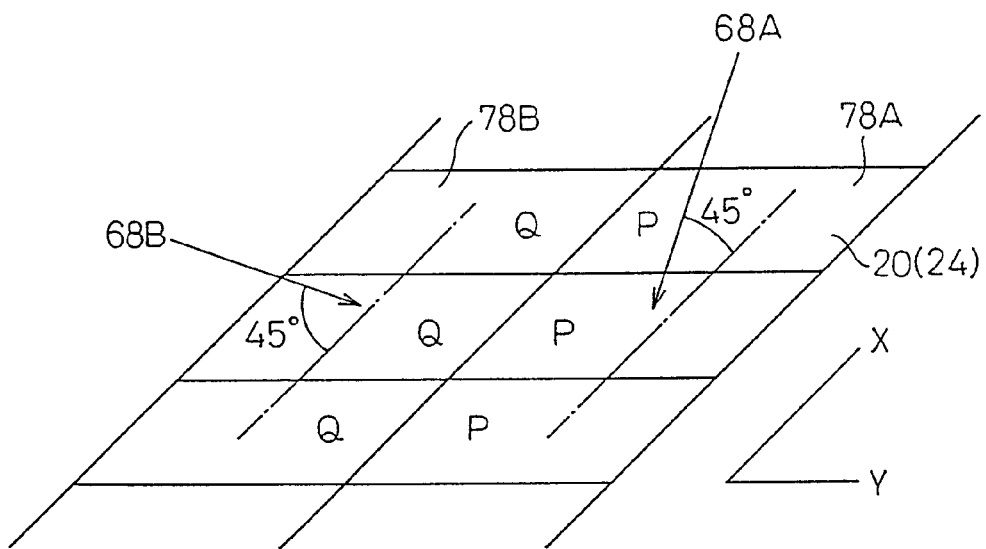
FIG. 32 is a view illustrating the fourth embodiment of the present invention.
Figure 33:
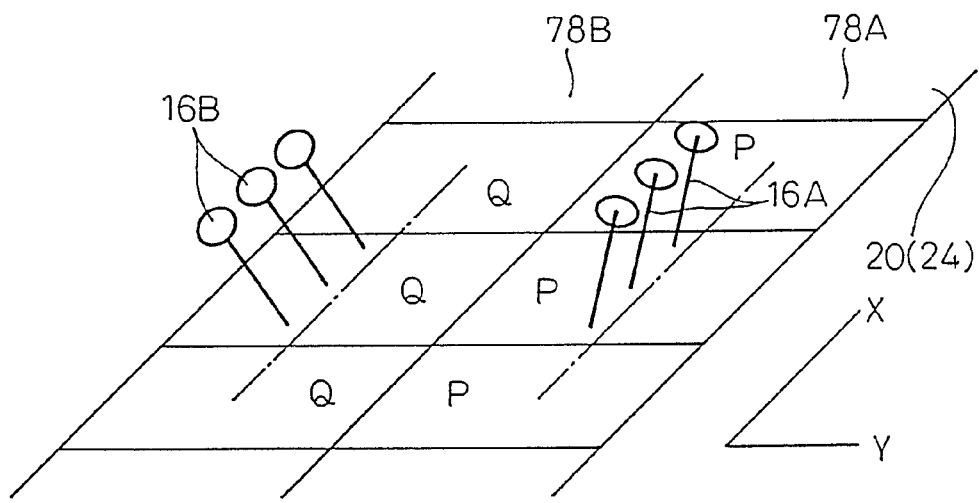
FIG. 33 is a view illustrating the liquid crystal molecules that are oriented relative to the alignment layer treated in FIG. 32.
Figure 34:
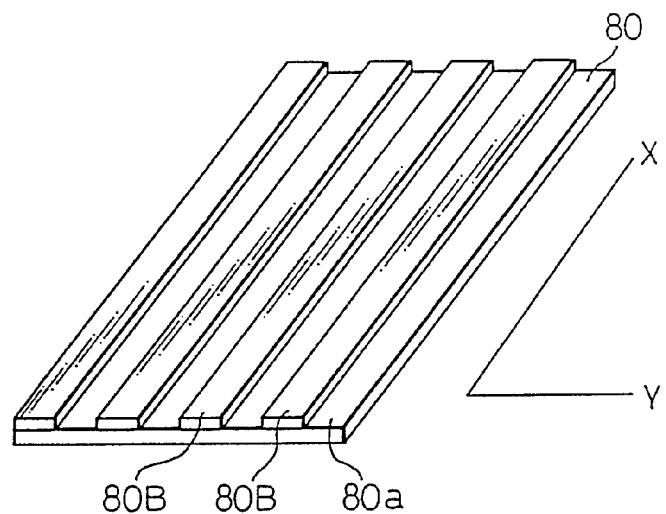
FIG. 34 is a view illustrating a mask used in the alignment treatment of FIG. 32.

FIGS. 32 to 34 illustrate a further embodiment of the present invention. This embodiment is to improve the feature for realizing a plurality of different alignments by irradiating the alignment layer 20(24) with ultraviolet rays in an inclined direction as in the embodiment shown in FIGS. 16 to 25.

FIG. 32 illustrates the alignment treatment for the alignment layer 20(24). FIG. 33 illustrates a state where the liquid crystal molecules are aligned relative to the alignment layer 20(24) when the thus alignment-treated alignment layer 20(24) is used for the liquid crystal display device (FIG. 16). FIG. 34 shows a mask used for the alignment treatment of FIG. 32. The liquid crystals 16 have a dielectric constant of negative anisotropy, and the alignment layer 20(24) is composed of a polyimide having a vertical aligning property.

Referring to FIGS. 32 and 33, the alignment layer 20(24) includes a plurality of regions 78A and 78B sectionalized into stripes. The region 78A includes a plurality of unit regions P that are continuous to each other, and the region 78B includes a plurality of unit regions Q that are continuous to each other. Referring to the X-axis and Y-axis orthogonal to each other, the regions 78A and 78B are extending parallel to the X-axis. The ultraviolet rays 68A are obliquely incident to the region 78A of the alignment layer 20(24) in a direction parallel to the X-axis. As a result, the liquid crystal molecules 16A in the region 78A are pretilted toward the upper side in FIG. 33. On the other hand, the ultraviolet rays 68B are obliquely incident to the region 78B of the alignment layer 20(24) in a direction parallel to the X-axis. As a result, the liquid crystal molecules 16B in the region 78B are pretilted toward the lower side in FIG. 33. As described above, however, the liquid crystal molecules 16A in the region 78A may be pretilted toward the lower side in FIG. 33 and the liquid crystal molecules 16B in the region 78B may be pretilted toward the higher side in FIG. 33.

Referring to FIG. 34, the mask 80 is obtained by vaporizing chromium 80B on a synthetic quartz plate 80A. A portion of chromium BOB works to shut-off light, and a portion between chromium 80B and chromium 80B serves as an opening. Chromium 80B extends in the direction of X-axis. The width of chromium 80B and the width of opening in the mask 80 are in agreement with the width of the regions 78A and 78B. Referring to FIG. 32, therefore, the ultraviolet rays 68A are projected, using the mask 80 and placing the openings of the mask 80 on the regions 78A. The mask 80 is then displaced by one pitch in the lateral direction and, then, the ultraviolet rays 68B are projected, placing the openings of the mask 80 on the regions 78B.

Here, as the method of irradiation with ultraviolet rays 68A and 68B, there are a method of irradiation with ultraviolet rays in the two directions by providing two lamps for projecting ultraviolet rays, and a method of irradiation with ultraviolet rays using one lamp and turning the mask and the substrate together by 180 degrees.

Figure 37:
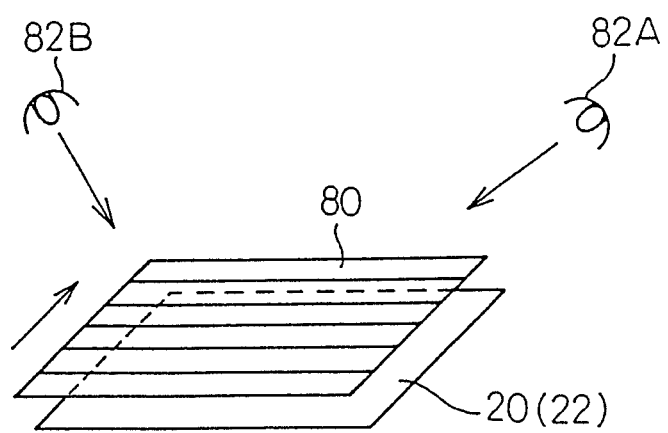
FIG. 37 is a view illustrating the irradiation of ultraviolet rays using two lamps.

FIG. 37 shows an example where two lamps 82A and 82B are used. The first lamp 82A is used for the irradiation with ultraviolet rays of the first time, and the second lamp 82B is used for the irradiation with ultraviolet rays from the opposite direction in the second time. Between the first time of irradiation with ultraviolet rays and the second time of irradiation with ultraviolet rays, in this case, the mask 80 is displaced in the direction (of an arrow) perpendicular to the direction of stripes of the regions 78A and 78B and by a distance equal to the width of the stripe.

Figure 38:
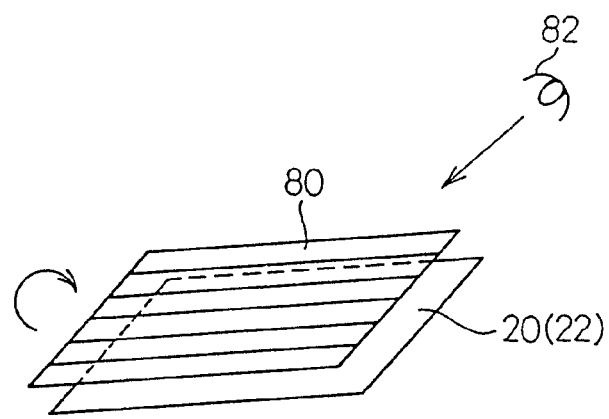
FIG. 38 is a view illustrating the irradiation of ultraviolet rays using a single lamp.

FIG. 38 illustrates an example using a lamp 82. In this case, after the first time of irradiation with ultraviolet rays, the substrate 12(14) or both the substrate and the mask 20(24) are turned by 180 degrees (as indicated by an arrow), so that the region that was not irradiated with ultraviolet rays the first time is now irradiated with ultraviolet rays the second time. In this case, both the substrate 12(14) and the mask 80 are turned by 180 degrees, the position of the mask is displaced relative to the substrate, and the irradiation with ultraviolet rays of the second time is effected. It is also allowable to displace the position of the substrate relative to the mask, turn the position of the source of ultraviolet rays by 180 degrees, and, then, project the ultraviolet rays.

Figure 35:
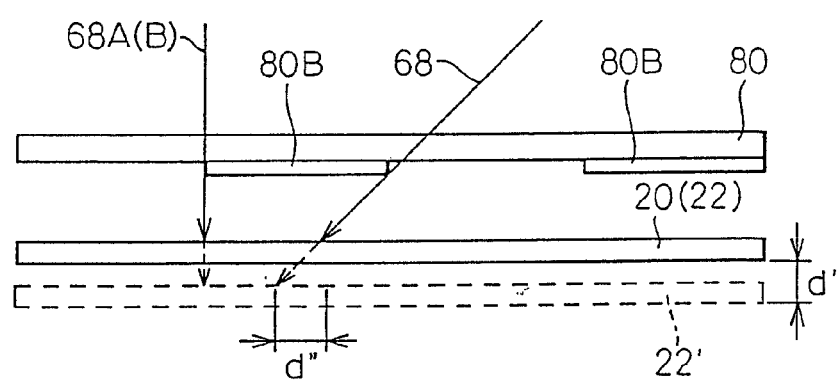
FIG. 35 is a view illustrating a problem caused by a relationship between the mask and the direction of ultraviolet ray projection.

FIG. 35 illustrates the case where the ultraviolet rays 68 are projected in the direction of the Y-axis of the mask 80. In this case, the ultraviolet rays 68 proceed in a direction perpendicular to the chromium (light shut-off portion) 80B of the mask 80. When the distance between the mask 80 and the alignment layer 20(24) is deviated by d', therefore, the position of exposure on the alignment layer 20(24) is deviated by d" in the transverse direction. On the other hand, when the ultraviolet rays 68 are projected in the direction of X-axis of the mask 80 as shown in FIGS. 32 and 34, the position of exposure on the alignment layer 20(24) is not deviated in the transverse direction despite the distance between the mask 80 and the alignment 20(24) is deviated by d'.

In the example of FIG. 24, a plurality of different alignments are realized by using a single mask 74 and by obliquely projecting the ultraviolet rays in the opposite directions. According to this method, however, if the distance between the mask 74 and the alignment layer 20(24) is deviated by, for example, 10 μm, the position of exposure on the alignment layer 20(24) is likely to be deviated by 10 μm in the transverse direction. As the glass substrate 12(14) becomes large, furthermore, the glass substrate 12(14) may be deflected due to its own weight or due to the weight of the mask 74, causing the same problem as when the distance between the mask 74 and the alignment layer 20(24) is deviated. For example, it has been known that a chromium mask measuring 400×500 mm having a thickness of 20 mm is deflected by about 10 μm at the center. This problem can be solved in the way described with reference to FIGS. 32 to 34.

Figure 36:
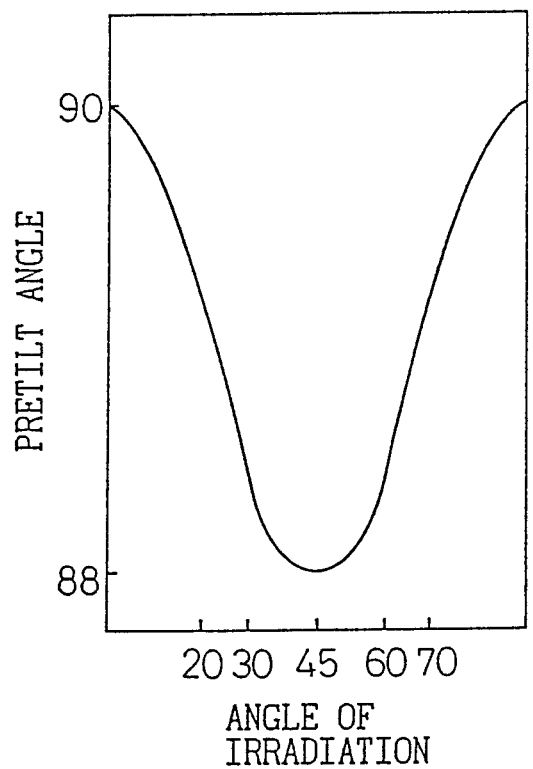
FIG. 36 is a diagram illustrating a relationship between the angle of irradiation of ultraviolet rays and the realized pretilt angle.

FIG. 36 is a view illustrating a relationship between the angle of irradiation with ultraviolet rays 68A, 68B and the pretilt angle that is realized. The angle of irradiation is taken in a direction perpendicular to the alignment layer 20(24). When the ultraviolet rays 68A and 68B are incident in an inclined direction of 45 degrees relative to the alignment layer 20(24), it is possible to stably realize a pretilt angle of 88 degrees. FIG. 32 illustrates the irradiation with ultraviolet rays 68A, 68B in an inclined direction of 45 degrees relative to the alignment layer 20(24).

The stability of alignment decreases as the angle of irradiation with ultraviolet rays deviates from 45 degrees. Therefore, even when it is desired to realize a pretilt angle of, for example, 88 degrees, it often becomes difficult to realize the pretilt angle of 88 degrees. To stably realize a desired pretilt angle, therefore, it is desired that the angle of irradiation is from 20 degrees to 70 degrees and, more preferably, from 30 degrees to 60 degrees. The alignment remains most stable and uniform when the angle is 45 degrees.

Figure 39:
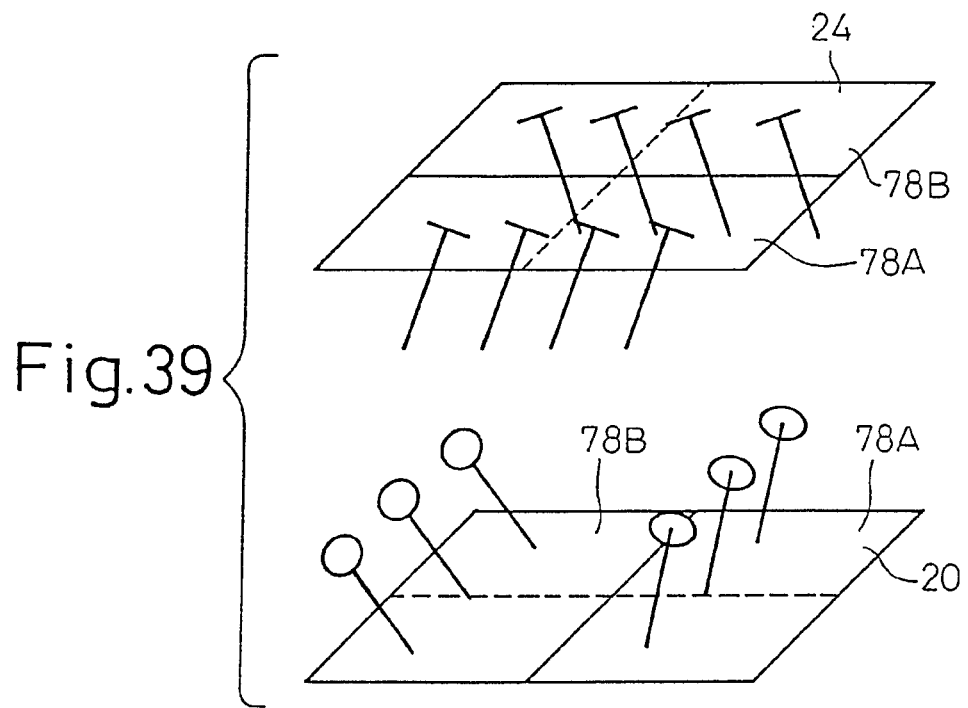
FIG. 39 is a view showing the two alignment layers obtained by the irradiation of ultraviolet rays in FIG. 32, which are so arranged that the stripes meet at right angles relative to each other.

FIG. 39 illustrates a case where a pair of substrates 12 and 14 are stuck together such that the directions of stripes of the regions 78A and 78B of the alignment layers 20 and 24 are perpendicular to each other. In this case, four kinds of domains (alignment regions) J, K, L and M are formed as shown in FIG. 40. In FIG. 40, the members shown by solid nails denote liquid crystal molecules in front of the surface of the paper and the members shown by broken nails denote liquid crystal molecules at the back of the surface of the paper. Thus, there are realized a total of four kinds of liquid crystal alignments including two start points of turn and two directions of turn, the angle of twist being 90 degrees in each of the domains J, K, L and M.

When no voltage is applied, the liquid crystal molecules are substantially vertically erect on the surface of the substrate at a pretilt angle of 88 degrees. When a voltage is applied, however, the liquid crystal molecules turn and lie down. The angles of azimuth of the turn are different by 90 degrees relative to one another at the center of the turn. That is, in the domain J, the liquid crystal twists leftwards (in the drawing, it may appear to be twisted rightwards, which, however, is defined to twists leftwards in the field of liquid crystal panels), and the start point is the lower side in the drawing. In the domain L, the liquid crystal twists rightwards, and the start point is the upper side in the drawing.

When the voltage is applied, the liquid crystal molecules intermediately positioned between the two substrates are tilted toward the left lower side in the domain J as indicated by an arrow a, toward the right lower side in the domain K as indicated by an arrow b, toward the left upper side in the domain L as indicated by an arrow c, and toward the right upper side in the domain M as indicated by an arrow d. Each pixel includes the four domains J, K, L and M. The viewing angle characteristics differ in the four domains J, K, L and M, and viewing angle characteristics which are favorable as a whole are obtained due to the mixture of different viewing angle characteristics.

FIG. 41 illustrates a case where a pair of substrates 12 and 14 are stuck together such that the directions of stripes of the regions 78A and 78B of the alignment layers 20 and 24 are parallel to each other. In this case, the tilted directions of the liquid crystal are the same in the opposing portions of the upper and lower substrates. Upon arranging the substrates that the region 78A of the upper substrate is opposed to the region 78B of the lower substrate, the tilted directions of the liquid crystal become opposite to each other in the opposing portions of the upper and lower substrates. In the latter case, the liquid crystal is tilted uniformly and in one direction (+X-direction) in that region upon the application of the voltage. In the other region of the stripe, the liquid crystal is still tilted in one direction, but the direction of azimuth is in the −X-direction. Thus, the alignment can be divided into two.

Figure 42:
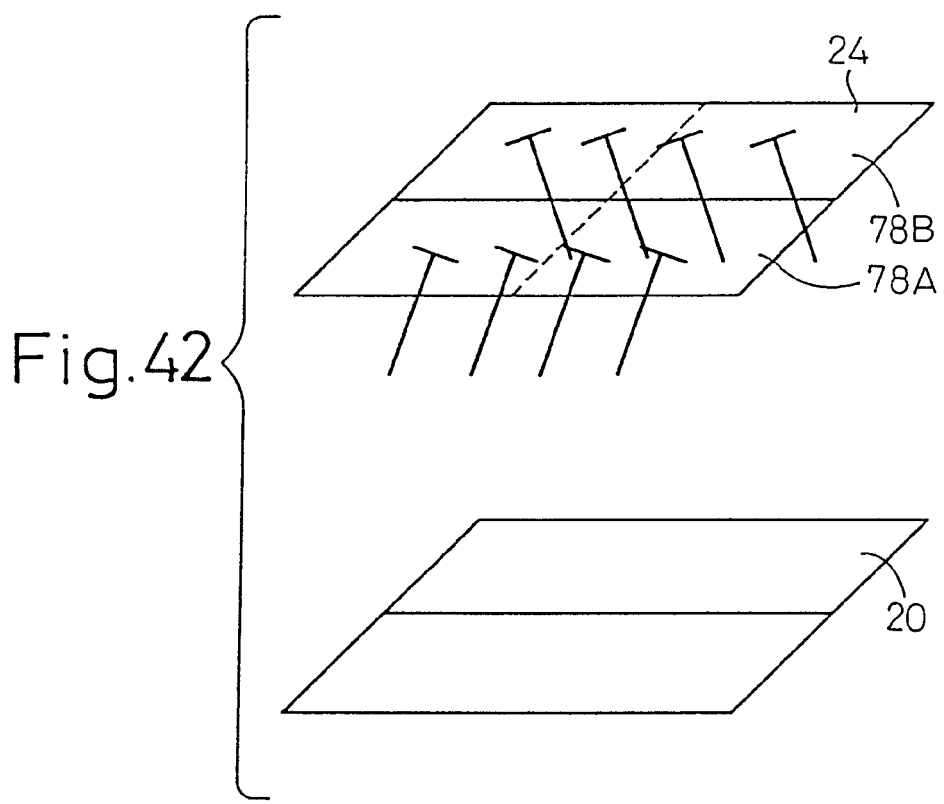
FIG. 42 is a view illustrating an example in which one alignment layer only is irradiated with ultraviolet rays.

Here, when the alignment is simply divided into two kinds, it is possible to employ a constitution in which the alignment layer 24 of one substrate only is irradiated with ultraviolet rays through the mask 80 but the alignment layer 20 of the substrate of the opposite side is not irradiated with ultraviolet rays, as shown in FIG. 42. In this case, the number of times of irradiation with ultraviolet rays can be decreased though the stability of alignment is deteriorated to some extent.

The embodiments will be further described. Use is made of a vertical alignment layer having alkyl side chains. The alignment layer is applied by spin-coating and is fired at 180° C. A striped mask 80 is prepared, and the ultraviolet rays are projected in an inclined manner in the direction of azimuth of the stripe. The ultraviolet rays that are directed nearly in parallel are projected by using a mercury-xenon lamp of the short-arc type.

It is desired that the central wavelength of the irradiated ultraviolet rays is around 250 nm. When the film is treated using ultraviolet rays, string-like grooves are not formed in the surface of the alignment layer unlike that when the surface of the alignment layer is rubbed. Here, different alignments are realized by using the mask 80, and a plurality of regions of different alignments are formed in each pixel. The regions having different alignments may be formed in any number irrespective of whether there are two kinds or four kinds of alignments in the regions. For instance, if the pitch among the regions is very much smaller than the pitch among the pixels, then, no attention needs be given to any positioning deviation.

The ultraviolet rays are projected from the right in FIG. 37 through the mask. The optimum angle of irradiation with ultraviolet rays is 45 degrees. The film is oriented at angles of 30 degrees and 60 degrees, too, but an optimum stability of alignment and an optimum uniformity of alignment are accomplished when the angle is 45 degrees. Next, the position of the mask is deviated by one-half the pitch of the stripe, i.e., by the width of the stripe in a direction perpendicular to the direction of the stripe of the mask. That is, the same mask is used, and the ultraviolet rays are obliquely projected from a direction opposite to the direction of projection of ultraviolet rays of the first time.

Figure 43:
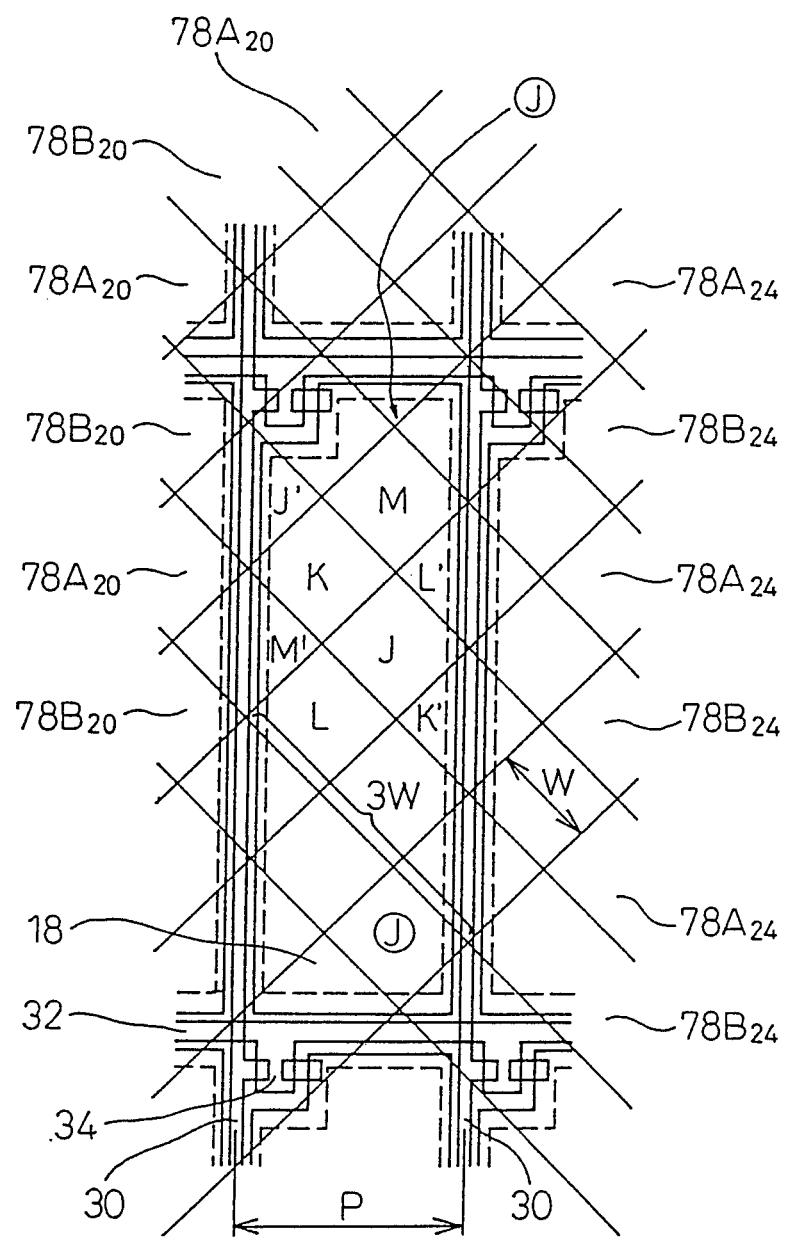
FIG. 43 is a view illustrating a relationship between a pixel and an alignment layer having regions alignment-treated in FIGS. 39 and 40.

FIG. 43 is a diagram illustrating a relationship between the pixel formed in the substrates 12, 14 and the alignment layers 20, 22 having regions 78A, 78B that are alignment-treated as shown in FIGS. 39 and 40. As described above, FIGS. 39 and 40 illustrate that each pixel has four different domains (alignment regions) J, K, L and M in which the liquid crystal molecules are directed to four directions a, b, c and d at an angle of 90 degrees relative to each other.

The arrangement of FIG. 43 further improves the constitution of FIGS. 39 and 40. Here, each pixel includes the display portion C and one-half of the non-display portion D of FIGS. 1 to 3 (a black matrix is divided at a center between the neighboring two pixel electrodes 18). That is, the surfaces of the substrates 12 and 14 are simply separated by vertical, horizontal and diagonal lines. Accordingly, each pixel has a nearly rectangular shape, and the direction of the stripes forming the regions 78A and 78B is at an angle of 45 degrees with respect to the side of the rectangle.

Figure 45:
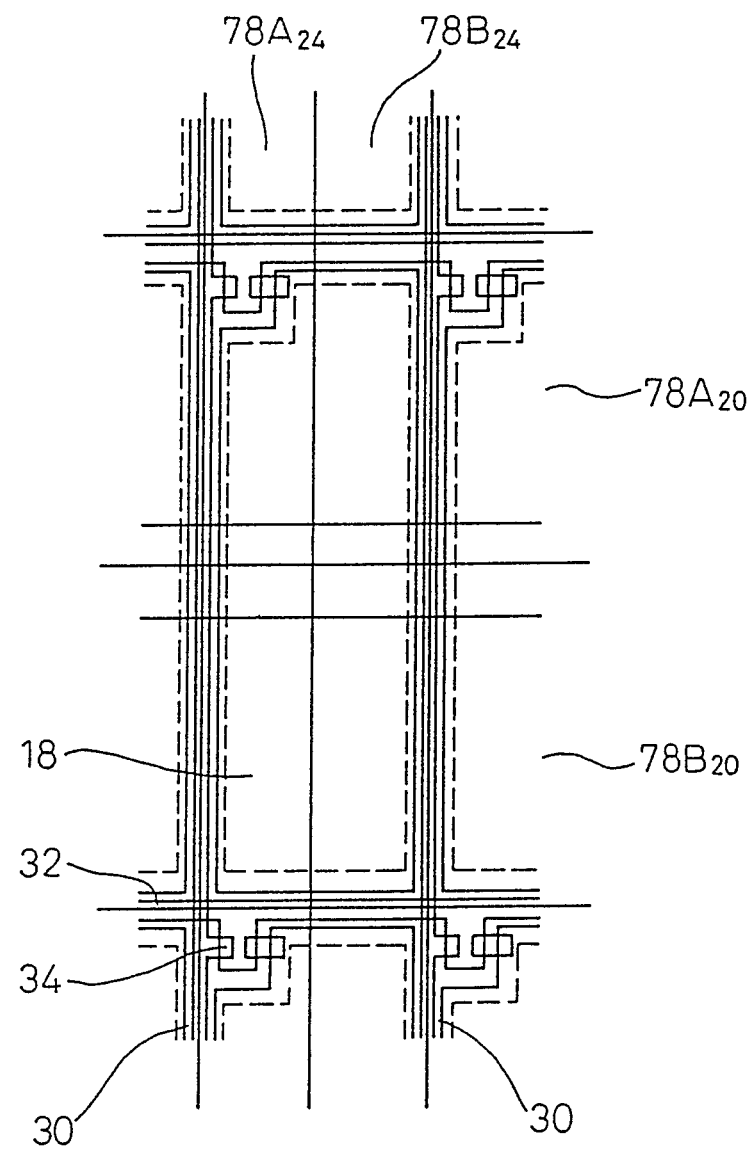
FIG. 45 is a view illustrating another relationship between a pixel and an alignment layer having regions alignment-treated in FIGS. 39 and 40.
Figure 46:
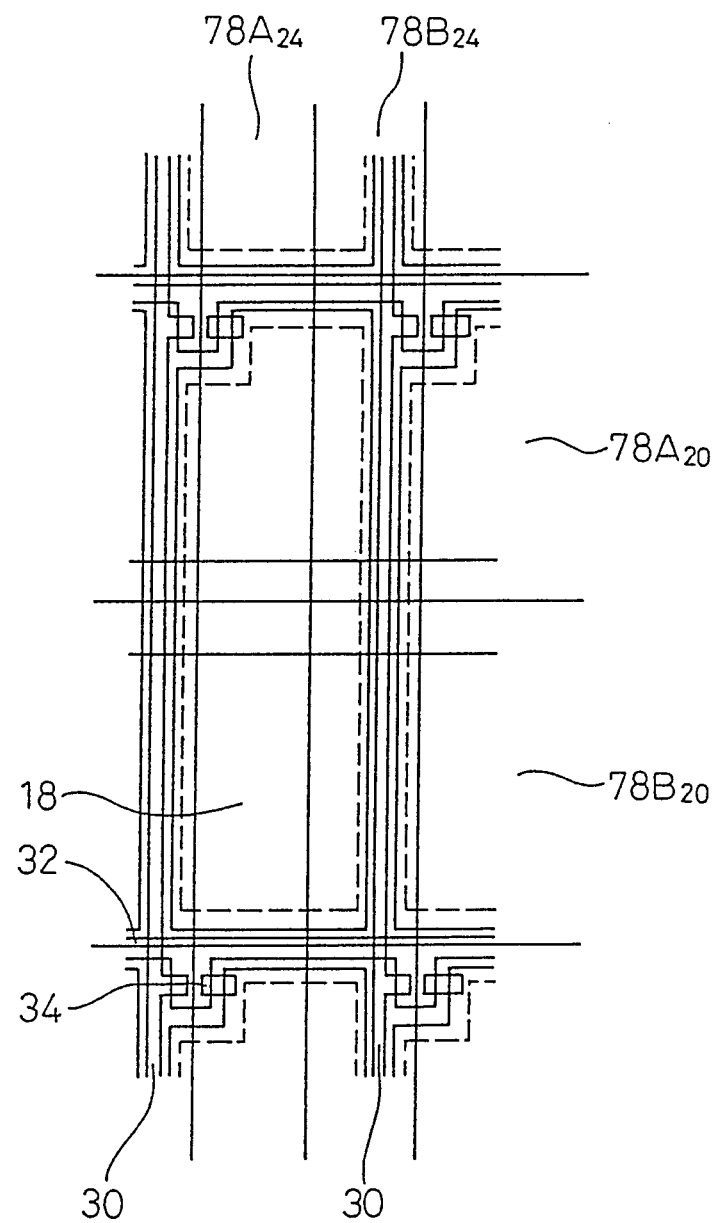
FIG. 46 is a diagram illustrating a case where the alignment layer of FIG. 45 is deviated relative to the pixel.

When each pixel is divided into four domains J, K, L and M, each domain typically has a shape analogous to the shape of the pixel and a size one-fourth the size of the pixel, as shown in FIG. 45. In this case, as shown in FIG. 46 however, when the position of exposure is deviated in irradiating the alignment layers 20, 24 with ultraviolet rays, the four regions are partly concealed by the bus line or the black matrix, whereby the ratio of the regions of the pixel decrease and other portions become relatively large to deteriorate the viewing angle characteristics. When the ultraviolet rays are projected in an inclined direction, therefore, it becomes necessary to more correctly position the mask and the work in addition to employing proximity exposure. In this case, the apparatus tends to become bulky. Or, an extended period of time is required for accomplishing the positioning adversely affecting the throughput.

The constitution of FIG. 43 is intended to solve this problem and includes the stripe pattern of the mask 80 for projecting ultraviolet rays which is obliquely directed with respect to the arrangement of the pixels. The inclined angle and the width of the stripe (width of the region 78A or 78B) are so selected that not less than eight domains J, K, L and M are at least partly included in each pixel. Therefore, even if the position of exposure is deviated at the time of irradiating the alignment layers 20, 24 with ultraviolet rays, the domains J, K, L and M are present at a constant rate at all times, and the viewing angle characteristics are not deteriorated.

Desirably, the direction of the stripes (direction in which the regions 78A and 78B extend) is set to define an angle of 45 degrees with respect to the side of a rectangle of the pixel. When the width of the stripe is denoted by W and the pitch of the rectangular pixel of the short side is denoted by p, there exists a relation $W=(\sqrt{2})/3 \times p$. This means that the pitch p of the rectangular pixel of the short side is equal to three stripe widths (widths of three regions 78A, 78B) 3 W.

This embodiment employs the TFT-type liquid crystal panel. The three pixels RGB constitute a display unit. The pitch of the pixel is 300 μm in a set of RGB pixels, and each of the pixels RGB has a size of 100 μm×300 μm. First, a vertically aligning type polyimide is applied to the substrates 12 and 14 to form opposing alignment layers. Then, the TFT substrate 12 is irradiated with generally parallel ultraviolet rays through the mask 80. Here, use is made of the striped mask 80 having a stripe width of 100 μm×$\sqrt{2}$÷3≈47.14 μm. The mask is carefully designed such that the direction of the stripes is 45 degrees with respect to the direction of the pixel, and the ultraviolet rays are projected at an inclined angle of 45 degrees in the azimuth direction parallel to the stripes.

Next, the mask 80 is displaced in a direction perpendicular to the stripes by the width of the stripe, and the ultraviolet rays are projected at an inclined angle of 45 degrees in the azimuth direction parallel to the stripe but opposite to the direction in which the ultraviolet rays were projected in the previous time. Therefore, the alignments are, first, obtained as shown in FIG. 33. Next, the color filter substrate 14 is irradiated with ultraviolet rays in the same manner. Here, however, the ultraviolet rays are projected in a manner that the direction of the strips is 90 degrees with respect to the direction of projection of ultraviolet rays upon the TFT substrate 12, such that a positional relationship shown in FIG. 39 is established when the color filter substrate 14 and the TFT substrate 12 are stuck together (assembled).

The pair of substrates 12 and 14 having the thus obtained alignments are stuck together. The constitution of FIG. 43 is thus obtained. Each pixel includes four kinds of domains J, K, L and M, and each pixel includes about twenty domains J, K, L and M. A series of domains M, K, J and L are present in a complete form in each pixel, other domains J' and M' are positioned on the data bus line of the left side, and other domains L' and K' are positioned on the data bus line of the right side.

Figure 44:
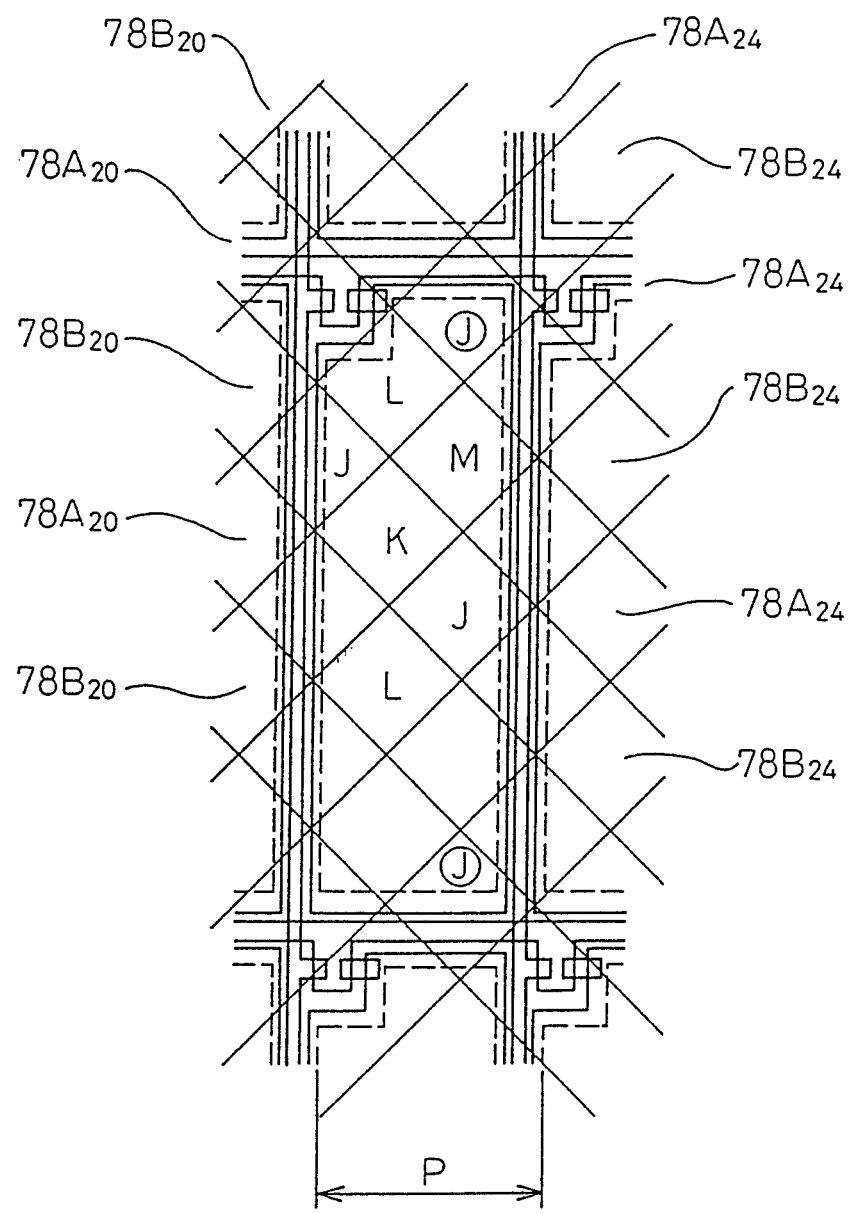
FIG. 44 is a view illustrating a case where the alignment layer of FIG. 43 is deviated relative to the pixel.

FIG. 44 illustrates a state deviated from the state of FIG. 43. Even when the position of exposure is deviated, the ratio of the regions occupying the pixel can be kept almost unchanged. For instance, the domain J in circle positioned on the lower side has a large area in FIG. 43 but has a small area in FIG. 44. On the other hand, the domain J in a circle positioned on the upper side has a small area in FIG. 43 but has a large area in FIG. 44. In bringing the mask into match with the work for optical alignment, therefore, all that is required is simply to set an angle of 45 degrees, and no attention need be given to the positional relationship. The loss becomes nearly the same in every region when the stripe has a width of $(\sqrt{2})/3 \times p$. Even when the position is deviated, therefore, the effect consequently decreases.

The ultraviolet rays can be projected irrespective of the positional relationship between the mask and the substrate, and, hence, no time is required for positioning, the apparatus can be simplified, and the throughput is improved. In the constitution of FIG. 45, for example, the positioning requires a time of from 15 to 30 seconds. The four kinds of regions have different visual angle characteristics which are complementary to one another, making it possible to obtain favorable visual angle characteristics.

Figure 47A:
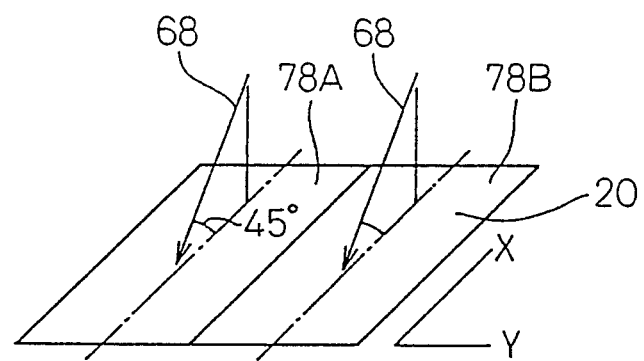
FIGS. 47A and 47B are views illustrating the fifth embodiment of the present invention.

FIGS. 47A to 59 illustrate a further embodiment of the present invention. FIG. 47A shows the alignment treatment effected by irradiating ultraviolet rays in an inclined direction, similar to the case of FIG. 32. In this example, the parallel ultraviolet rays 68 are irradiated to the entire surface of the alignment layer 20 in an inclined direction at the angle of 45 degrees with respect to the alignment layer 20. The alignment layer 20 is shown such that it includes a plurality of divided striped regions 78A and 78E, similar to the case of FIG. 32, but in the stage of FIG. 47A, the ultraviolet rays 68 are irradiated to the alignment layer 20 in the single direction, so the alignment layer 20 is not yet divided into a plurality of regions 78A and 78B. A plurality of regions 78A and 78B are to be divided in this manner at the later stage, and the alignment layer 20 is conveniently shown to be divided in FIG. 47A for clarity of description.

Figure 48A:
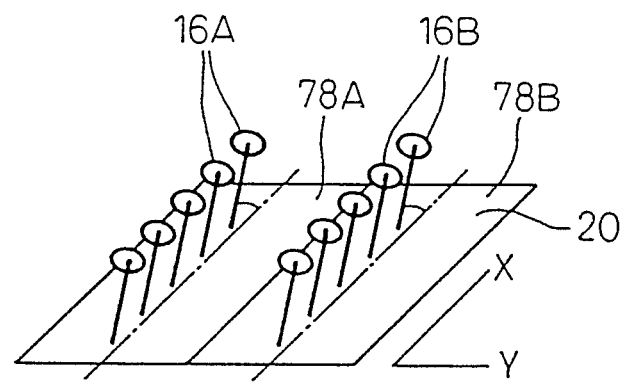
FIGS. 48A and 48B are views illustrating the alignment of the liquid crystal molecules realized when the alignment layer treated according to the steps of FIGS. 47A and 47B are used.

FIG. 48A shows the liquid crystal molecules aligned relative to the alignment layer 20 when the alignment layer 20 is assembled into a liquid crystal display device. In this case too, a plurality of regions 78A and 78B are conveniently shown. The liquid crystal molecules 16A and 16B (the regions 78A and 78B) near the alignment layer 20 pretilt at a substantially constant pretilt angle with respect to the alignment layer 20. The used liquid crystal 16 has a negative dielectric constant, and the alignment layer 20(24) is used polyimide having a vertical aligning property.

Figure 47B:
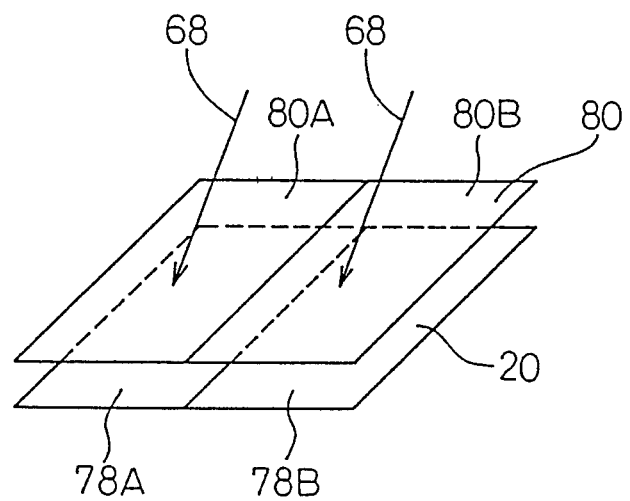

FIG. 47B shows the further alignment treatment effected after the step of FIG. 47A. Here, a mask 80, which may be similar to that shown in FIG. 34, for example, is used and the alignment layer 20 is irradiated with the ultraviolet rays in an inclined direction through the mask 80. The mask 80 has permeable portions 80A and impermeable portions 80B. The region 78A of the alignment layer 20 is a portion at which the ultraviolet rays 68 passing through the permeable portion 80A of the mask 80 fall on the alignment layer 20, and the region 78B is a portion of the alignment layer 20 at which the ultraviolet rays 68 do not fall on the alignment layer 20 since the ultraviolet rays 68 are blocked by the impermeable portion 80B of the mask 80.

Figure 48B:
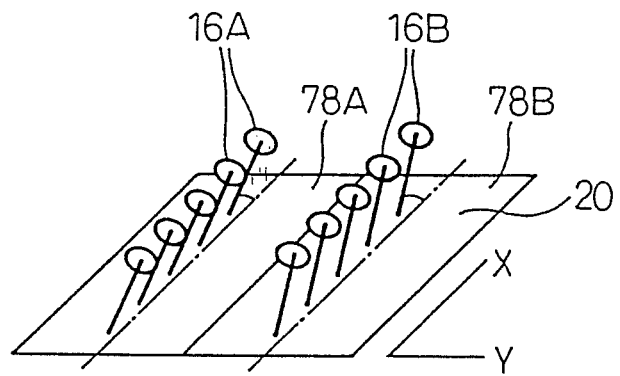

FIG. 48B shows the liquid crystal molecules aligned relative to the alignment layer 20 when the alignment layer 20 is assembled into a liquid crystal display device. When the alignment of the liquid crystal is realized by irradiating the vertical alignment layer 20 with the ultraviolet rays, the greater the amount of the irradiation of the ultraviolet rays is, the greater the energy for destroying the vertical aligning function becomes, and the smaller the pretilt angle relative to the alignment layer 20 is. Since the region 78A of the alignment layer 20 is twice irradiated with the ultraviolet rays and the region 78B of the alignment layer 20 is irradiated with the ultraviolet rays one time, the dose of the ultraviolet rays to the region 78A is greater than that to the region 78B.

Therefore, the pretilt angle of the liquid crystal molecules 16A near the region 78A of the alignment layer 20 is smaller than the pretilt angle of the liquid crystal molecules 168 near the region 78B of the alignment layer 20. As a result, upon the application of voltage, the liquid crystal molecules 16A near the region 78A of the alignment layer 20 change from the generally vertical position to the generally horizontal position easier than the liquid crystal molecules 16B near the region 78B of the alignment layer 20 change, and the threshold voltage for driving the liquid crystal at the region 78A becomes lower than the threshold voltage for driving the liquid crystal at the region 788.

Figure 49A:
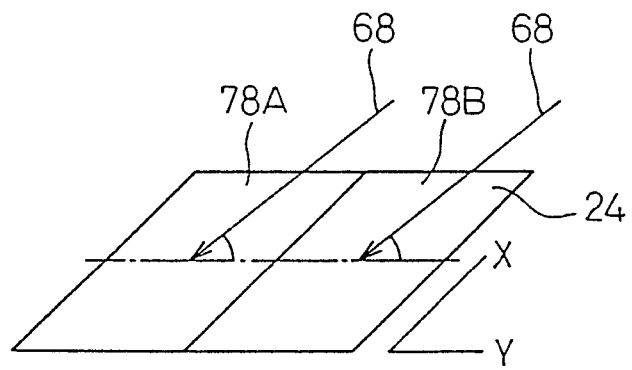
FIGS. 49A and 49B are views illustrating the alignment layer arranged opposite to the alignment layer treated according to the steps of FIGS. 47A and 47B.
Figure 49B:
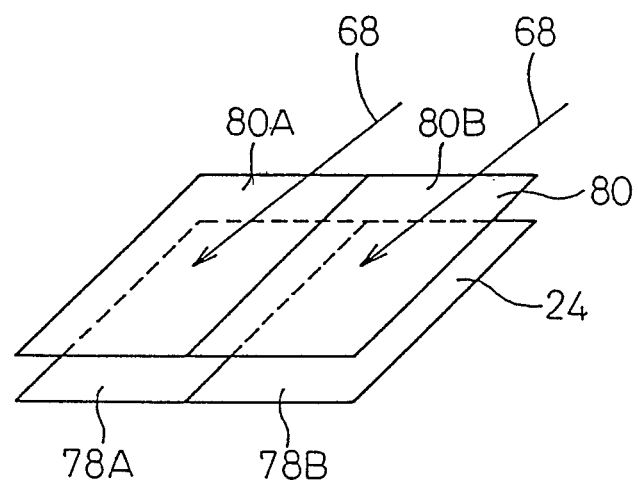

FIGS. 49A and 49B show the alignment treatment effected to the other alignment layer 24, in a similar manner to the alignment layer 20. In FIG. 49A, the parallel ultraviolet rays 68 are irradiated to the entire surface of the alignment layer 24 in an inclined direction at the angle of 45 degrees with respect to the alignment layer 24. The ultraviolet rays 68 are irradiated to the alignment layer 24 in the direction (Y-direction) perpendicular to the stripes defining a plurality of regions 78A and 78B in FIG. 49A, while the ultraviolet rays 68 are irradiated to the alignment layer 20 in the direction (X-direction) parallel to the stripes defining a plurality of regions 78A and 78B in FIG. 47A.

Figure 50A:
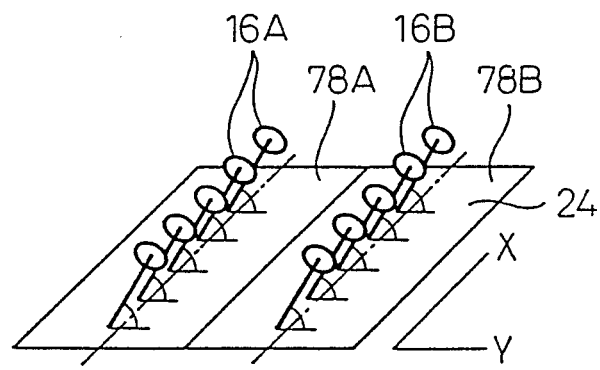
FIGS. 50A and 50B are views illustrating the alignment of the liquid crystal molecules realized when the alignment layer treated according to the steps of FIGS. 49A and 49B are used.

Therefore, the liquid crystal molecules 16A and 16B near the regions 78A and 78B of the alignment layer 24 pretilt at a substantially constant pretilt angle with respect to the alignment layer 24 in the direction of the Y-axis, as shown in FIG. 50I.

Figure 50B:
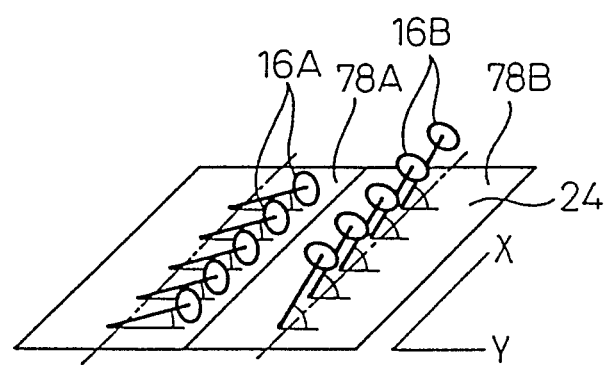

In FIG. 49B, the alignment layer 24 is irradiated with the ultraviolet rays 68 in an inclined direction through the mask 80. In this case too, the pretilt angle of the liquid crystal molecules 161 near the region 78A of the alignment layer 20 is smaller than the pretilt angle of the liquid crystal molecules 16B near the region 78B of the alignment layer 20, as shown in FIG. 50B. As a result, upon the application of voltage, the liquid crystal molecules 16A near the region 78A of the alignment layer 20 change from the generally vertical position to the generally horizontal position easier than the liquid crystal molecules 16B near the region 78B of the alignment layer 20 change.

The pretilt direction of the liquid crystal molecules relative to the alignment layer 20 in FIG. 48B is the X-direction, and the pretilt direction of the liquid crystal molecules relative to the alignment layer 24 in FIG. 50B is the Y-direction. Therefore, when the alignment layer 20 in FIG. 48B and the alignment layer 24 in FIG. 50B are superimposed together as they are, the liquid crystal twists 90 degrees. Here, it is defined that the liquid crystal molecules lie down in Y-direction, but it is also possible to define that the liquid crystal molecules lie down in X-direction.

Figure 51:
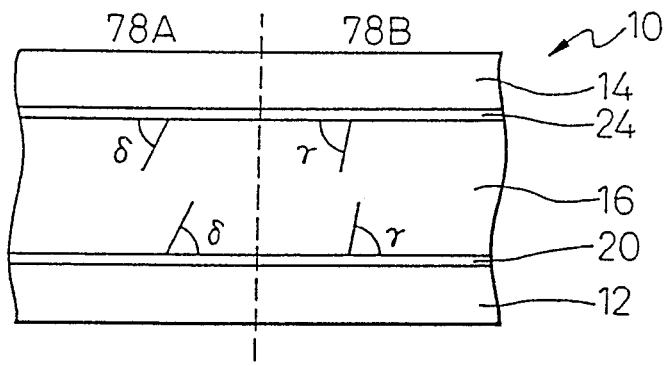
FIG. 51 is a view illustrating the alignment of the liquid crystal molecules in the liquid crystal display device including the alignment layers treated according to the steps of FIGS. 47A-47B and 49A-49B.

FIG. 51 shows the thus fabricated liquid crystal display device 10. In one alignment layer 20 (or 24), the doze of the irradiation of the ultraviolet rays to the region 78A is different for that to the region 78B. In addition, the dose of the irradiation of the ultraviolet rays to the region 78A (or 78B) in one alignment layer 20 is substantially identical to that to the corresponding region 78A (or 78E) in the other alignment layer 24.

Therefore, in the region 78A, the pretilt angle of the liquid crystal molecules near the alignment layer 20 is δ, and the pretilt angle of the liquid crystal molecules near the alignment layer 24 is also δ. The pretilt angles on both alignment layers are the same. Similarly, in the region 78B, the pretilt angle of the liquid crystal molecules near the alignment layer 20 is γ, and the pretilt angle of the liquid crystal molecules near the alignment layer 24 is also γ. The pretilt angles on both alignment layers are the same. Therefore, the symmetry of the behavior of the liquid crystal is maintained in the respective regions 78A and 78B of the opposed alignment layers 20 and 24.

Figure 54:
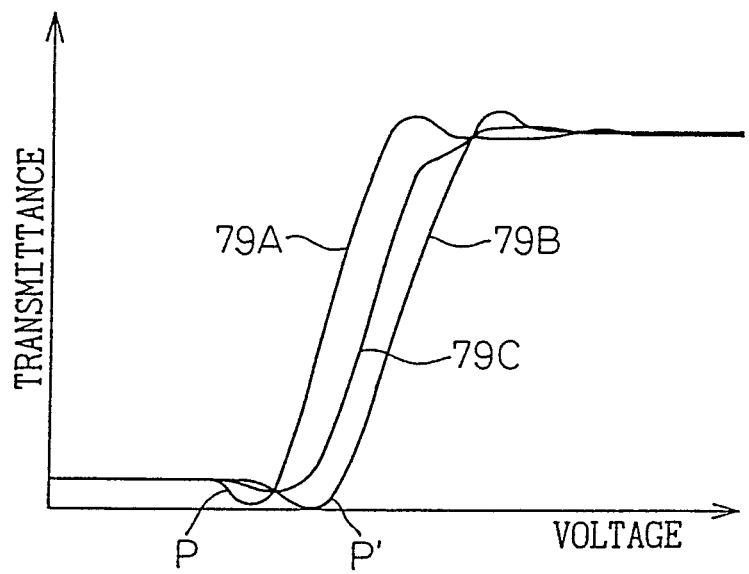
FIG. 54 is a view illustrating the relationship between the applied voltage and the transmittance of the liquid crystal display device of FIGS. 47A to 51.

FIG. 54 shows the relationship between the applied voltage and the transmittance of the liquid crystal display device 10 of FIGS. 47A to 51. The curve 79A shows the relationship between the applied voltage and the transmittance of the region 78A, and the curve 79B shows the relationship between the applied voltage and the transmittance of the region 78B. The curves 79A and 79B have lobes P and P'. If the liquid crystal display device is constructed by elements having the feature corresponding to only one of the regions 78A and 788, there is a problem that a display image reverses from white to black and vice versa at the portion of the lobes P and P' when the display is viewed in an inclined direction.

In this embodiment, the two regions 78A and 78B form one pixel. By arranging so that one pixel includes at least two regions 78A and 78B having different threshold voltages, it is possible to solve that problem that a display image reverses from white to black and vice versa at the portion of the lobes P and P' when the display is viewed in an inclined direction. That is, in the region 78A where the dose of the irradiation of the ultraviolet rays is greater, the pretilt angle δ is smaller, so that the liquid crystal molecules easily fall down toward the alignment layers 20, and 24 and the threshold voltage is smaller. On the other hand, in the region 78B where the dose of the irradiation of the ultraviolet rays is smaller, the pretilt angle γ is greater and the liquid crystal molecules are aligned generally vertically relative to the alignment layers 20 and 24, so that the liquid crystal molecules do not easily fall down toward the alignment layers 20 and 24 and the threshold voltage is greater.

When the voltage is applied to the liquid crystal display device 10 and the applied voltage becomes higher than a certain threshold voltage corresponding to a certain gray scale value in the region 78A, and in the case where the region 78A of the liquid crystal display device 10 is viewed in an inclined direction, a display image reverses from white to black and vice versa. However, the applied voltage does not reach a certain threshold voltage corresponding to that gray scale value in the other region 78B and a display image does not reverse from white to black and vice versa in the other region 78B. In the present invention, since the two regions 78A and 78B form one pixel, the display images having the features of the different threshold voltages are mixed, and the image reversing tendency is mitigated over a whole pixel. The curve 79C shows the relationship between the applied voltage and the transmittance in the compound pixel, in which the bending portions are reduced compared to the curves 79A and 79B.

Figure 55:
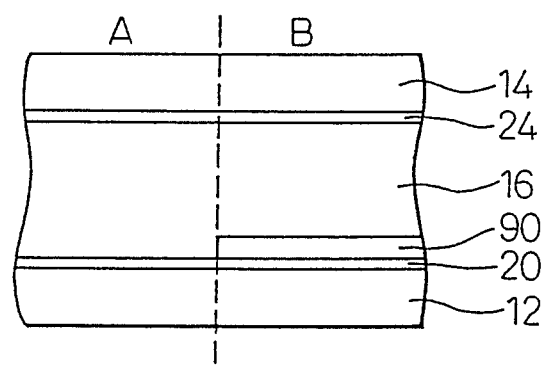
FIG. 55 is a view of a prior art of a threshold division.

There are conventional techniques in which one pixel is divided into two regions having different threshold voltages. For example, FIG. 55 shows an example of a conventional threshold voltage division. In FIG. 55, a dielectric member 90 is arranged in one region so that the voltage is not efficiently applied in that region to increase the threshold voltage for the liquid crystal itself, to thereby realize two regions having different threshold voltages. However, in this case, in this constitution, the step for providing the dielectric member 90 is added so that the manufacturing process becomes complex, resulting in a reduced yielding and an increased cost. In addition, a necessary voltage level is increased by the provision of the dielectric member 90.

According to this embodiment, it is possible to realize the alignment of the liquid crystal and to form a plurality of regions having different threshold voltages, by a relatively simple means such as the irradiation of the ultraviolet rays, and without using rubbing (therefore, without any groove-like traces which may otherwise formed in the surfaces of the alignment layers 20 and 24 by rubbing). Therefore, it is possible to improve the viewing angle characteristics of the liquid crystal display device without any increase in the production cost.

Preferably, as shown in FIG. 51, and as described above, in each of the two regions 78A and 78B of one pixel, the dose of the irradiation of the ultraviolet rays to one region of one alignment layer is substantially identical to that to the corresponding region of the other alignment layer. Therefore, in the region 78A, the pretilt angle of the liquid crystal molecules near the alignment layer 20 and the pretilt angle of the liquid crystal molecules near the alignment layer 24 are equally δ, and in the region 78B, the pretilt angle of the liquid crystal molecules near the alignment layer 20 and the pretilt angle of the liquid crystal molecules near the alignment layer 24 are equally γ.

Figure 52:
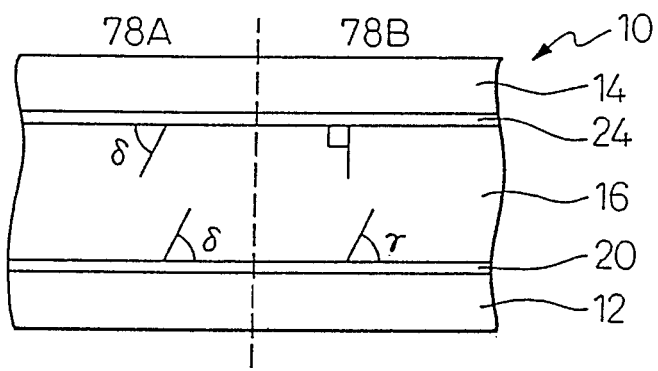
FIG. 52 is a view illustrating a modified example of the alignment division of FIG. 51.

FIG. 52 shows a variant example of the alignment treatment. In FIG. 52, in the region 78B, the pretilt angle of the liquid crystal molecules near the alignment layer 20 is γ and the pretilt angle of the liquid crystal molecules near the alignment layer 24 is 90 degrees (substantially no pretilt). In this case, when the voltage is applied, the liquid crystal molecules as a whole fall down toward the surfaces of the alignment layers according to the pretilt angle of the liquid crystal molecules near the alignment layer 20. In the other region 78A, the pretilt angle of the liquid crystal molecules near the alignment layer 20 and the pretilt angle of the liquid crystal molecules near the alignment layer 24 are equally δ. In this case, the alignment layer 20 is treated for alignment in a manner as described with reference to FIGS. 47A and 47B, but the alignment layer 24 is treated for alignment using the mask 80 one time.

Figure 53:
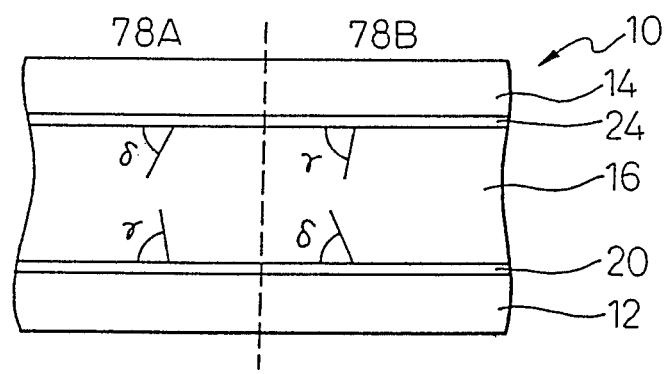
FIG. 53 is a view illustrating a further example of the alignment division FIG. 51.

FIG. 53 shows a variant example of the alignment treatment. In FIG. 53, in the region 78A, the pretilt angle of the liquid crystal molecules near the alignment layer 20 is γ and the pretilt angle of the liquid crystal molecules near the alignment layer 24 is δ. In the other region 78B, the pretilt angle of the liquid crystal molecules near the alignment layer 20 is δ and the pretilt angle of the liquid crystal molecules near the alignment layer 24 is δ. In addition, the pretilt direction on the alignment layer 20 is constant and the pretilt direction on the alignment layer 24 is constant. In this constitution, the tilting direction of the liquid crystal in the region 78A is in reverse to the tilting direction of the liquid crystal in the region 78B, so that a good viewing angle characteristics can be realized.

Figure 56A:
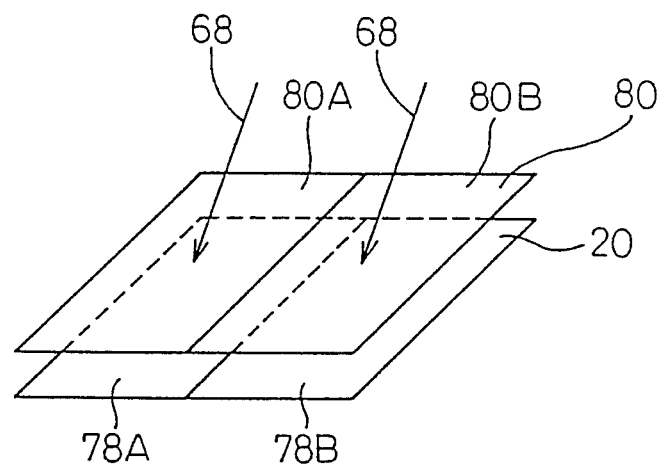
FIGS. 56A and 56B are views illustrating a modified example of the alignment treatment.
Figure 56B:
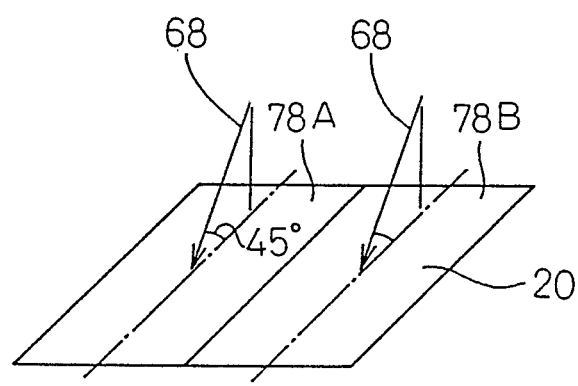

FIGS. 56A and 56B show a further variant example of the alignment treatment. This alignment treatment is carried out according to steps reverse to the steps of FIGS. 47A and 47B. That is, as shown in FIG. 56A, the alignment layer 20 is irradiated with ultraviolet rays using the mask 80 so that the dose of the irradiation of the ultraviolet rays to the region 78A is different from the dose of the irradiation of the ultraviolet rays to the region 78B. Then, as shown in FIG. 56B, the whole surface of the alignment layer 20 is irradiated with ultraviolet rays in the single direction without using the mask 80. The other alignment layer 24 is then treated according to the steps in reverse to the steps of FIGS. 49A and 49B. As result of these alignment treatments, it is possible to obtain a liquid crystal display device similar to that shown in FIG. 51.

Figure 57A:
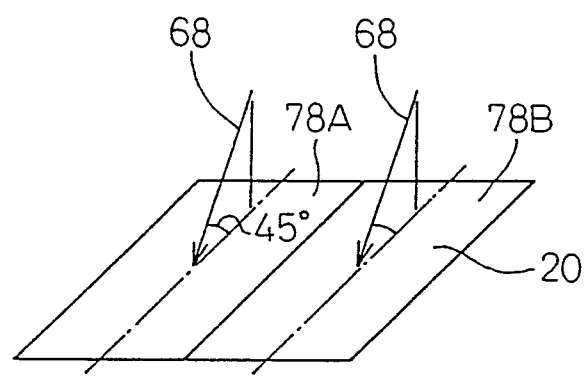
FIGS. 57A and 57B are views illustrating a further example of the alignment treatment.
Figure 57B:
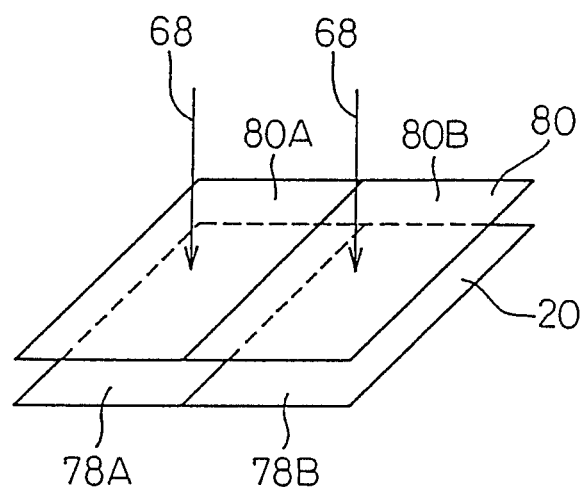

FIGS. 57A and 57B show a further variant example of the alignment treatment. This alignment treatment is carried out according to the steps similar to the steps of FIGS. 47A and 47B. That is, as shown in FIG. 57A, the whole surface of the alignment layer 20 is irradiated with ultraviolet rays in the single direction without using the mask 80. Then, as shown in FIG. 57B, the alignment layer 20 is irradiated with ultraviolet rays using the mask 80 so that the dose of the irradiation of the ultraviolet rays to the region 78A is different from the dose of the irradiation of the ultraviolet rays to the region 78B. The angle of the irradiation of the ultraviolet rays in FIG. 57A is not identical to the angle of the irradiation of the ultraviolet rays in FIG. 57B.

In FIG. 57A, the ultraviolet rays are irradiated to the alignment layer 20 at the angle of 45 degrees relative to the alignment layer 20, but in FIG. 57B, the ultraviolet rays are irradiated to the alignment layer 20 at the angle of 90 degrees relative to the alignment layer 20. The irradiation of the ultraviolet rays at the angle of 45 degrees is necessary for realizing the alignment with a pretilt angle. Then, the alignment treatment is once carried out to realize the alignment with a pretilt angle, it is not necessary to irradiate the alignment layer 20 with the ultraviolet rays at the angle of 45 degrees, it is only necessary to irradiate the alignment layer 20 with the ultraviolet rays to change the pretilt property by changing the irradiation energy of the ultraviolet rays. This is also true for the alignment layer 24. In addition, the step of FIG. 57A is first carried out and the step of FIG. 57B is then carried out in this embodiment, but it is also advisable to carry out the step of FIG. 57B first and then the step of FIG. 57A.

In the above embodiments, the mask 80 has permeable portions 80A and impermeable portions 80B. The impermeable portions 80B can be those which can perfectly block the ultraviolet rays. But it is also possible that the impermeable portions 80B can be those which can partly block the ultraviolet rays and partly allow some of the ultraviolet rays to pass therethrough. In addition, it is not necessary that the permeable portions 80A and that impermeable portions 80B are completely segmented, but the permeable portions 80A and that impermeable portions 80B can be constructed so that the transmitting property indefinitely changes along the permeable portions 80A and that impermeable portions 80B. The irradiation of the ultraviolet rays is carried out two times in the above described embodiments, but it is possible to carry out the irradiation of the ultraviolet rays several times.

Figure 58:
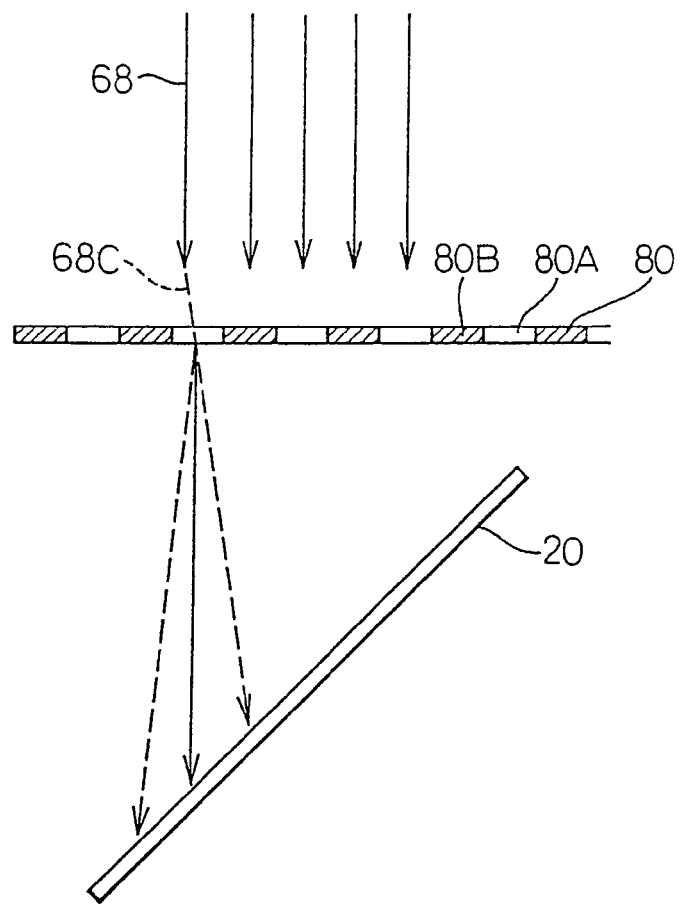
FIG. 58 is a view of a further example for irradiating the alignment layers with the ultraviolet rays, using a mask.

FIG. 58 shows a further example in which the alignment layer 20(24) is irradiated with the ultraviolet rays using the mask 80. The mask 80 has permeable portions BOA and impermeable portions 80B. The mask 80 was arranged close to and parallel to the alignment layer 20(24) in the embodiment of FIGS. 47A-47B, 49A-49B, 56A-56B, and 57A-57B, but the mask 80 is not arranged parallel to the alignment layer 20(24) in FIG. 58. For example, the mask 80 is arranged at the angle of 45 degrees relative to the alignment layer 20(24).

In order to provide regions 78A and 78B having different threshold voltages, it is necessary that the dose of the irradiation of the ultraviolet rays to one region is different from the dose of the irradiation of the ultraviolet rays to another region. In this sense, there is no problem if the dose of the irradiation of the ultraviolet rays continuously changes. There is a case where the dose of the irradiation of the ultraviolet rays continuously changes since the liquid crystal molecules in the regions 78A and 78B fall down in the same direction. In this regard, it is not necessary that the dose of the irradiation of the ultraviolet rays is discontinuously controlled by the mask 80. Therefore, the mask 80 can be arranged at a distance from the alignment layer 20(24) and at an angle relative to the alignment layer 20(24), as shown in FIG. 58. In this case, it is possible to use an existing ultraviolet ray irradiating machine such that the substrate having the alignment layer 20(24) to be irradiated is simply arranged at an angle relative to the machine.

In FIG. 58, the ultraviolet rays 68 pass through the permeable portions 80A and are blocked by the impermeable portions 80B. The ultraviolet rays 68 are supplied as parallel beams, but they are not perfectly parallel beams. The ultraviolet rays 68 include light components 68C which are made incident to the mask 80 in an inclined direction, so that the light components 68C pass through the permeable portions 80A to spaces below the impermeable portions 80B and are made incident to portions of the alignment layer 20(24) that are to be covered by the impermeable portions 80B.

Figure 59:
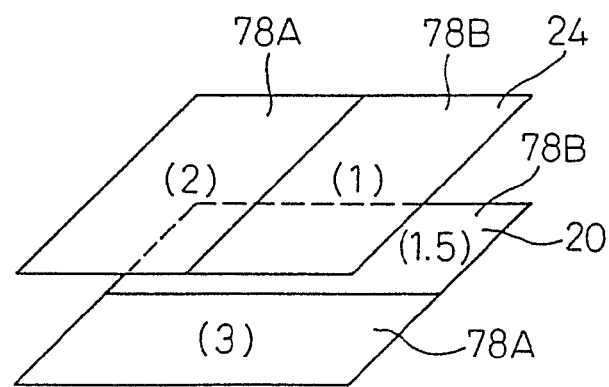
FIG. 59 is a view illustrating a further example of the alignment treatment.

FIG. 59 shows a further example in which the alignment layer 20(24) is irradiated with the ultraviolet rays. In this example, the mask 80 is omitted in the drawings, but the mask 80 is used in the first irradiation of the ultraviolet rays and the second irradiation of the ultraviolet rays, and the dose of the irradiation of the ultraviolet rays is changed in each of the regions 78A and 78B and in the first and second irradiation of the ultraviolet rays. For example, the region 78A of the alignment layer 20 is irradiated with the ultraviolet rays at the dose of 3.0 (optional units), and the region 78B of the alignment layer 20 is irradiated with the ultraviolet rays at the doze of 1.5. On the other hand, the region 78A of the alignment layer 24 is irradiated with the ultraviolet rays at the doze of 2.0 (optional unit), and the region 78B of the alignment layer 24 is irradiated with the ultraviolet rays at the doze of 1.0.

If the alignment layers 20 and 24 are superimposed one on the other, as shown in FIG. 59, four regions are formed in which the sums of the doses in the opposing alignment layers 20 and 24 in these regions are 2.5 (1+1.5), 3.5 (2.0+1.5), 4.0 (1+3.0), and 5.0 (2.0+3.0). In this way, It is possible to establish four characteristics having different threshold voltages, and to prevent the occurrence of the reversal of a display image from white to black and vice versa.

Figure 60:
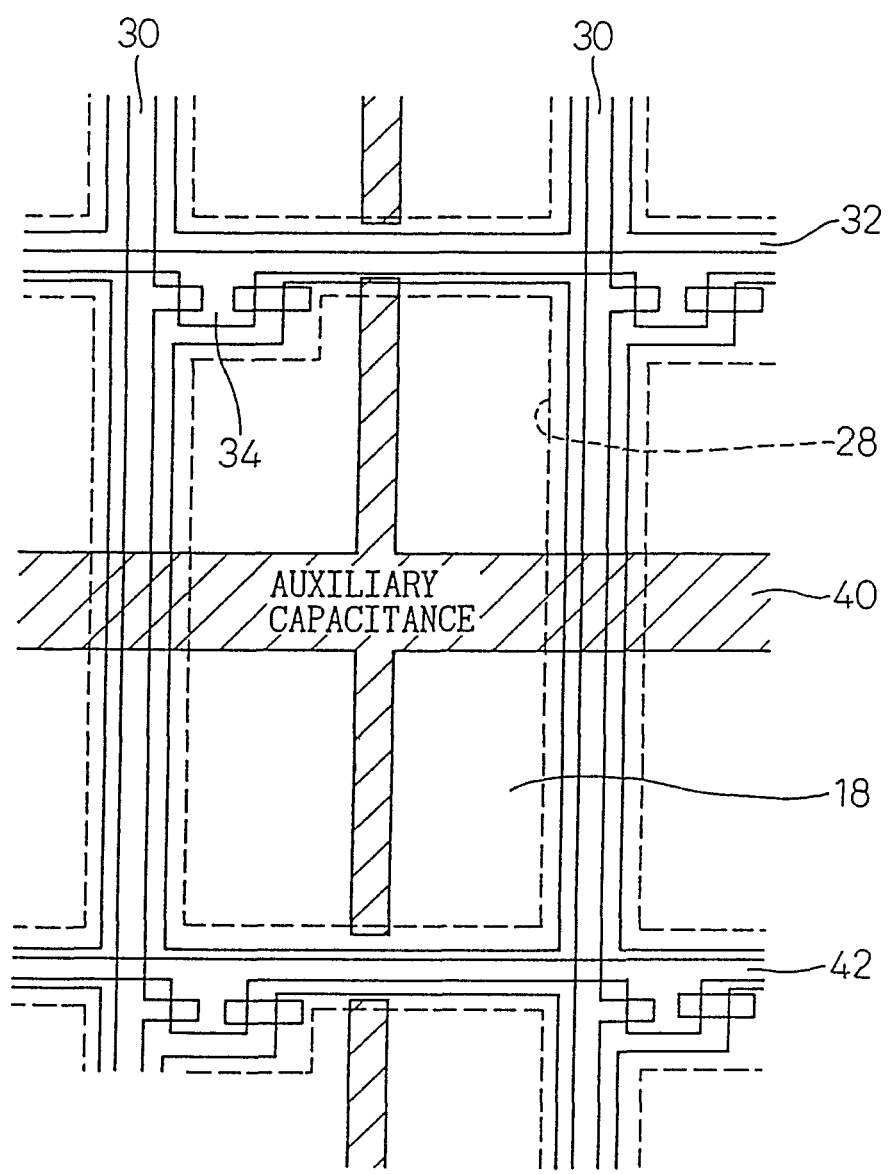
FIG. 60 is a view illustrating the sixth embodiment of the present invention.
Figure 61:
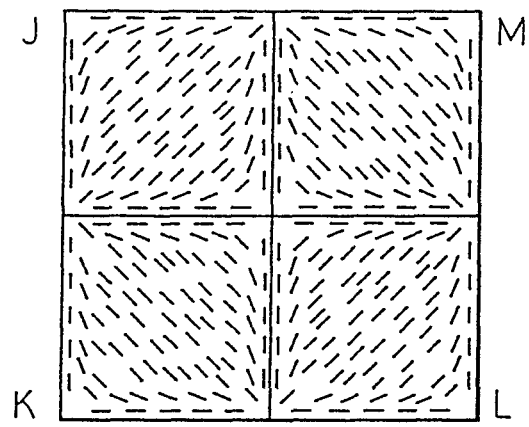
FIG. 61 is a view illustrating the alignment of the liquid crystal of a portion of one pixel in the liquid crystal display device of FIG. 60.

FIGS. 60 to 66 shows a further embodiment of the present invention. FIG. 60 shows a portion of the liquid crystal display device 10 corresponding to one pixel, and FIG. 61 shows the alignment of the liquid crystal in one pixel portion of the liquid crystal display device 10. The alignment of the liquid crystal in FIG. 61 is identical to that shown in FIG. 40, and one pixel includes four regions J, K, L, and M. The four regions J, K, L, and M are divided by a boundary line which extends, as a cross, across one pixel.

As shown in FIG. 60, the liquid crystal display device 10 includes a liquid crystal 16 between the pair of substrates 12 and 14, similar to the above described embodiments. Each substrate includes an electrode (electrode layer) and an alignment layer. The alignment layer is alignment-treated to realize an alignment with a pretilt angle by irradiation with the ultraviolet rays. The liquid crystal display device 10 also includes an active matrix comprising the pixel electrodes 18, drain bus lines 30, gate bus lines 32 and TFTs 34. The liquid crystal display device 10 also includes a storage capacity electrode 40.

The storage capacity electrode 40 passes nearly through the center of the pixel electrode 18 and extends vertically and horizontally as a cross. That is, the storage capacity electrode 40 establishes its fundamental function and is formed as a shading layer covering the crosslike boundary line which divides the pixel into four regions J, K, L, and M. The storage capacity electrode 40 is formed from chrome, and does not allow light to pass therethrough.

Figure 62:
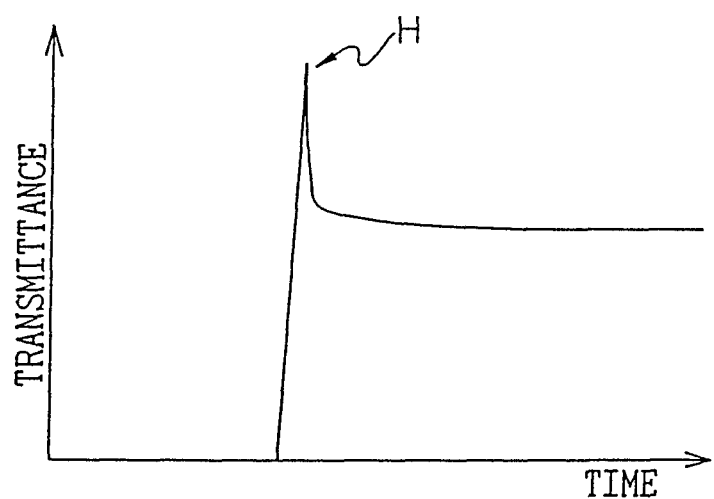
FIG. 62 is a view illustrating the relationship between the applied voltage and the transmittance of the quartered, vertically aligned liquid crystal display device when no storage capacitance electrode is used.

FIG. 62 is a view illustrating the relationship between the applied voltage and the transmittance of the quartered, vertically aligned liquid crystal display device when no storage capacitance electrode is used. The quartered, vertically aligned liquid crystal display device makes it possible to realize a wide viewing angle in which a good display is obtained. In this alignment, like vanes of a windmill, a phenomena has been observed, in the crosswise boundary line dividing the four regions J, K, L, and M, in that the brightness first considerably increases as shown by the point H and subsequently the brightness decreases to a stable level, when a white display is produced by applying a high voltage from the voltage-off condition. It is considered that this phenomena occurs because the behavior of the liquid crystal molecules is not stable at the instant the voltage is applied in the crosswise boundary line so that the brightness extremely increases and subsequently the transverse interaction between the liquid crystal molecules begins to act so that the brightness settles to a stable value.

In a conventional liquid crystal display device having a storage capacitor electrode or an auxiliary capacitor electrode (like 40) which extends in the horizontal direction only, a horizontal portion in the crosswise shining portion can be covered by the conventional horizontal storage capacitor electrode (40) and there is no problem regarding the horizontal shining portion. However, there is a problem in the conventional liquid crystal display device regarding a vertical portion in the crosswise shining portion.

Figure 63:
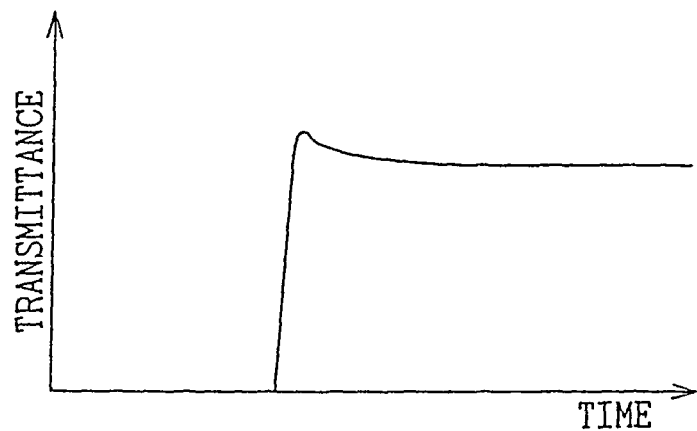
FIG. 63 is a view illustrating the relationship between the applied voltage and the transmittance of the liquid crystal display device of FIG. 60.

In the present invention, it is possible to eliminate the crosswise extremely bright portion since the storage capacitor electrode 40 can cover the crosswise boundary line. FIG. 63 is a view illustrating the relationship between the applied voltage and the transmittance of the quartered, vertically aligned liquid crystal display device when the crosswise storage capacitance electrode 40 is provided. It will be understood that the extreme increase in the transmittance in FIG. 62 is eliminated in FIG. 63. In the case where the storage capacitance electrode 40 includes the vertically extending portion in addition to the horizontally extending portion, the horizontally extending portion is narrowed to reduce its area compared to the case where the horizontally extending portion only is provided and the reduced area is given to the vertically extending portion. By this arrangement, it is possible to eliminate the extremely bright portion, without affecting the aperture of the display.

Figure 64:
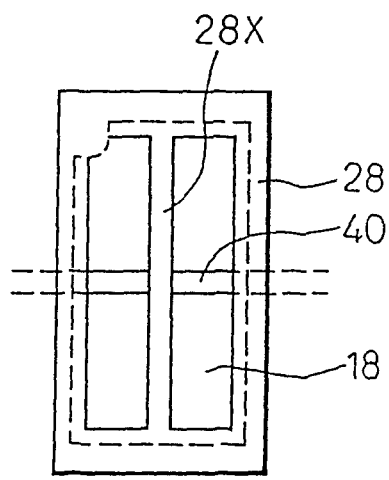
FIG. 64 is a view illustrating another example of a shading layer.

FIG. 64 shows an example in which a portion of the shading layer which covers the crosswise boundary line dividing the four regions J, K, L is formed by the horizontally extending storage capacitance electrode 40 and another portion of the shading layer is formed by a member 28X which is integral with the black matrix 28. By this arrangement too, it is possible to eliminate the extremely increasing transmittance.

Figure 65:
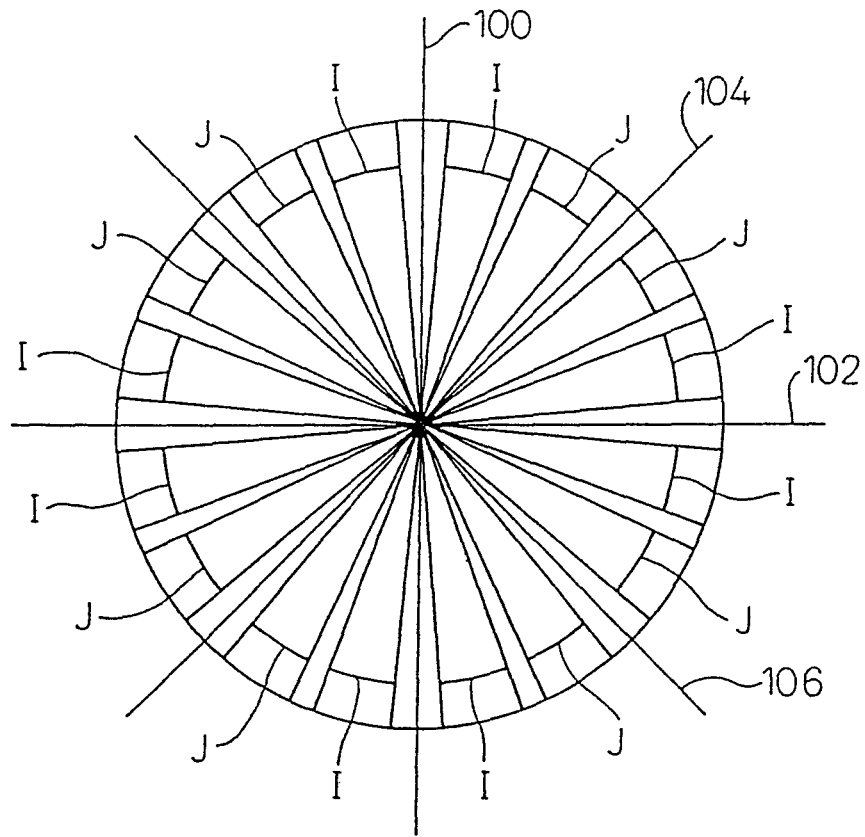
FIG. 65 is a view illustrating another example for solving the problem explained in FIG. 62.

FIG. 65 shows another example to prevent an occurrence of the extremely bright portion in the crosswise boundary line dividing the four regions J, K, L. The liquid crystal display device to which the feature of FIG. 65 is applied is constructed such that one pixel has four regions having different alignments of the liquid crystal divided by a crosswise boundary line (refer to FIGS. 61 and 62), and includes polarizers 29A and 29B arranged in the cross-Nicol arrangement (FIG. 2).

FIG. 65 shows that the polarizers 29A and 29B are arranged in the predetermined directions deviated in the range from 5 degrees to 20 degrees relative to the vertical direction 100 and the horizontal direction 102. That is, the transmission axes of the polarizers 29A and 29B are arranged within the ranges I. In addition, FIG. 65 shows that the polarizers 29A and 29B are arranged in the predetermined directions deviated in the range from 5 degrees to 20 degrees relative to the directions 104 and 106 of diagonally 45 degrees with respect to the vertical direction 100 and the horizontal direction 102. That is, the transmission axes of the polarizers 29A and 29B are arranged within the ranges J. On contrast, the polarizers 29A and 29B were generally arranged in the vertical direction 100, the horizontal direction 102, or the direction 104 or 106 of diagonally 45 degrees.

Figure 66:
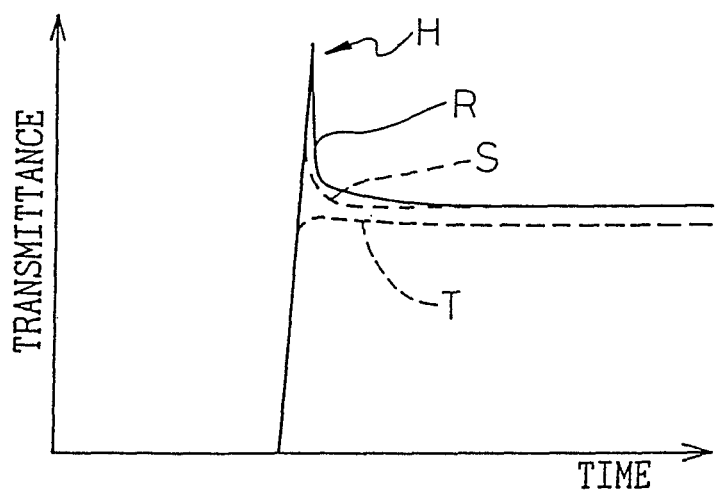
FIG. 66 is a view illustrating the relationship between the applied voltage and the transmittance of the liquid crystal display device having the feature of FIG. 65.

FIG. 66 shows the relationship between the applied voltage and the transmittance of the liquid crystal display device when the polarizers 29A and 29B are deviated. The curve R shows the characteristics when the transmission axes of the polarizers 29A and 29B are arranged in the vertical and horizontal directions. This is identical to the characteristics of FIG. 62. The curve S shows the characteristics when the transmission axes of the polarizers 29A and 29B are deviated by 20 degrees with respect to the vertical and horizontal directions. The curve T shows the characteristics when the transmission axes of the polarizers 29A and 29B are deviated by 10 degrees with respect to the vertical and horizontal directions.

It will be understood that the extremely bright point H in the curve R can be eliminated in the curves S and T, by the comparison of the curves S and T with the curve R. In the test; a favorable result is obtained by deviating the transmission axes of the polarizers 29A and 29B within the above described range. There good effect is obtained by the deviation of from 5 degrees to 20 degrees, but it is more preferable to deviate from 10 degrees to 15 degrees.

Figure 67:
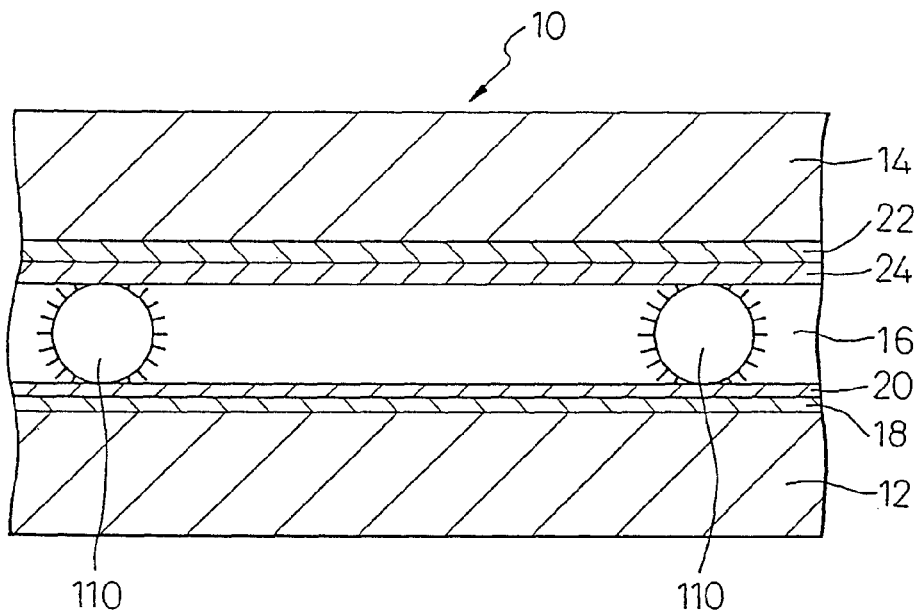
FIG. 67 is a view of an example of the liquid crystal display device including spacers treated for the vertical alignment.

FIG. 67 shows a further embodiment of the present invention. The liquid crystal display device 10 includes a liquid crystal 16 and spacers 110 between a pair of substrates 12 and 14. The spacers 110 are small spherical members to maintain a constant gap between the pair of substrates 12 and 14. In this embodiment, a vertical aligning treatment is effected on the surfaces of the spacers 110. It is possible to apply a silane coupling agent or a material for a vertical alignment layer on the surfaces of the spacers 110.

Figure 68:
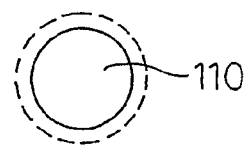
FIG. 68 is a view of a spacer having no treatment for the vertical alignment.

As shown in FIG. 68, it is possible that the liquid crystal molecules around the spacers 110 are aligned along the surfaces of the spacers 110 (horizontal alignment) if the vertical aligning treatment is not effected on the surfaces of the spacers 110. In the liquid crystal display device 10 in which a vertical alignment with a pretilt is realized by irradiating the alignment layers 20 and 24 with ultraviolet rays, if a horizontal aligning property exists around the spacers 110, the liquid crystal molecules are controlled by that horizontal aligning force, and prevented from aligning in the desired vertical direction. Therefore, a problem arises that the display becomes dark.

If the vertical alignment treatment is effected on the surfaces of the spacers 110, on contrast, the liquid crystal molecules are not affected by such a horizontal aligning force, and the vertical aligning force is relatively weak, so the liquid crystal molecules can align in the desired vertical direction. Therefore, a bright display can be realized. This feature can be applied to all the embodiments of the liquid crystal display device 10 in which a vertical alignment with a pretilt angle is realized by irradiating the alignment layers 20 and 24 with ultraviolet rays.

According to the present invention as described above, it is possible to prevent the occurrence of a state where an electric charge remains in large amounts near one of the opposing alignment layers, and the image previously displayed remains slightly due to the residual electric charge even after the voltage is no longer applied. It is further possible to effect the alignment treatment upon the irradiation with ultraviolet rays, instead of effecting the rubbing. The alignment treatment can also be effected by irradiation with ultraviolet rays in combination with rubbing.

The invention claimed is:

1. A method for producing a liquid crystal display device comprising a pair of spaced and opposed substrates, a first electrode formed on one substrate, a second electrode formed on the other substrate, and liquid crystal molecules filled between said pair of substrates, comprising:
providing alignment layer material exhibiting a vertically orienting property for a selected one of said substrates,
aligning a mask having permeable portions and impermeable portions over a selected substrate,
irradiating the mask with ultraviolet rays in a first inclined azimuthal direction; and
simultaneously irradiating the mask from a second inclined azimuthal direction which is substantially 180 degrees different from the first inclined azimuthal direction,
wherein the azimuthal direction of the alignment of liquid crystal molecules in a first region of the substrate is substantially 180 degrees different from the azimuthal direction of the alignment of liquid crystal molecules in a second region of the substrate.

2. A method for producing a liquid crystal display device according to claim 1, wherein said liquid crystal has a dielectric constant of negative anisotropy.

3. A method for producing a liquid crystal display device according to claim 1, wherein the degree of parallelism of the ultraviolet rays is smaller than ±10 degrees.

4. A method for producing a liquid crystal display device according to claim 3, wherein the degree of parallelism of the ultraviolet rays is smaller than ±3 degrees.

5. A method for producing a liquid crystal display device according to claim 1, wherein the angle of irradiation of the ultraviolet rays from the normal of the substrates is from 20 degrees to 70 degrees.

6. A method for producing a liquid crystal display device according to claim 5, wherein the angle of irradiation of the ultraviolet rays from the normal of the substrates is from 30 degrees to 60 degrees.

7. A method for producing a liquid crystal display device according to claim 1, wherein the pretilt angle of liquid crystal is 88 degrees.

8. A method for producing a liquid crystal display device according to claim 1, wherein the dose of the irradiation of the ultraviolet rays to one region of one alignment layer in a pixel is substantially identical to that to the corresponding region of the other alignment layer in the pixel.

9. A method for producing a liquid crystal display device according to claim 1, wherein each pixel has four different alignment regions and said four alignment regions are formed so that liquid crystal molecules are oriented in four different directions at 90 degrees different relative to each other.

10. A method for producing a liquid crystal display device according to claim 1, wherein each pixel has four different alignment regions including two starting points of turn and two directions of turn, with the angle of twist being 90 degrees in each of the regions.

11. A method for producing a liquid crystal display device according to claim 1, wherein each pixel has four regions divided by a crosswise boundary line in which the alignments of the liquid crystal are mutually different.

12. A method for producing a liquid crystal display device according to claim 1, wherein one pixel is divided into two regions having different threshold voltages.

13. A method for producing a liquid crystal display device according to claim 1, wherein the ultraviolet rays contain components having wavelengths equal to or shorter than 280 nm.

14. A method for producing a liquid crystal display device according to claim 1, wherein said substrates are made of a material that absorbs ultraviolet rays.

15. A method for producing a liquid crystal display device according to claim 1, wherein said substrates are one selected from a group of a soda-lime glass, a borosilicate glass, and an alkali-free glass.

16. A method for producing a liquid crystal display device according to claim 1, wherein a source of light emitting ultraviolet rays is one selected from a group of a high-pressure mercury lamp, a low-pressure mercury lamp, and a xenon lamp.

* * * * *